(12) United States Patent
O'Neal et al.

(10) Patent No.: US 7,925,726 B2
(45) Date of Patent: Apr. 12, 2011

(54) SYSTEMS FOR DISTRIBUTING DATA OVER A COMPUTER NETWORK AND METHODS FOR ARRANGING NODES FOR DISTRIBUTION OF DATA OVER A COMPUTER NETWORK

(75) Inventors: Mike O'Neal, Ruston, LA (US); John P. Talton, Ruston, LA (US)

(73) Assignee: Network Foundation Technologies, LLC, Ruston, LA (US)

( * ) Notice: Subject to any disclaimer, the term of this patent is extended or adjusted under 35 U.S.C. 154(b) by 502 days.

(21) Appl. No.: 12/016,136

(22) Filed: Jan. 17, 2008

(65) Prior Publication Data

US 2008/0212498 A1    Sep. 4, 2008

Related U.S. Application Data

(60) Division of application No. 11/176,956, filed on Jul. 7, 2005, now Pat. No. 7,512,676, which is a continuation-in-part of application No. 09/952,907, filed on Sep. 13, 2001, now Pat. No. 7,035,933.

(60) Provisional application No. 60/587,012, filed on Jul. 9, 2004.

(51) Int. Cl.
*G06F 15/177* (2006.01)
*G06F 15/16* (2006.01)
*H04L 12/28* (2006.01)
*H04L 12/56* (2006.01)

(52) U.S. Cl. .................. 709/221; 370/408; 709/205
(58) Field of Classification Search .............. 709/200, 709/201, 205, 221; 370/408
See application file for complete search history.

(56) References Cited

U.S. PATENT DOCUMENTS 6,697,365 B1 * 2/2004 Messenger ............. 370/390

\* cited by examiner

*Primary Examiner* — Philip J Chea
(74) *Attorney, Agent, or Firm* — Greenberg Traurig LLP

(57) ABSTRACT

Various embodiments of the present invention relate to a system for distributing data (e.g., content data) over a computer network and a method of arranging receiver nodes in a computer network such that the capacity of a server is effectively increased (e.g., the capacity of a server may be effectively multiplied many times over; the capacity of the server may be effectively increased exponentially).

5 Claims, 62 Drawing Sheets

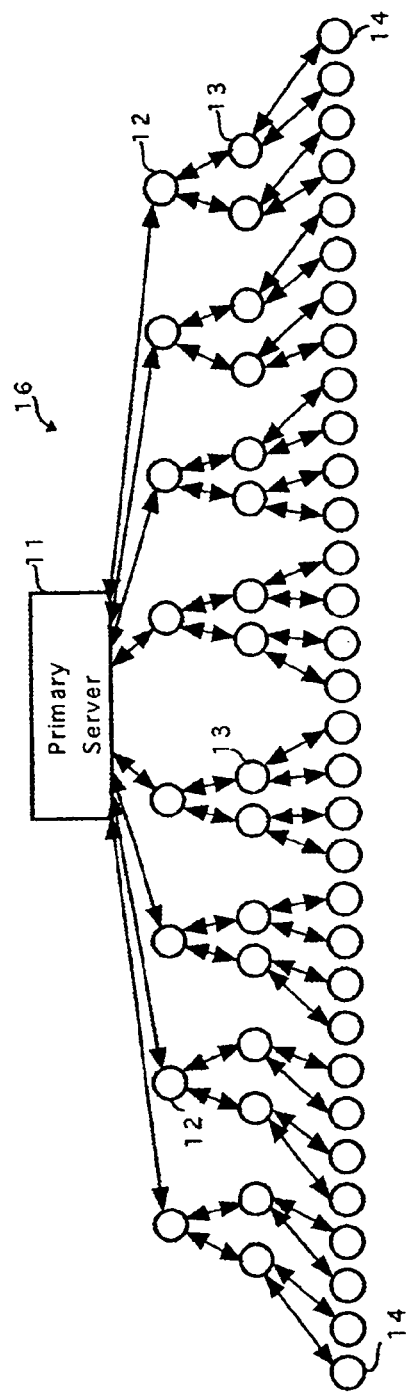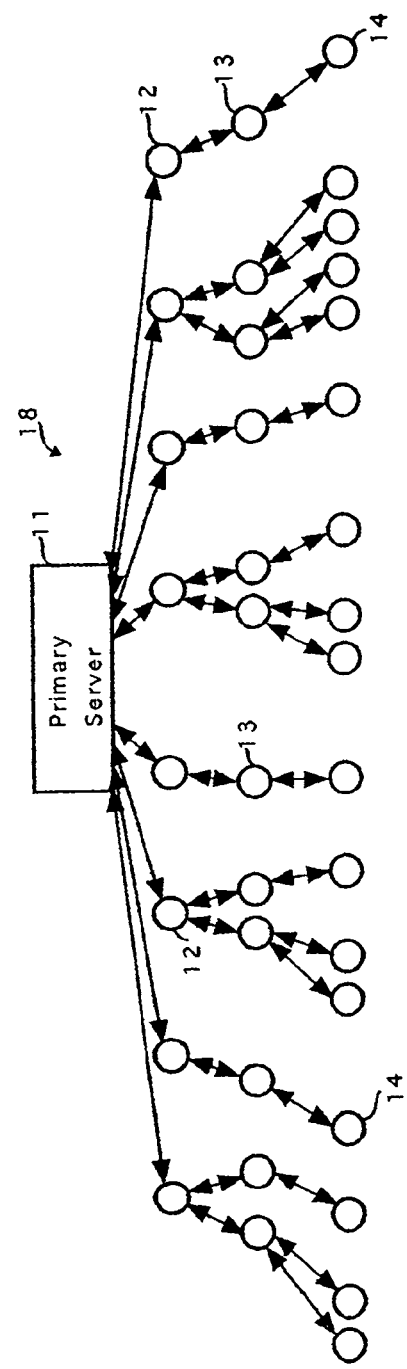
Fig. 4
Fig. 5

SYSTEMS FOR DISTRIBUTING DATA OVER A COMPUTER NETWORK AND METHODS FOR ARRANGING NODES FOR DISTRIBUTION OF DATA OVER A COMPUTER NETWORK

This patent application is a divisional of U.S. patent application Ser. No. 11/176,956, filed on Jul. 7, 2005, now U.S. Pat. No. 7,512,676 which is herein incorporated by reference in its entirety, which is a continuation-in-part of commonly assigned patent application "System for Distributing Content Data Over a Computer Network and Method of Arranging Nodes for Distribution of Data Over a Computer Network", Ser. No. 09/952,907, Filed Sep. 13, 2001 now U.S. Pat No. 7,035,933, and claims the benefit of the filing date of commonly assigned provisional patent application "System for Distributing Data Over a Computer Network and Method for Arranging Nodes for Distribution of Data Over a Computer Network", Ser. No. 60/587,012, filed Jul. 9, 2004.

FIELD OF THE INVENTION

Various embodiments of the present invention relate to systems for distributing data (e.g., content data) over a computer network and methods of arranging nodes for distribution of data (e.g., content data) over a computer network. In one example (which example is intended to be illustrative and not restrictive), the systems and methods of the present invention may be applied to the distribution of streaming audiovisual data over the Internet.

For the purposes of the present application the term "node" (e.g., as used in the phrase a first node communicates with a second node) is intended to refer to a computer system (or sometimes just "computer") configured to send and/or receive data over a computer network (e.g., a computer network including the Internet, a local-area-network, a wide-area-network, a wireless network). Since a "node" in a computer network would not exist but for a computer system being available on such node, the terms "node" and "computer system" (or sometimes just "computer") may be used interchangeably (i.e., the term "node" should be understood to include an available computer system (or sometime just "computer").

Further, for the purposes of the present application the term "upstream" (e.g., as used in the phrase a first computer system sends data via an upstream connection to a second computer system) is intended to refer to the communication path between a first computer system and the Internet when the first computer system is sending data to a second computer system via the Internet.

Further still, for the purposes of the present application the term "downstream" (e.g., as used in the phrase a first computer system receives data via a downstream connection from a second computer system) is intended to refer to the communication path between a first computer system and the Internet when the first computer system is receiving data from a second computer system via the Internet.

Further still, for the purposes of the present application the term "uptree" (e.g., as used in the phrase a first node sends data via an uptree connection to a second node) is intended to refer to the network topology communication path between a first node and a second node when a first node is sending data to a second node which is higher up on the network topology tree (that is, closer to the root server).

Further still, for the purposes of the present application the term "downtree" (e.g., as used in the phrase a first node sends data via a downtree connection to a second node) is intended to refer to the network topology communication path between a first node and a second node when a first node is sending data to a second node which is lower down on the network topology tree (that is, closer to the leaves).

Further still, for the purposes of the present application the term "docked" (e.g., as used in the phrase a child node docks with a parent node) is intended to refer to forming a connection between nodes via which data may flow in at least one direction (e.g., at least uptree or downtree).

Further still, for the purposes of the present application the term "apparent available capacity" (e.g., as used in the phrase apparent available capacity to transmit content data) is intended to refer to a nominal capacity (e.g., a node's presumed capacity based upon a design specification but not necessarily actually tested in the network).

BACKGROUND OF THE INVENTION

In a computer network such as the Internet, each node in the network has an address. A computer system resident at a particular address may have sufficient bandwidth or capacity to receive data from, and to transmit data to, many other computer systems at other addresses. An example of such a computer system is a server, many commercial versions of which can simultaneously exchange data with thousands of other computer systems.

A computer system at another location may have only sufficient bandwidth to effectively exchange data with only one other computer system. An example of such a system is an end user's personal computer connected to the Internet by a very low speed dialup modem. However, even typical personal computers connected to the Internet by higher speed dialup modems may have sufficient bandwidth that they may exchange data essentially simultaneously in an effective manner with several other computer systems. Moreover, an end user's personal computer system may have even greater bandwidth when connected to the Internet by ISDN lines, DSL (e.g., ADSL) lines, cable modems, T1 lines or even higher capacity links. As discussed more fully below, various embodiments of the present invention may take advantage of the availability of such higher capacity end user systems (e.g., those computer systems capable of essentially simultaneously exchanging data with multiple computer systems).

In a typical situation, as shown in FIG. 1, a content provider distributes its data by making the data available on a server node 8 simultaneously to a plurality of users at user nodes 12 (of note, the terms "server", "root server" and "primary server" may be used interchangeably throughout the present application to refer to the same device (i.e., the highest level parent node in a given network). The double-headed arrows show the two-way communication between each end user's computer system and the server. Essentially the content provider's server transmits a separate stream of signals to each receiver node. To accommodate additional users, the content provider would typically either add equipment to increase capacity or it would engage a mirror site to accomplish essentially the same result as adding equipment. The capacities of the end user computers is of virtually no consequence in such a system.

Another system for distributing data is the Napster™ music file exchange system provided by Napster, Inc. of Redwood City, Calif. A schematic of the Napster™ music file exchange system (as its operation is presently understood) is illustrated in FIG. 2.

More particularly, it is believed that in the Napster™ system a copy of the music data is not kept on the server. The server 9 instead maintains a database relating to the various music files on the computers of users who are logged onto the server 9. When a first user 12a sees that a desired music file is available from a second logged on user 12b, the first user causes his computer to query the server 9 for the second user's node address and a connection is made between the first and second user's computers through which the first user's computer notifies the second user's computer of the desired file and the second user's computer responds by transmitting a copy of the desired music file directly to the first user's computer. It is further believed that a first user attempting to download a particular file from a second user must start completely over again if the second user cancels its transmission or goes off line during the data transfer.

In another area, engineers have developed what is known as "streaming media." In summary, streaming media is a series of packets (e.g., of compressed data), each packet representing moving images and/or audio.

To help understand streaming media in more detail, it is helpful to review the traditional Internet distribution method. Each node (whether it is a server node or a user node) in a computer network has a unique identification (sometimes referred to as an "IP" address) associated with it. On the Internet, the unique address may be referred to as a Uniform Resource Locator ("URL"). A user desiring to obtain data from a particular server enters that server's URL into the user's browser program. The browser program causes a connection request signal to be sent over the Internet to the server. If the server has the capacity to accept the connection, the connection is made between the server and the user node (files requested by the user are typically transmitted by the server in full to the user node and the browser program may store the files in buffer memory and display the content on the user's computer system monitor—some files may be more permanently stored in the computer system's memory for later viewing or playing.) The connection with the server is typically terminated once the files have been received at the user node (or the connection may be terminated a short time thereafter). Either way, the connection is usually of a very short time duration.

With streaming media, the contact between the server and user nodes is essentially continuous. When a connection between a server node and user node is made and streaming media is requested, the server sends streaming media packets of data to the user node. A streaming media player installed on the user's computer system (e.g., software, such as RealMedia™ from RealNetworks, Inc. of Seattle, Wash.,) causes the data to be stored in buffer memory. The player decompresses the data and begins playing the moving images and/or audio represented by the streaming media data on the user's computer system. As the data from a packet is played, the buffer containing that packet is emptied and becomes available to receive a new packet of data. As a result, the memory assets of a user's computer are not overly taxed. Continuous action content, such as, for example, the display of recorded motion picture films, videos or television shows may be distributed and played in essentially "real time," and live events, such as, for example, concerts, football games, court trials, and political debates may be transmitted and viewed essentially "live" (with only the brief delays needed for compression of the data being made available on the server, transmission from the server to the user node, and decompression and play on the user's computer system preventing a user from seeing the event at the exact same moment in time as a person actually at the event). And, when the systems are working as designed, the server node and user node may stay connected to each other until all the packets of data representing the content have been transmitted.

SUMMARY OF THE INVENTION

Various embodiments of the present invention relate to a system for distributing data (e.g., content data) over a computer network and a method of arranging receiver nodes in a computer network such that the capacity of a server is effectively increased (e.g., the capacity of a server may be effectively multiplied many times over; the capacity of the server may be effectively increased exponentially). In one embodiment the present invention may take advantage of the excess capacity many receiver nodes possess, and may use such receiver nodes as repeaters. The distribution system may include node(s) having database(s) which indicate ancestor(s) and/or descendant(s) of the node so that reconfiguration of the distribution network may be accomplished without burdening the system's primary server. An embodiment of the present invention may include a process for configuring a computer information distribution network having a primary server node and user nodes docked (i.e., connected) in a cascaded relationship, and reconfiguring the network in the event that a user node departs from the network. In one example (which example is intended to be illustrative and not restrictive), the process may include the steps of providing a new user node (or connection requesting user node) with a connection address list of nodes within the network, having the new user node (or connection requesting user node) go to (or attempt to go to) the node at the top of the connection address list, determine whether that node is still part of the distribution network, and connect thereto if it is, and if it is not, to go to (or attempt to go to) the next node on the connection address list. In another example (which example is intended to be illustrative and not restrictive), when a user node departs from the distribution network, a propagation signal may be transmitted to the nodes below it in the network, causing them to move up in the network in a predetermined order. In another example (which example is intended to be illustrative and not restrictive), the present invention may provide a decentralized approach which provides, to each new user node (or connection requesting user node) a path back to the root server.

Of note, various embodiments of the present invention may be applied to the transmission (e.g., the "appointment" transmission) of audiovisual content such as, for example (which example is intended to be illustrative and not restrictive), live or pre-recorded concerts, football games, court trials, political debates, motion picture films, videos or television shows. Such transmission of audiovisual content may be made with acceptable levels of quality, wherein "acceptable levels of quality" may vary depending upon the end users and the type of transmission. Further, such transmission of audiovisual content may be carried out using streaming media transmissions intended to reach large audiences, in much the way that television shows transmitted over television cable and broadcast media reach large audiences (in this regard, the present invention may enable a server to transmit streaming media to the large number of users which would be essentially simultaneously logging on to view a particular audiovisual presentation under this television-type "large audience" transmission).

BRIEF DESCRIPTION OF THE DRAWINGS

FIG. 4 is a schematic drawing of another embodiment of a computer information distribution network formed pursuant to the present invention;

FIG. 5 is a schematic drawing of another embodiment of a computer information distribution network formed pursuant to the present invention;

Figure 1:
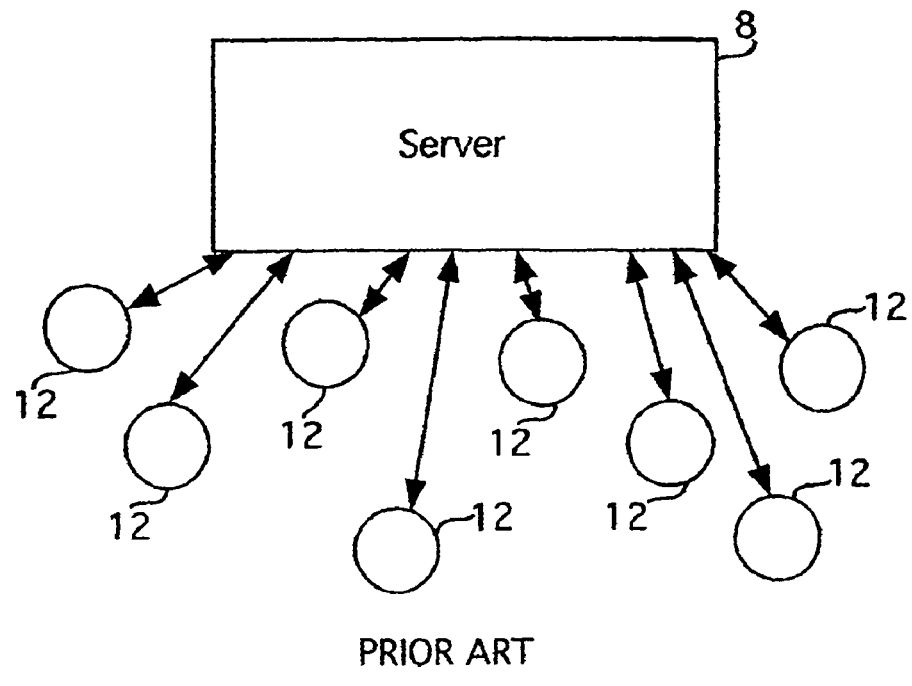
FIG. 1 is a schematic drawing of a prior art computer information distribution network.
Figure 2:
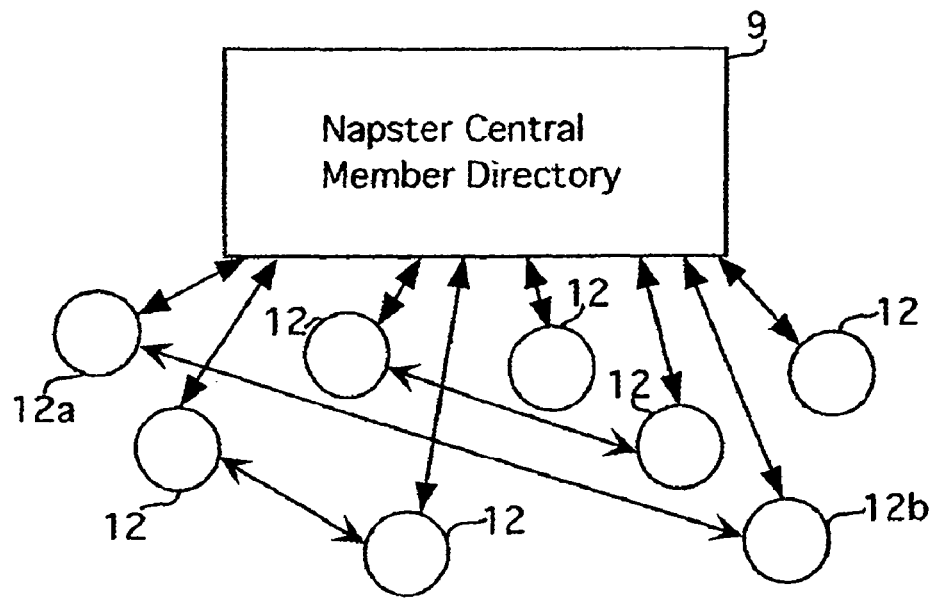
FIG. 2 is a schematic drawing of another prior art computer information distribution network.

Among those benefits and improvements that have been disclosed, other objects and advantages of this invention will become apparent from the following description taken in conjunction with the accompanying figures. The figures constitute a part of this specification and include illustrative embodiments of the present invention and illustrate various objects and features thereof (of note, the same reference numeral may be used to identify identical elements throughout the figures).

DETAILED DESCRIPTION OF THE INVENTION

Detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

Figure 3:
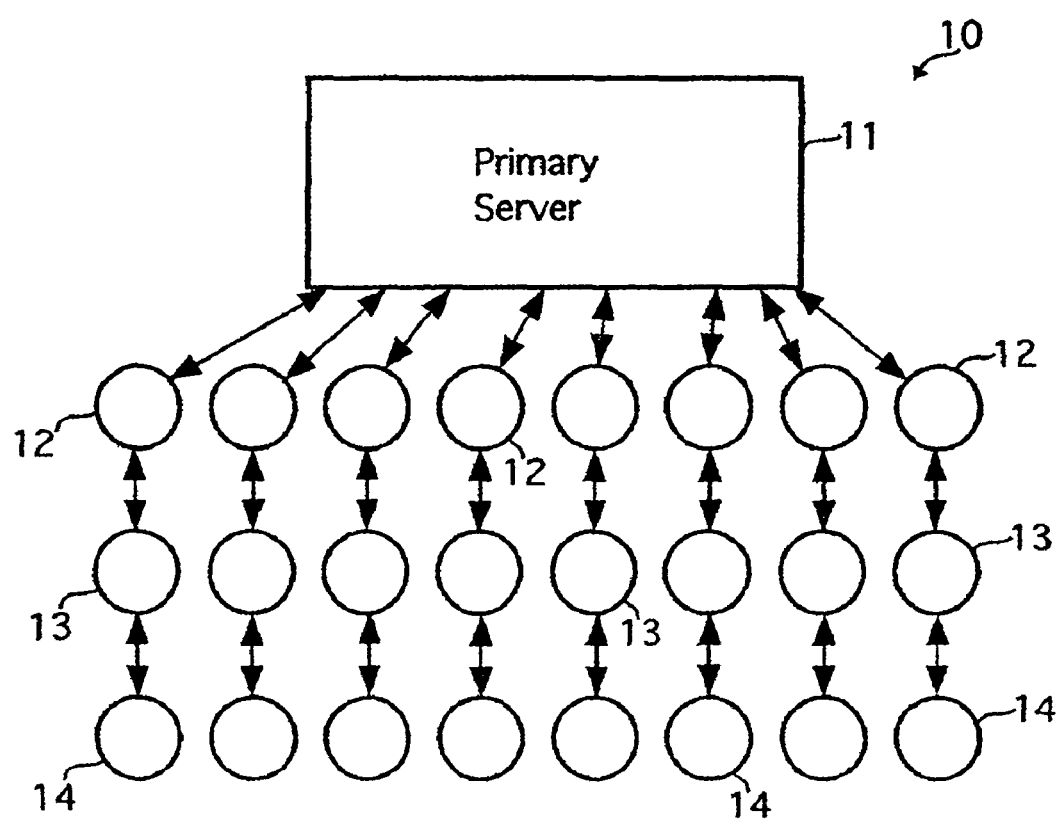
FIG. 3 is a schematic drawing of an embodiment of a computer information distribution network formed pursuant to the present invention.

Referring now to FIG. 3, an illustration of a linear propagation arrangement 10 of a computer network according to an embodiment of the present invention is shown. In this embodiment, the primary server node (or simply, server) 11 provides content data (e.g., streaming media) to user nodes 12 connected directly to it (sometimes referred to as "first level user nodes"). Each first level user node 12 has a second level user node 13 connected to it and each second level user node 13 has a third level user node 14 connected to it. The computer system at each first level user node 12 passes a copy of the content data received from server node 11 to the computer system at the second level user node 13 attached to such first level user node 12. The computer system at each second level user node 13 in turn passes the content data onto the computer system at the fourth level user node 14 attached to it.

As more fully discussed below, under this embodiment the computer systems at the server and user nodes may have distribution software installed in them which enables the nodes to be arranged as shown and for the computer systems to receive and re-transmit data.

The cascadingly connected arrangement of nodes (i.e., first level nodes are connected to the server, second level nodes are connected to first level nodes, third level nodes are connected to second level nodes and so on) shown in FIG. 3 takes advantage of the bandwidth available in certain nodes to essentially simultaneously receive and transmit data. In a linear propagation arrangement, the effective distribution capacity of a server is in essence multiplied by the number of levels of nodes linked together. In the example of FIG. 3 (which example is intended to be illustrative and not restrictive), the distribution capacity of the server node is increased from 8 user nodes to 24 in just three levels.

Of note, many user nodes may have at least sufficient bandwidth (e.g., upstream bandwidth as well as downstream bandwidth) to receive data from one node and to re-transmit streams of data essentially simultaneously to two or more other nodes. This capacity could be used in another embodiment to set up a computer network with a cascadingly connected exponential propagation arrangement 16 (as shown in FIG. 4). As the name implies, an exponential propagation arrangement effectively increases the distribution capacity of a server exponentially. For example (which example is intended to be illustrative and not restrictive), with just three levels of user nodes, each having the capacity to retransmit two data streams, the distribution capacity of the server in FIG. 4 is increased from 8 user nodes to 56.

In another embodiment a distribution network may also be set up as a cascadingly connected hybrid linear/exponential arrangement 18, such as shown in FIG. 5.

Of note, the effective distribution capacity grows more quickly in a hybrid linear/exponential arrangement with each new level than does the distribution capacity in a linear propagation arrangement, and less quickly than does the distribution capacity in a pure exponential arrangement. However, any of these arrangements allows a server's distribution capacity to be greatly increased (e.g., with little or no additional investment in equipment for the server). Further, any other desired hybrid arrangement may be used.

Referring again to FIGS. 1-5, all of the connections between nodes are illustrated with arrows on each end. This is intended to signify that data flows in both directions between connected nodes. For example (which example is intended to be illustrative and not restrictive), a user node connected to a server may transmit data to the server indicating the identity of the user node, what the user node wants and/or other data, while the server node may transmits data confirming its identity and containing information and other content to the user node. In the remaining drawings such arrows may not be shown for the sake of simplicity. Further, it is noted that the bulk of data which is transmitted may be content (e.g., web pages, music files, streaming media), and such content will be understood to flow downtree from node to node in the drawings (i.e., in the direction from the root server to a first level node, to a second level node, to a third level node, etc.).

As can be understood from the above, an exponential propagation arrangement may create the most distribution capacity. However, while many (and perhaps even most) user nodes may have sufficient bandwidth to re-transmit acceptable quality multiple copies of the data, a number of user nodes may not have sufficient bandwidth to re-transmit more than one copy of the data with acceptable quality, and some user nodes may not have sufficient bandwidth to re-transmit even a single acceptable copy. Under these conditions, a distribution system employing the present invention may be configured, for example, as a hybrid propagation network. In such a system, a personal computer acting as a server node may reach many (e.g., hundreds, thousands or more) user nodes, even if the server node itself has capacity to transmit content data directly to only one other node.

In the following discussion it will be assumed that the system employing the present invention will take advantage of the capability of many user nodes to simultaneously re-transmit up to two copies of data (e.g., content data). However, it should be understood that the invention could take advantage of user nodes capable of simultaneous re-transmission of even higher numbers of copies.

In one embodiment the length of the distribution chains (i.e., the number of levels of user nodes linked through each other to the server) may be kept as small as possible to reduce the probability that the nodes at the ends of the chains will suffer a discontinuity of service. Thus, under this embodiment, in order to maximize the number of user nodes which may be connected to the server while trying to keep the length of the distribution chains as small as possible, the user nodes having the greatest bandwidth may be placed as far up uptree as possible (i.e., be placed as close as possible to the server, where "close" refers to network node level and not necessarily to geographical proximity).

In this regard, if an unreliable user node is placed near or at the end of a chain, few or no other user nodes would be affected by the unreliable user node's leaving the network. In contrast, if an unreliable user node were placed at or near the beginning of a chain (i.e., be far uptree), many other nodes would be affected by the unreliable node's departure. Because various embodiments of the invention may be used for appointment viewing of streaming media, in which an essentially continuous connection to an audiovisual content source may essentially be a necessity, it may be important (e.g., for this steaming media use) that the most reliable user nodes be placed high up in the chain (i.e., high uptree).

A user node may be deemed unreliable for any of a number of reasons. One example (which example is intended to be illustrative and not restrictive), is that the user node is connected to the Internet by lines having intermittent failures. Another example (which example is intended to be illustrative and not restrictive), is that the user is merely sampling the content available on the network and intentionally disconnects the user node from the distribution network after discerning that he or she has no interest in the content.

Thus, under an embodiment of the present invention the user nodes may be positioned in the most advantageous positions, taking into account the dynamic nature of the distribution network, in which many user nodes may enter and leave the distribution network throughout the server's transmission of a streaming media show. In addition, the invention may help to preserve the viewing experience of users at user nodes positioned even at the end of a distribution chain (the server and/or user nodes may be enabled to perform the operations required to set up and maintain the distribution network by having data distribution software installed therein).

Referring now to a "User Node Arrival" example (which example is intended to be illustrative and not restrictive), it can be seen from FIGS. 3-5 that the distribution chains can be viewed as a plurality of family trees, each family tree being rooted to the server 11 through one of the first level nodes 12 (each node in the distribution network may have distribution software loaded in it which enables the node to perform the functions described below; before any new node may join the distribution network, such new node may also have such software loaded in it).

Of note, in the bulk of the examples discussed below, the network topologies have a branch factor of two (i.e., no user node is assigned more than two child nodes to be connected directly to it). A network topology with a branch factor of two may be referred to as a binary tree topology. It should be understood, of course, that the teachings set forth herein may be extended to network topologies having other branch factors, for example (which example is intended to be illustrative and not restrictive), branch factors of three, four or more.

Figure 6:
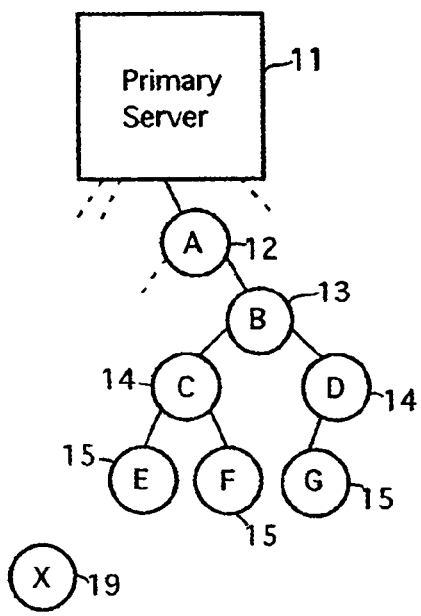
FIG. 6 is a schematic drawing of a particular topology of a computer information distribution network formed pursuant to an embodiment of the present invention.

In any case, FIG. 6 is a schematic drawing of a distribution network topology useful for describing the current "User Node Arrival" example. This FIG. 6 shows a distribution chain or family tree rooted to the server 11 through user node A, a first level user node 12 (the dashed lines represent connections from the server to other first level nodes or from node A to another user node). User node A could be thought of as a child node of the server and as a parent node for other user nodes connected directly to it. User node B, a second level user node 13, could be thought of as A's child. User nodes C and D, third level user nodes 14, may be thought of as B's children and A's grandchildren (and each other's siblings). User nodes E and F, fourth level user nodes 15, may be thought of as C's children (and each other's siblings). User node G, also a fourth level user node 15, may be thought of as D's child. And user nodes E, F and G may be thought of as B's grandchildren and A's great grandchildren.

In the present example, whenever a new user node (or connection requesting user node) 19, such as node X in FIG. 6, seeks connection to the distribution network, it will first make a temporary connection to the server node (or a connection server, not shown) in order to begin the process for connecting to the distribution system. The server (or connection server) will discern from the user node a bandwidth rating (discussed below) appropriate to that node and, depending upon the available capacity of the server and any existing distribution chains, the server will either assign the new user node to a spot directly connected to the server or will provide the new user node with a connection path through a tree to the server.

Figure 10:
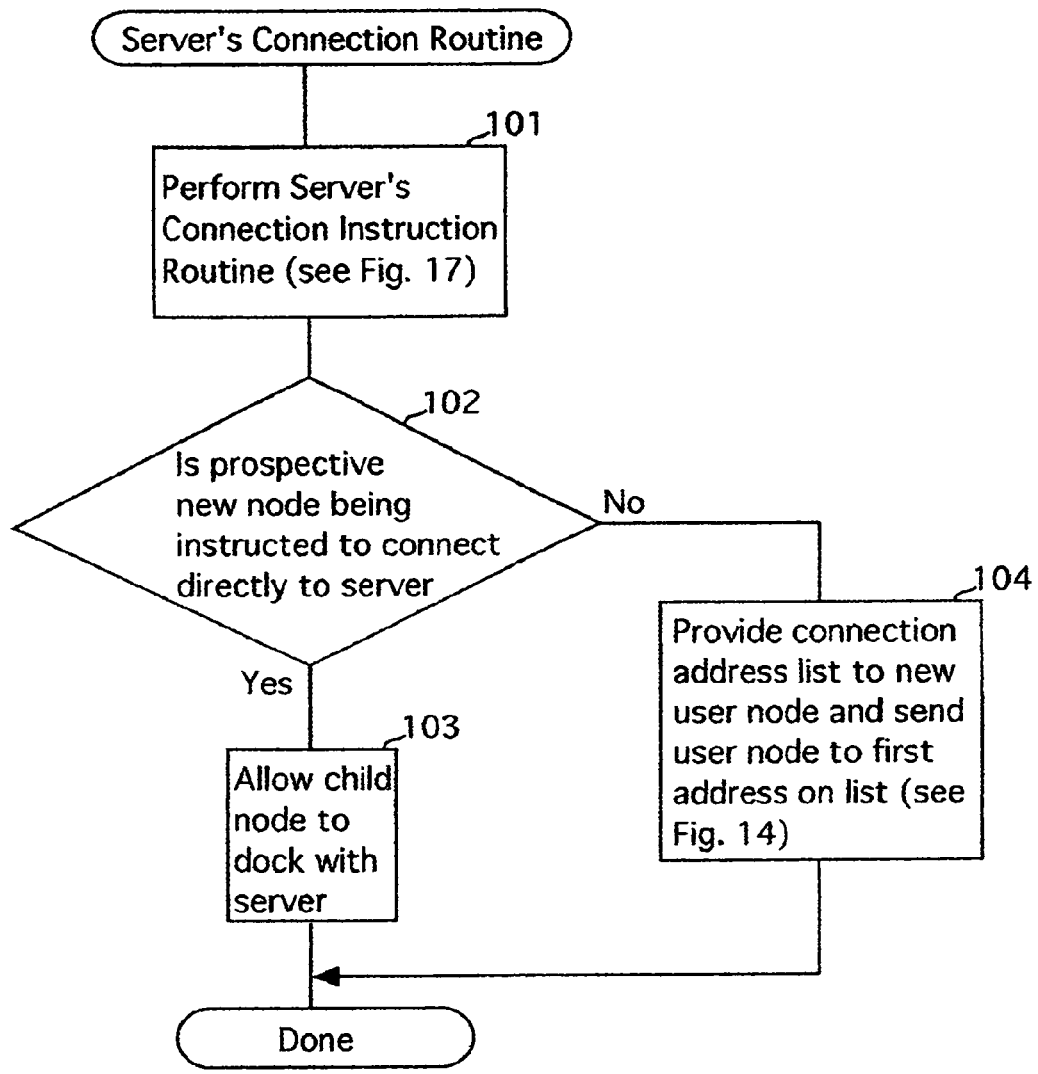
FIG. 10 is a flow diagram of an embodiment of the present invention showing a Server Connection Routine which may be performed when a prospective child node seeks to join the distribution network.

FIG. 10 is a flow diagram associated with this example showing a Server's Connection Routine which is performed when a prospective child node seeks to join the distribution network. In step 101 the server performs the Server's Connection Instruction Routine (discussed below), in which the server determines what connection instructions to give to the new user node (or connection requesting user node). The server then goes to step 102 where it determines whether, as a result of the Server's Connection Instruction Routine, the prospective child node is being instructed to dock with the server. If the prospective child node is being instructed to dock with the server, then the server goes to step 103 in which the server would allow the new user node to dock with it, and the server would begin transmitting data (e.g., streaming media) directly to the new user node.

Of note, as referred to above, two different servers could be used—one to perform the server's connection routine and the other to transmit data (e.g., streaming media)—since both servers would be performing server functions, they will hereinafter sometimes be considered a single server for purposes of the description herein.

Of further note, while the prospective child node may be a new user node or a connection requesting user node, to simplify the following discussion such prospective child node may simply be referred to as a "a new user node".

In any case, if the new user node is not being instructed to dock directly with the server, then the server goes to step 104 in which it provides the new user node with an address connection list and disconnects the new user node from the server.

Figure 11:
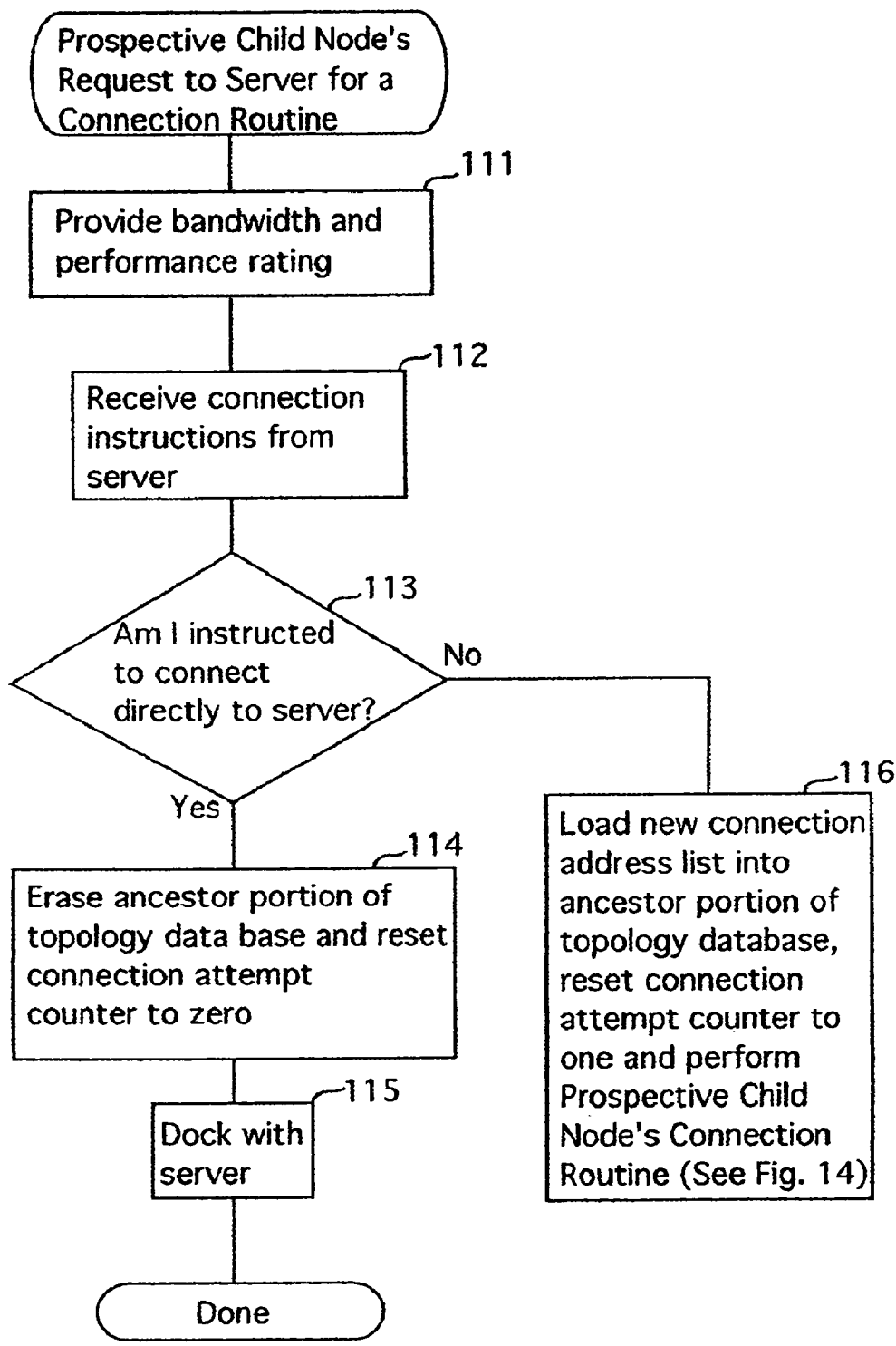
FIG. 11 is a flow diagram of an embodiment of the present invention showing a Prospective Child Node's Request to Server for a Connection Routine.

Essentially contemporaneously with the performance by the server of the Server's Connection Routine, the new user node is performing the Prospective Child Node's Request to Server for a Connection Routine. FIG. 11 is a flow diagram associated with this example illustrating the Prospective Child Node's Request to Server for a Connection Routine. Upon making the temporary connection to the server, the new user node goes to step 111 in which it provides bandwidth rating and performance rating information to the server. It then proceeds to step 112 in which it receives connection instructions from the server. Then the new user node proceeds to step 113 to determine whether it has been instructed to dock directly with the server. If the answer is "yes," then the new user node proceeds to step 114 in which it erases any information which may have been in its ancestor database and, if the distribution software has a Return to Server Subroutine in it, resets the connection attempt counter to zero. The new user node then proceeds to step 115 in which it docks with the server and begins receiving data (e.g., streaming media). If the new user node is not being instructed to dock directly with the server, then the new user node goes to step 116 in which it receives the new connection address list from the server and loads such list into the user node's ancestor database and begins the Prospective Child Node's Connection Routine (discussed below). If the distribution software has a Return to Server Subroutine in it, the connection attempt counter is reset to one in step 116.

In the examples discussed in connection with FIGS. 6-9 and 12A-12C (which examples are intended to be illustrative and not restrictive), the server has determined that the new user node X will not be allowed to connect directly to the server. Also, for the purposes of these examples, all of the user nodes are presumed to be equally capable of simultaneously re-transmitting two copies of the content data and that the tree rooted through node A is the most appropriate tree through which node X should be connected to the server. In one embodiment the server may rely on chain length in determining to which particular user node, already in the distribution network, that node X should connect.

Figure 13:
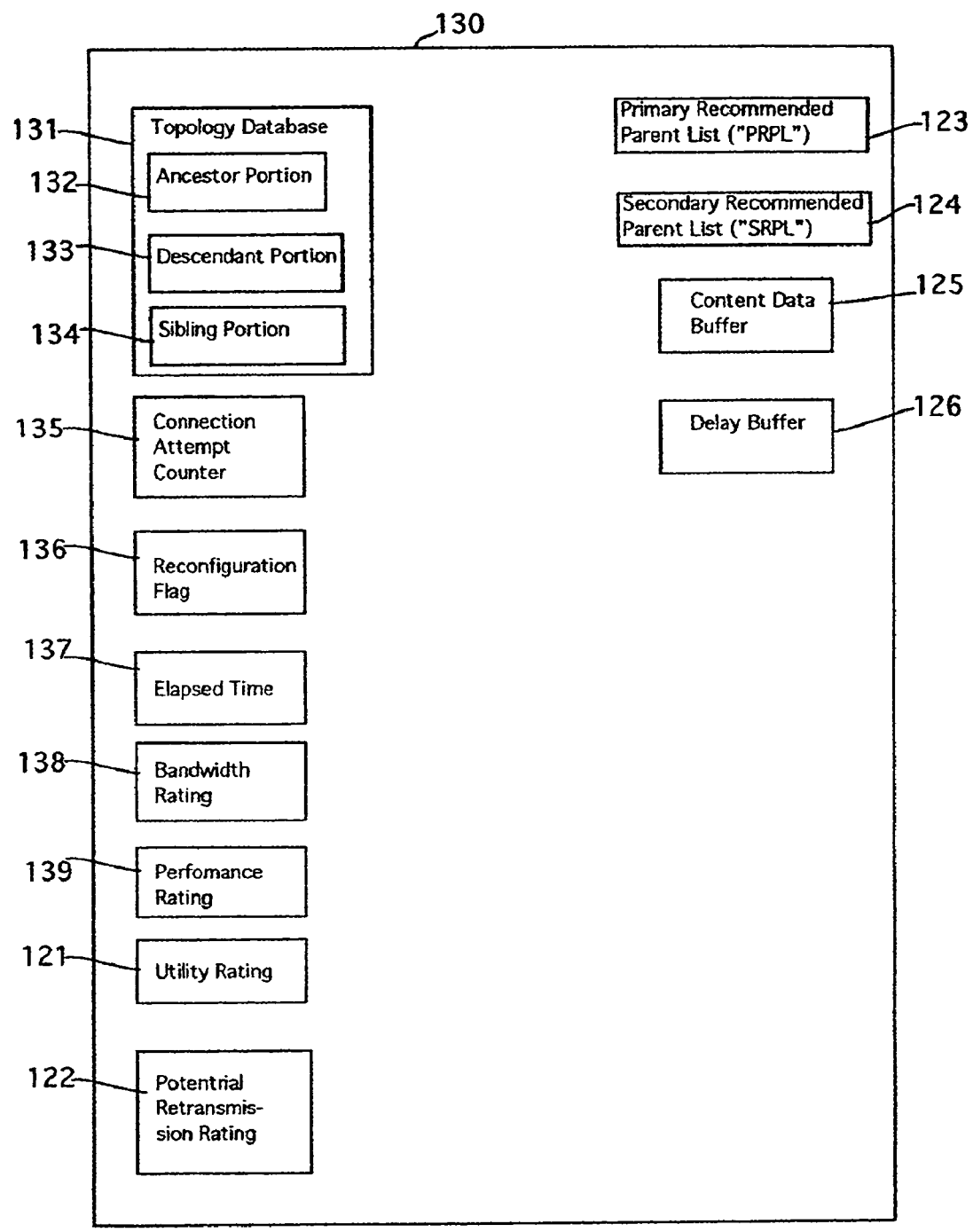
FIG. 13 is a block diagram of an embodiment of the present invention showing the memory blocks into which the software used may partition a user node's memory.

Referring again to the example of FIG. 6, the topology of the distribution network based on the most recent information available to the server at the moment that node X seeks to join the distribution network is shown. Path D-B-A-S (where "S" is the server) represents the shortest available path from an end of a chain back to the server (e.g., from a node level point of view and not necessarily from a geographical proximity point of view), and the server 11 gives that path information, or connection address list, to node X during step 104 of FIG. 10 (and node X receives such list during step 116 of FIG. 11). That is, node X will be given a connection address list with the URLs and/or IP addresses of each of nodes D, B, A and S. The distribution software in node X causes the path information to be stored in the ancestor portion (or ancestor database) 132 of node X's topology database 131 shown in FIG. 13. The ancestor database may include an ancestor list, a list of node X's ancestors' addresses from node X's parent back to the server node. (FIG. 13 shows an example block diagram (which example is intended to be illustrative and not restrictive) showing the memory blocks into which the software used in connection with the present invention may partition a user node's memory 130.) Node X then attempts to contact node D first, the user node most distant from server 11 in the path. Note that when the server provides the D-B-A-S connection address to node X, the server is giving what it "believes" to be the complete path information going all the way back to the server. That is, subsequent to the most recent generation of the topological data, node D may have departed from the network, as may have one or more of its ancestors, resulting in a reconfiguration (discussed below) of at least a portion of the tree of which D was a part.

Figure 7:
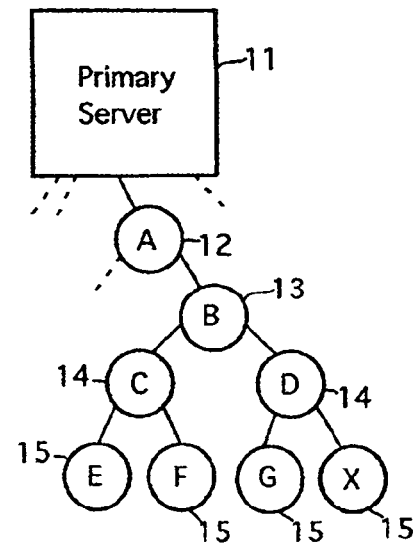
FIG. 7 is a schematic drawing of a particular topology of the computer information distribution network formed pursuant to an embodiment of the present invention as shown in FIG. 6 (after the occurrence of an event)
Figure 14:
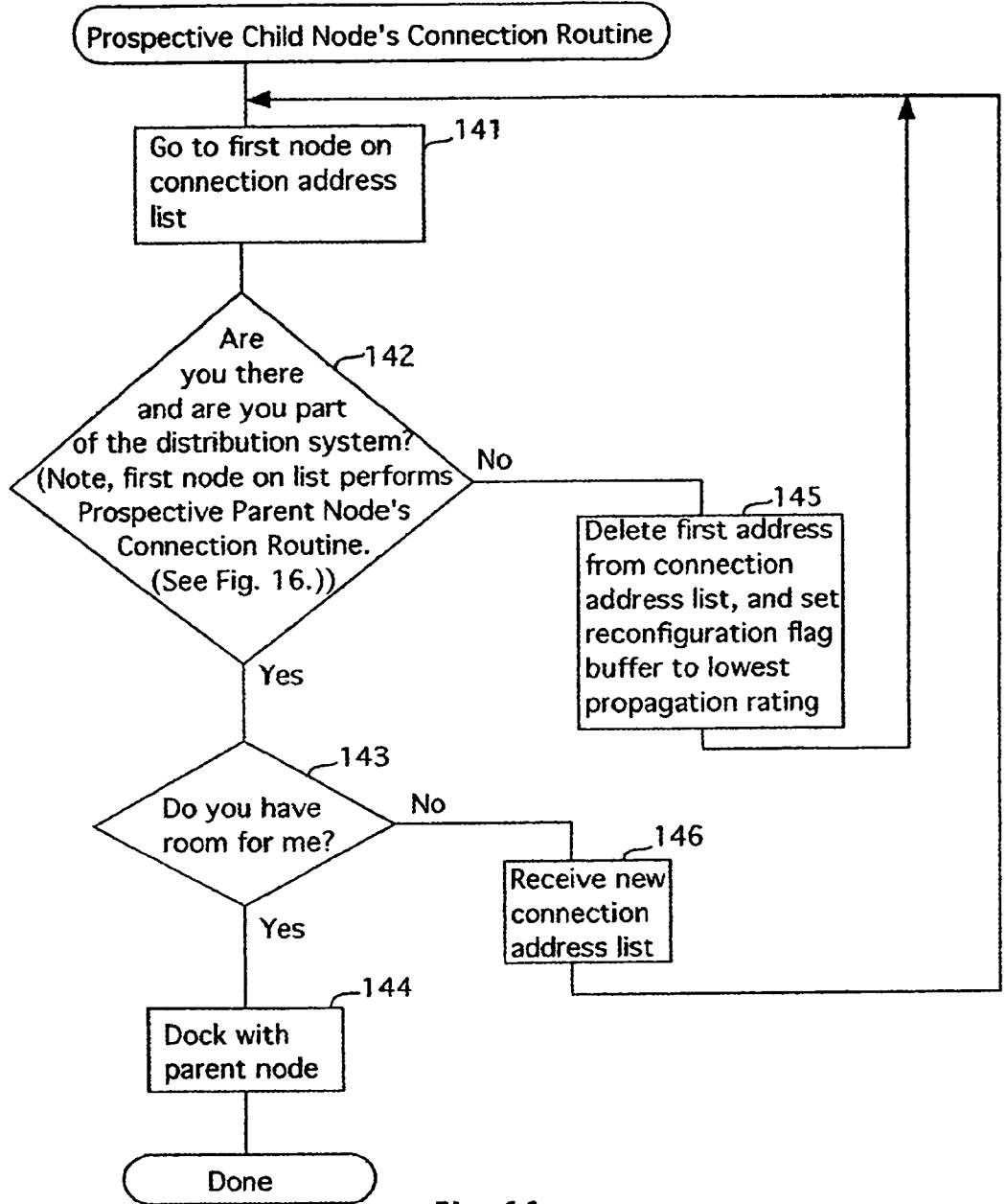
FIG. 14 is a flow diagram of an embodiment of the present invention showing a Prospective Child Node's Connection Routine—the routine which a new user node (or connection requesting user node) may go through in attempting to connect to a distribution chain (or tree) after receiving a connection address list.

Referring now to FIG. 14 is a flow diagram associated with this example showing the Prospective Child Node's Connection Routine, the routine which a new user node, here node X, will go through in attempting to connect to a distribution chain (or tree) after receiving a connection address list (which node X has stored in the ancestor portion of its topology database) from the server or from a prospective parent node or during a reconfiguration event. In step 141, node X attempts to contact the first node on the connection address list. The first node, and only node, on the connection address list could be the server itself. Here node D is the first node on the list. Node X then proceeds to step 142 and determines whether the first node on the connection address list is still on-line and still part of the distribution network (in one example, if no response is received within a predetermined period of time, from the first node on the connection address list, the answer to the query in step 142 will be deemed to be no). If node D is on-line and still part of the distribution network, node X proceeds to step 143 in which node X inquires whether node D has room for node X. This inquiry may need to be made because the distribution network may have gone through a reconfiguration event resulting in node D's not having sufficient capacity to provide a copy of the content data to node X. If node D has room for node X, then node X proceeds to step 144 in which it connects (or docks) with node D and begins receiving content data from it. This is depicted in FIG. 7. Note that node X is now one of several level four nodes 15.

Figure 8:
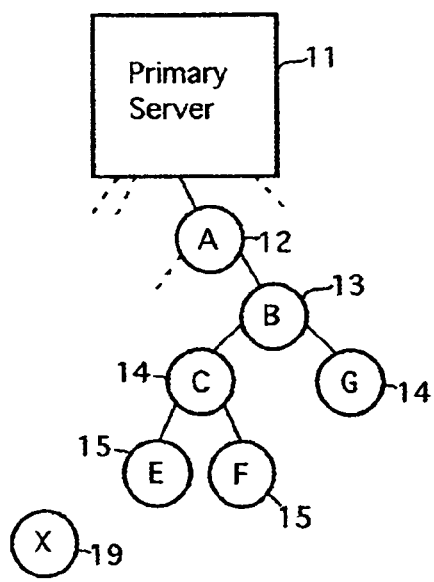
FIG. 8 is a schematic drawing of another topology of a computer information distribution network formed pursuant to an embodiment of the present invention.

On the other hand, in step 142, if node D is not on-line (e.g., no response is received from node D within a predetermined period of time) or if node D is on-line but is no longer part of the distribution system (e.g., subsequent to the server's obtaining its topology data the user of the system at node D either caused his or her computer system to go off-line or to leave the distribution system, or there was a line failure causing the computer system to go off line), as depicted in FIG. 8, then node X goes to step 145 in which it deletes the first address from the connection address list in node X's ancestor database (and, in one example, and for a purpose which will become clear when discussing reconfiguration events below, sets its reconfiguration flag buffer 136 to the lowest propagation rating). At this time node B, in the present example, becomes the first node on the connection address list. Then node X goes back to step 141 and repeats the routine described above. Note that because of node D's leaving the distribution network, a reconfiguration event was triggered which resulted in node G changing from a fourth level node 15 to a third level node 14.

In step 143, if the prospective parent node has no room for the new node (e.g., the capacity of the prospective parent node is fully occupied), the new node goes to step 146, in which it receives a new connection address list from the prospective parent. The prospective parent may then perform a Fully Occupied Parent's Connection Instruction Routine, discussed below in connection with FIG. 18, wherein it creates the new connection address list based on topology data obtained from its progeny. That new list may include the path back to the server through the prospective parent just in case, as discussed above, there are user node departures along the path.

Of note, by having a prospective parent node prepare the new connection address list as described in this example, the burden on the server is reduced and is distributed among the user nodes.

Figure 9:
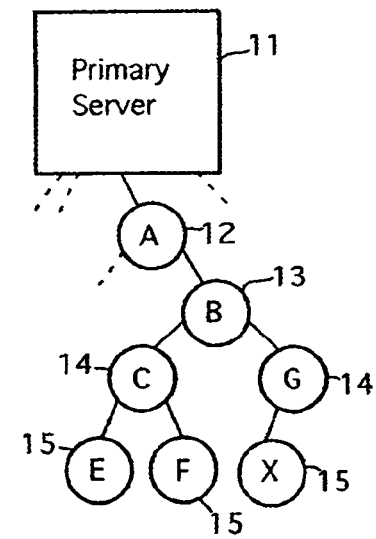
FIG. 9 is a schematic drawing of the topology of the computer information distribution network formed pursuant to an embodiment of the present invention as shown in FIG. 8 (after the occurrence of an event)

Still referring to the example depicted in FIG. 8, when node X gets to step 143, node B will respond that it has no room and node X will proceed to step 146. When node X performs step 146, the new connection address list it receives from node B will be G-B-A-S. Then node X proceeds to step 141 and repeats the routine from that point on. When the routine is performed on the topology shown in FIG. 8, step 143 will result in node G responding that it has room for node X. Node X will then perform step 144 and be connected to the distribution network through node G as shown in FIG. 9. Here, node X becomes a fourth level node 15.

Figure 15:
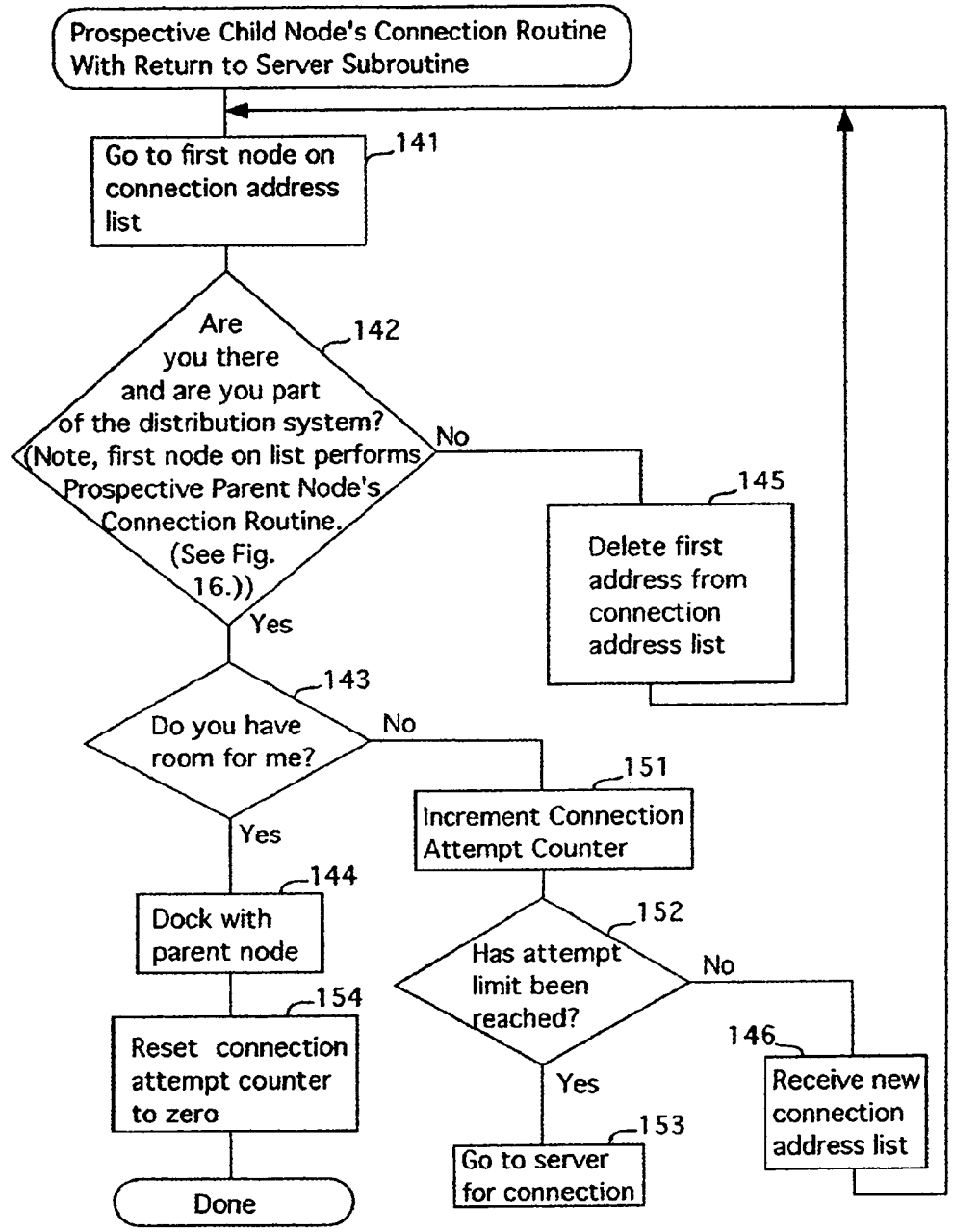
FIG. 15 is a flow diagram of an embodiment of the present invention showing a Prospective Child Node's Connection Routine With Return to Server Subroutine.

The distribution software may include a Return to Server Subroutine, comprised of steps 151, 152 and 153 as shown in FIG. 15, as part of the Prospective Child Node's Connection Routine. This subroutine reduces the risk that a prospective child node would enter into an endless cycle of fruitless attempts to dock with nodes in a particular tree. If the answer to the query in step 143 is "no," then node X goes to step 151 in which it increments by one the connection attempt counter 135 in node X's memory. Then node X goes to step 152 in which it determines whether the connection attempt limit has been reached. In one example (which example is intended to be illustrative and not restrictive), the limit may be preset at any number greater than one and may depend upon what the designer of a particular distribution network determines would be a reasonable amount of time for a node to attempt to make a connection on a particular tree, or a branch of a tree, before that node should be given an opportunity to obtain a completely new connection address list directly from the server. If the connection attempt limit has not been reached, then node X proceeds with step 146 as discussed above. If the connection attempt limit has been reached, then node X goes to step 153, in which it goes back to the server and begins the connection routine again as discussed above in connection with FIG. 6. If docking with a parent node is successful, then after step 144 node X performs step 154 in which the connection attempt counter is set to zero.

Figure 16:
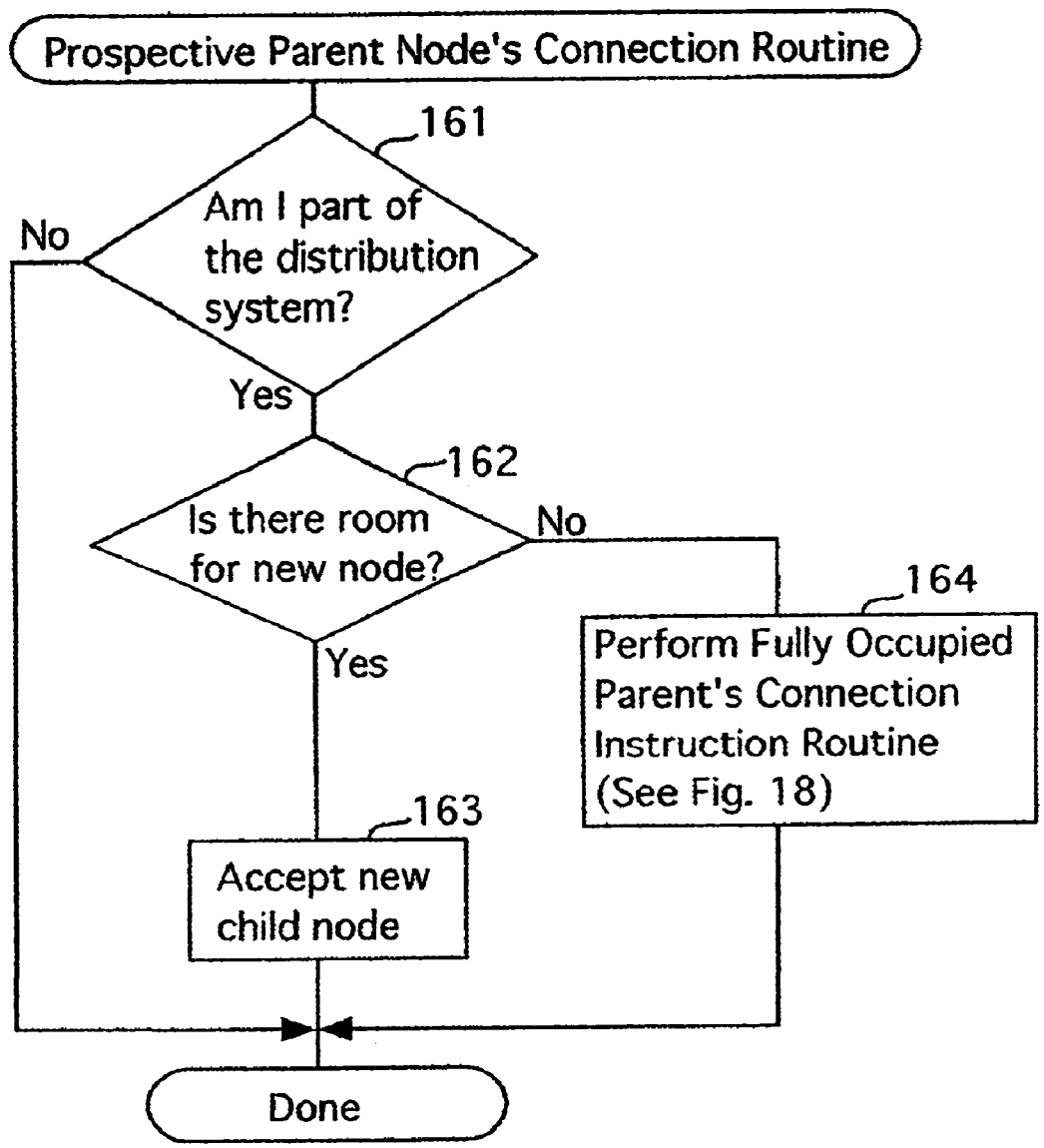
FIG. 16 is a flow diagram of an embodiment of the present invention illustrating a Prospective Parent Node's Connection Routine.

Referring now to FIG. 16, a flow diagram associated with this example illustrating the Prospective Parent Node's Connection Routine is shown. Using the example illustrated in FIGS. 6, 8 and 9, when node X queries node B in step 142 during the Prospective Child Node's Connection Routine, node B may begin performing the Prospective Parent Node's Connection Routine. In step 161, in response to node X's query, node B determines whether it is part of the distribution system node X seeks to join. If node B were not part of the distribution network, it would respond in the negative to node X's query and node B would be finished with the Prospective Parent Node's Connection Routine. In the example of FIG. 8, the answer is "yes" and node B proceeds to step 162.

In step 162 node B determines whether it has room for a new node. If the answer were "yes," node B would proceed to step 163 where it would allow node X to dock with it, and node B would begin transmitting to node X data (e.g., streaming media) originating from the server. In the example illustrated in FIG. 8, the answer is "no," and node B, acting as an instructing node, goes to step 164 where it performs the Fully Occupied Parent's Connection Instruction Routine (discussed below) and provides the prospective new child node (here node X) with a new connection address list. As noted above, the new connection address list may include the path back to the server through the node B (the prospective parent in this example) in the event that there are user node departures along the path, which departures may include node B.

After performing step 164 the temporary connection between node B and node X is terminated, and node X is sent on its way. In the example of FIGS. 8 and 9, the new connection address list is G-B-A-S. When node X approaches node G, node G performs the Prospective Parent Node's Connection Routine discussed above. In the example illustrated in FIGS. 8 and 9, node G allows node X to dock with it.

Referring now to a "Distribution Network Construction" example (which example is intended to be illustrative and not restrictive), it is noted that under this example the length of the distribution chains (i.e., the number of levels of user nodes linked through each other to the root server) is aimed to be kept as small as possible.

Assuming that all new user nodes have the same re-transmission capability (or disregarding the different re-transmission capabilities which different new user nodes may have), the user nodes would be distributed in this example through the first level until all the direct connection slots to the server were filled. Then as new user nodes sought connection to the distribution network, they would be assigned to connections with the first level nodes 12 until all the slots available on the first level nodes were filled. This procedure would be repeated with respect to each level as more and more new user nodes attempted to connect to the distribution network. In other words, the server, acting as an instructing node, would perform a Server's Connection Instruction Routine in which one step is determining whether there is room on the server for a new user node and, if so, the server would instruct the new user node to connect directly to the server. If there were no room on the server, then the server would perform the step of consulting its network topology database and devising a connection address list having the fewest number of connection links to a prospective parent user node. After performing the Server's Connection Instruction Routine, the server would either allow the new user node to dock directly with the server or send the new user node on its way to the first prospective parent user node on the connection address list.

In this example (which example is intended to be illustrative and not restrictive), a partially occupied potential parent node in a particular level (i.e., a prospective parent node already having a child but still having an available slot for an additional child node) may be preferred over unoccupied (i.e., childless) potential parent nodes on the same level. This may help to keep the number of interior nodes (i.e., the number of nodes re-transmitting data) to a minimum.

Alternatively, in another example (which example is intended to be illustrative and not restrictive), nodes that have zero children may be preferred over nodes that already have one child. While it is true that this may increase the number of repeat nodes, what the inventors have found is that by filling the frontier in an "interlaced" fashion, connecting nodes build up their buffers more quickly (allowing a reduction in the incidence of stream interruptions).

Figure 12A:
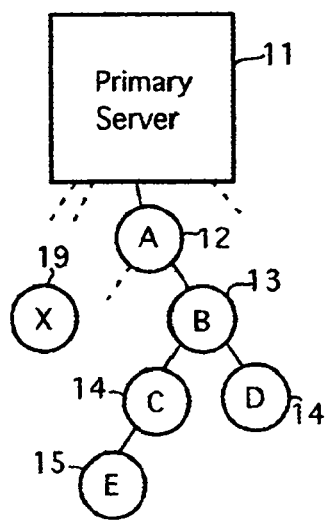
FIGS. 12A-12E are schematic drawings showing varying topologies of the computer information distribution network formed pursuant to an embodiment of the present invention under several circumstances.
Figure 12B:
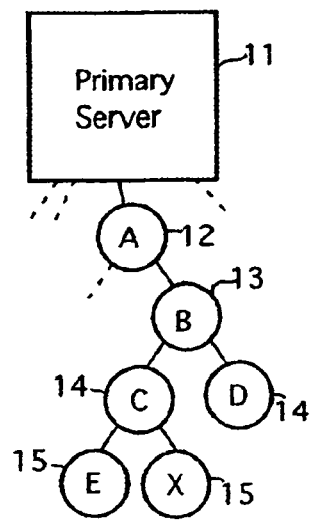
Figure 12C:
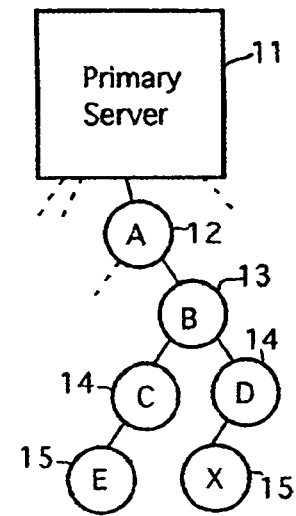

Referring now to FIGS. 12A-12C, these FIGS. illustrate, in this example, what happens when a partially occupied parent node is preferred over a parent childless node as a destination address for a new user node (assuming all other factors are equal). FIG. 12A is a schematic diagram associated with this example showing a topology wherein nodes C and D, both third level nodes 14, have remaining capacity for one or more child nodes. Server 11 has the choice of sending new user node X to either node C, as shown in FIG. 12B, or node D, as shown in FIG. 12C, without increasing the length of the longest chain in the distribution network. However, user nodes are free to leave the distribution network at any time. With the topology shown in FIG. 12C, if either of nodes C or D leaves the network, there would be an effect on a child node. With the topology shown in FIG. 12B, there is a significant chance that if one of nodes C and D leaves the network, there would be no impact on any child nodes. That is, if it is node D that leaves the network, there is no child which would be made an orphan.

Of note, in discussing the examples illustrated in FIGS. 6-9 and 12A-12C, it has been presumed that all of the user nodes are equally capable of simultaneously re-transmitting two copies of the content data. However, the user nodes actually joining a distribution network will have various capabilities for re-transmitting data. Some will have no reliable capability because of hardware limitations. Other user nodes will have high nominal capability because of their hardware and type of Internet connection, but may have low reliability because of poor line conditions or the vagaries of the desires of the humans actually using the user nodes. For example, a user node having a T1 or faster connection to the Internet has a significantly large bandwidth, but is not reliable if the user (or viewer) is merely sampling the content available on the distribution network.

As noted above, in one example the user nodes having the greatest reliable capability should be placed as high up in a distribution chain as possible (i.e., as far uptree as possible) because they would have the ability to support the greatest number of child nodes, grandchild nodes and so on.

Thus, to differentiate the reliable capabilities of user nodes, a number of factors may be considered. Examples of such factors (which examples are intended to be illustrative and not restrictive), include following:

One is time, that is, the number of seconds (or other units of time) since the node made its most recent connection to the network. Everything else being equal, a user node which has been continuously connected to the distribution network for a long period of time may be considered under this example to be likely more reliable (either because of line conditions or user interest) than a user node which has been continuously connected to the network for a short period of time.

Another factor is bandwidth rating, which may be determined, for example, by actual testing of the user node when it first attempts to connect to the server or a parent node (e.g., at initial connection time) or determined by the nominal bandwidth as determined by the type of connection made by the user node to the Internet. In one example (which example is intended to be illustrative and not restrictive), we will describe ratings based on nominal bandwidth as follows:

A user node with a 56 Kbits/sec dialup modem connection to the Internet is essentially useless for re-transmission of content data because of its small bandwidth. In this example, such a node is assigned a bandwidth rating of zero (0.0).

A user node with a cable modem or DSL (e.g., ADSL) connection to the Internet may be given, in this example, a bandwidth rating of one (1.0), because it is a common type of node and has a nominal upstream transmission bandwidth of 128 Kbits/sec, which is large enough to potentially re-transmit two acceptable quality copies of the content data it receives (assuming a 50 Kbit/sec content data stream). Such capability fits well into a binary tree topology.

A full rate ISDN modem connection nominally has an upstream bandwidth of 56 Kbits/sec and a downstream bandwidth of 56 Kbits/sec, which would potentially support acceptable quality re-transmission of a single copy of the content data stream (assuming a 50 Kbit/sec content data stream). For this reason, a user node with a full rate ISDN modem connection to the Internet may be given, in this example, a bandwidth rating of one-half (0.5), or half the rating of a user node connected to the Internet by a DSL (e.g., ADSL) or cable modem connection.

User nodes with T1 or greater links to the Internet should be able to support more (e.g. at least twice as many) streams as DSL (e.g., ADSL) or cable modems, and therefore may be given, in this example, a bandwidth rating of two (2.0). In the event that in a distribution network parent nodes may be assigned more than two child nodes directly connected thereto, bandwidth ratings greater than 2.0 may be assigned under this example to Internet connections having greater bandwidth than T1 connections.

In another example (which example is intended to be illustrative and not restrictive), other bandwidth networks (e.g., 50 Kbit/sec and 100 Kbit/sec) may be supported.

In another example, the bandwidth needed for a node to be "repeat capable" may depend on the particular network to which it is attached (upon initial connection the connecting node may first test its upstream bandwidth and then report that bandwidth to the network server; the server may determine whether the node is "repeat capable" or not.

In another example (which example is intended to be illustrative and not restrictive), a node may be deemed "repeat capable" if the node is not firewalled (e.g., port 1138 is open) and the node has sufficient bandwidth to retransmit two copies of the incoming stream.

A third factor is performance. A user node's performance rating may, in one example, be zero (0.0) if it is disconnected as a result of a Grandparent's Complaint Response Routine (discussed below in connection with FIG. 31). Otherwise, the user node's performance rating, in this example, may one (1.0).

Further, in this example (which example is intended to be illustrative and not restrictive), a user node's utility rating may determined by multiplying connection time by performance rating by bandwidth rating. That is, in this example:

Utility Rating=Time×Performance Rating×Bandwidth Rating.

Referring once again to FIG. 13, it is seen that in this example information regarding a user node's time connected to the network, bandwidth rating, performance rating, utility rating and potential re-transmission rating (discussed below) may be stored in the user node's elapsed time buffer 137, bandwidth rating buffer 138, performance rating buffer 139, utility rating buffer 121 and potential re-transmission rating buffer 122, respectively.

In another example (which example is intended to be illustrative and not restrictive), nodes entering the network may be judged to be either "repeat capable" or "non-repeat capable" (wherein non-repeat capable nodes may be called "bumpable" nodes). Repeat capability may be based on: (1) Upstream bandwidth (e.g., tested at initial connection); and (2) the firewall status, opened or closed, of a node. In one specific example, if a node is either firewalled or has upstream bandwidth less than (approx.) 2.5 times the video streaming rate, that node will be deemed bumpable. All nodes joining the network, whether bumpable or non-bumpable, may be placed as close to the server as possible. However, for the purpose of placement (as described for example in the Universal Connection Address Routine of FIG. 20), a repeat capable node can bump a bumpable node when being placed in the network.

Figure 17:
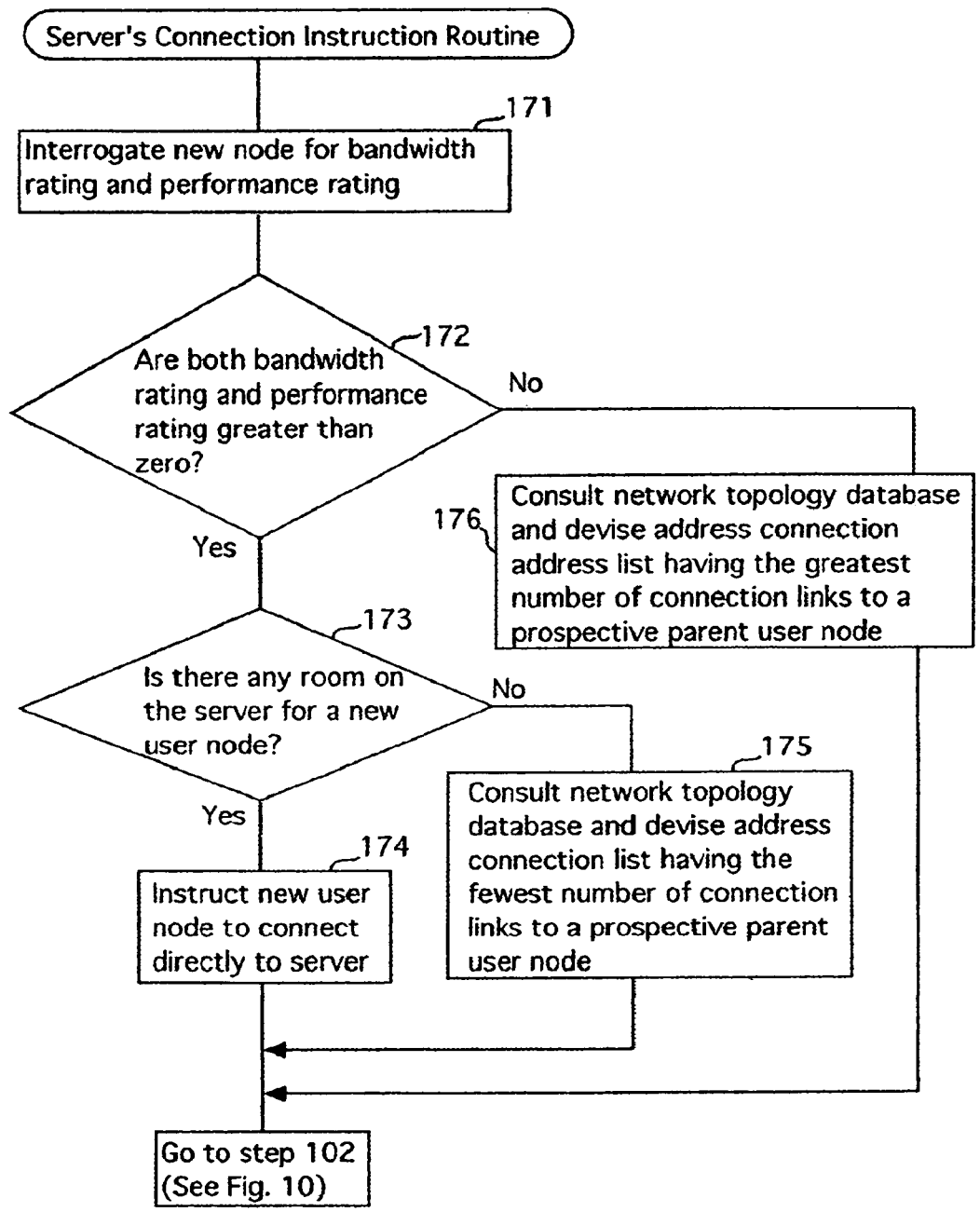
FIG. 17 is a flow diagram of an embodiment of the present invention illustrating a Server's Connection Instruction Routine.

Referring now to FIG. 17 a flow diagram associated with this example illustrating the Server's Connection Instruction Routine is shown. This routine need not necessarily rely on the new user node's utility rating. This routine may rely on the potential re-transmission rating of a user node, which is arrived at by multiplying the user node's performance rating by its bandwidth rating. That is, in this example:

Potential Re-transmission Rating=Performance Rating×Bandwidth Rating.

Thus, in this example, the server would want to put those user nodes with the highest potential re-transmission rating as close to the server in a distribution chain as possible (i.e., as high uptree as possible) because they have the greatest likelihood of being able to re-transmit one or more copies of content data. On the other hand, a potential re-transmission rating of zero in this example indicates that a user node has no ability to (or little expected reliability in) re-transmitting even one copy of content data (the server in this example would want to put a user node with a zero rating as far as reasonably possible from the server in a distribution chain (i.e., as low downtree as possible)). For the purpose of ease of discussion, in the flow diagram example of FIG. 17 illustrating the Server's Connection Instruction Routine, the server is concerned about whether the potential re-transmission rating is zero (i.e., either one or both of the performance rating and bandwidth rating is zero) or greater than zero (i.e., both the performance rating and the bandwidth rating are greater than zero).

In step 171 the server node interrogates the new user node (or connection requesting node) for its bandwidth rating and performance rating. If the new user node is really new to the distribution network, or if it has returned to the server because all of the user node's ancestor nodes have disappeared from the network, the new user node's performance memory will contain, in this example, a performance rating of 1.0 (e.g., the default rating). However, if the new user node has been dispatched to the server for a new connection to the network because the new user node had failed to provide content data to one of its child nodes, then, in one example, its performance memory will contain a performance rating of zero.

In step 172, the server determines, in this example, whether the potential re-transmission rate of the connection requesting node is greater than zero (i.e., whether both the bandwidth rating and the performance rating are greater than zero, or, if only the bandwidth rating is considered, whether the bandwidth rating is greater than zero (i.e., the connection requesting node is a high-bandwidth node)). If the answer is "yes," then the server goes to step 173 in which the server determines whether it has room for the new user node. If the answer to the query in step 173 is "yes," then the server goes to step 174 in which it instructs the new user node to connect directly to the server. Then the server goes to step 102 in the Server's Connection Routine (see FIG. 10).

If the answer to the query in step 173 is "no" (i.e., the server does not have the capacity to serve the new user node directly), then the server goes to step 175. In step 175, the server, acting as an instructing node, consults its network topology database and devises a connection address list having the fewest number of connection links to a prospective parent node. That is, the server checks its information regarding the nodes in the level closest to the server (i.e., the highest uptree) to determine whether there are any potential parent nodes with space available for the new user node. If there are no potential parent nodes with space available, then the database is checked regarding nodes in the level one link further from the server, and so on until a level is found having at least one potential parent node with space available for the new user node. That is, the server determines which parent node with unused capacity for a child node is closest to the server (i.e., in the highest level, with the first level being the highest), and devises the connection address list from such prospective parent node to the server. The server then goes to step 102 (shown in FIG. 10).

In another embodiment of the invention, the server could skip step 172 and go directly to step 173 (or it could go to step 172 and, if the answer to the query in step 172 is "no" (i.e., either one or both of the bandwidth rating and the performance rating are zero, or, if only the bandwidth rating is considered, whether the bandwidth rating is zero (i.e., the connection requesting node is a low-bandwidth node)), the server could go to step 175). However, this could prevent the server from loading up the highest levels of the distribution chains with nodes capable of re-transmitting at least one acceptable copy of the content data (in contrast to if the server does perform step 172 and does goes to step 176 if the answer to the query in step 172 is "no.").

In step 176 the server consults its network topology database and devises a connection address list having the greatest number of connection links to a prospective parent node. That is, the server checks its information regarding the nodes in the level furthest from the server (i.e., the lowest downtree) to determine whether there are any potential parent nodes with space available for the new user node. If there are no potential parent nodes with space available, then the database is checked regarding nodes in the level one link closer to the server, and so on until a level is found having at least one potential parent node with space available for the new user node. In this manner, user nodes having limited or no reliable re-transmission capability may be started off as far from the server as possible and will have a reduced effect on the overall capacity of the distribution network.

Figure 12D:
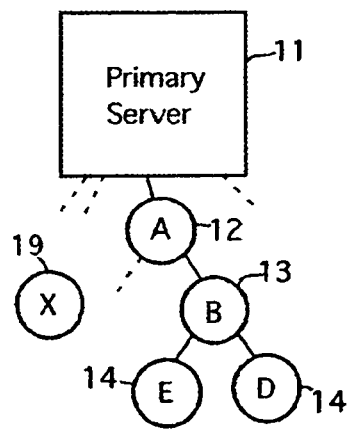

As indicated above, and as discussed more fully below, one or more reconfiguration events may have transpired since the server's topology database was last updated. As a result, the first prospective parent node which is actually present on the distribution network for the new user node to contact may not have room for the new user node. By way of example (which example is intended to be illustrative and not restrictive), when node X tries to join the distribution network having the topology shown in FIG. 12A, the server provides node X with the following connection address list: C-B-A-S. If node C had disappeared from the network between the last update of the server's topology database and node X's attempting to contact node C, then node E, by virtue of a reconfiguration event, would be connected, in this example, to node B as shown in FIG. 12D. Then node X, in performing the Prospective Child Node's Connection Routine discussed in connection with FIGS. 14 and 15, would contact node B. Node B, in the Prospective Parent Node's Connection Routine, discussed in connection with FIG. 16, would have to answer the query of step 162 in the negative and go to step 164, in which it performs the Fully Occupied Parent's Connection Instruction Routine.

Figure 18:
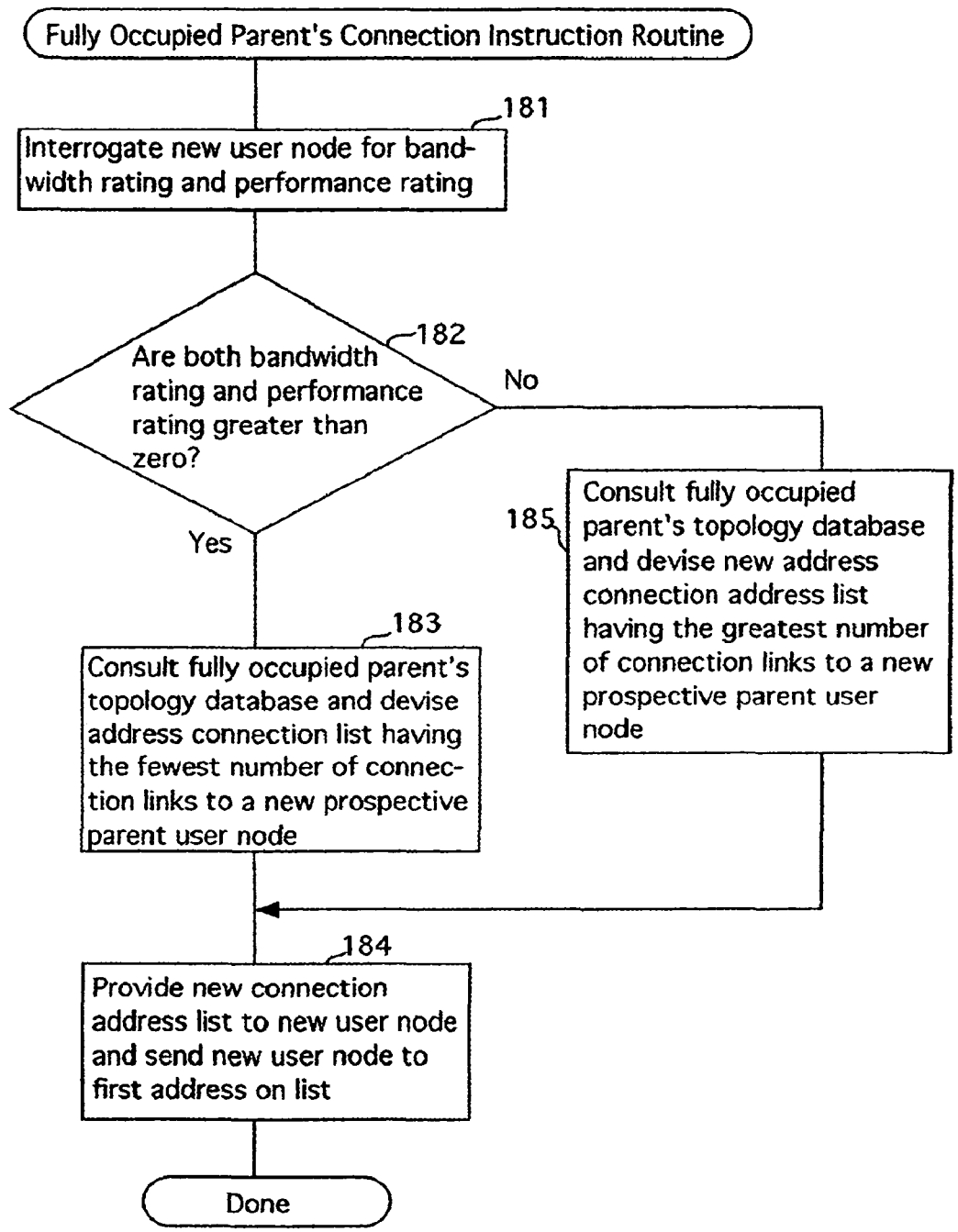
FIG. 18 is a flow diagram of an embodiment of the present invention illustrating a Fully Occupied Parent's Connection Instruction Routine.

Referring now to FIG. 18, a flow diagram associated with this example illustrating that routine is shown. It is similar to the Server's Connection Instruction Routine. Since the fully occupied parent node has already determined that it has no room for the new user node (or connection requesting user node), the Fully Occupied Parent's Connection Instruction Routine does not need to include a step in which a determination is made regarding whether there is room for the new user node (or connection requesting node). In the Fully Occupied Parent's Connection Instruction Routine the fully occupied parent node, acting as an instructing node, first performs step 181 in which it interrogates the new user node for its bandwidth rating and performance rating. In step 182, the fully occupied parent node determines whether the potential re-transmission rate of the new user node is greater than zero. (If only the bandwidth rating is considered, then it determines whether the bandwidth rating is greater than zero (i.e., the connection requesting node is a high-bandwidth node).) If the answer is "yes," then the fully occupied parent node goes to step 183 in which the fully occupied parent node consults its topology database, which contains the latest information available to that node regarding the links from the fully occupied parent node back to the server and regarding the fully occupied parent node's own progeny (i.e., its children, grandchildren etc.,) and devises a new connection address list having the fewest number of connection links to a new prospective parent node. That is, the fully occupied parent node checks its information regarding the nodes in the level closest to the fully occupied parent node (but not closer to the server) to determine whether there are any potential parent nodes with space available for the new user node. If there are no potential parent nodes with space available, then the database is checked regarding nodes in the level one link further from the fully occupied parent node (and further from the server), and so on until a level is found having at least one potential parent node with space available for the new user node. That is, the fully occupied parent node determines which new prospective parent node with unused capacity for a child node is closest to the fully occupied parent node, and devises the connection address list from such new prospective parent node through the fully occupied parent node and on to the server. The fully occupied parent node then goes to step 184 in which it provides the new user node with the new connection address list and disconnects the new user node from the fully occupied parent.

If the answer to the query in step 182 is no (i.e., either (i) one of the bandwidth rating and performance rating is zero or (ii) if only the bandwidth rating is considered, the bandwidth rating is zero (i.e., the connection requesting node is a low-bandwidth node)), the fully occupied parent node goes to step 185. In step 185 the fully occupied parent node consults its network topology database and devises a connection address list having the greatest number of connection links to a new prospective parent node. That is, the fully occupied parent node checks its information regarding the nodes in the level furthest from it (and farther from the server than it is) to determine whether there are any potential parent nodes with space available for the new user node. If there are no potential parent nodes with space available, then the database is checked regarding nodes in the level one link closer to the fully occupied parent node, and so on until a level is found having at least one potential parent node with space available for the new user node. As discussed above, this helps assure that new user nodes having limited or no reliable re-transmission capability are started off as far from the server as possible. After the fully occupied parent node devises the connection address list from such new prospective parent node through the fully occupied parent node and on to the server, the fully occupied parent node then goes to step 184 where it performs as discussed above.

In another embodiment of the invention, the distribution software could be designed such that a fully occupied parent performs an abbreviated Fully Occupied Parent's Connection Instruction Routine, in which steps 181, 182 and 185 are not performed. That is, it could be presumed that the server has done the major portion of the work needed to determine where the new user node should be placed and that the fully occupied parent user node need only redirect the new user node to the closest available new prospective parent. In such event, only steps 183 and 184 would be performed.

In the example discussed above in which node C had disappeared from the network when new user node X had been given, by the server, connection address C-B-A-S, and in which node B is a fully occupied parent node as shown in FIG. 12D, node B would appear to have the choice of devising either connection address list D-B-A-S or E-B-A-S regardless of whether the full or abbreviated Fully Occupied Parent's Connection Instruction Routine were performed.

Figure 19:
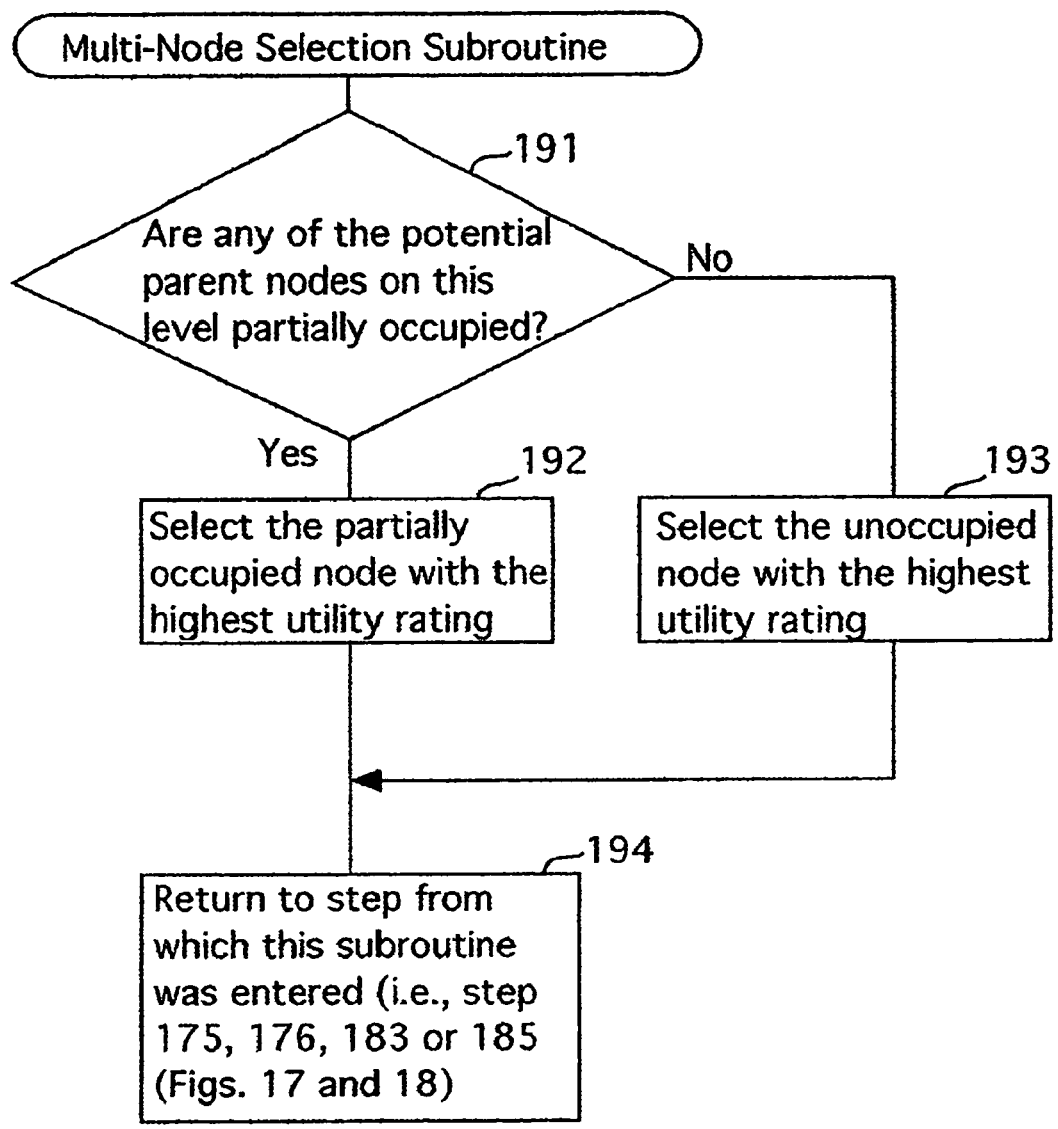
FIG. 19 is a flow diagram of an embodiment of the present invention illustrating a Multi-Node Selection Subroutine.

In this regard, to determine which connection address list to choose when there are two or more prospective parent nodes in a particular level having space for a new user node, the distribution software could have an additional subroutine as part of steps 175, 176, 183 and 185. An example of this subroutine, called the Multi-Node Selection Subroutine is illustrated in FIG. 19.

In step 191 the server or fully occupied parent node deciding where to send a new user node determines whether any of the potential new parent nodes is partially occupied. As discussed earlier, in one example a partially occupied potential parent node may be preferred over an unoccupied potential parent node. In this case, if any of the potential parent nodes is partially occupied, then the server or fully occupied parent node goes to step 192. In step 192 the partially occupied prospective parent node with the highest utility rating is selected as the new prospective parent node. If there were only a single partially occupied potential parent node, then that node is selected.

If in step 191 it is determined that there are no partially occupied potential parent nodes, then the server or fully occupied parent node goes to step 193. In step 193 the unoccupied prospective parent node with the highest utility rating is selected as the new prospective parent node.

In another example (which example is intended to be illustrative and not restrictive), the software engineer could have step 193 follow an affirmative response to the query in step 191 and step 192 follow a negative response; in such event, unoccupied prospective parent nodes would be selected ahead of partially occupied prospective parent nodes (all other things being equal, it may be advantageous to select nodes that have zero children over nodes that already have one child; while it is true that this may increase the number of repeat nodes, what the inventors have found is that by filling the frontier in an "interlaced" fashion, connecting nodes build up their buffers more quickly (allowing a reduction in the incidence of stream interruptions).

After whichever of steps 192 and 193 is completed, the server or fully occupied parent node returns to the step from which it entered the Multi-Node Selection Subroutine (i.e., step 175, 176, 183 or 185), and completes that step.

Figure 12E:
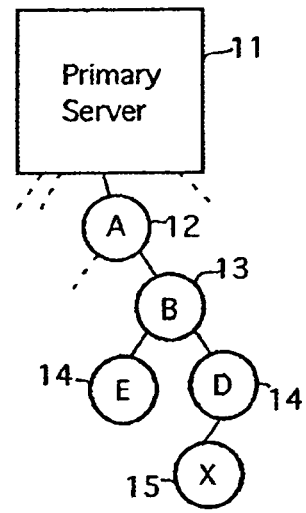

So, in the example shown in FIG. 12D, where node C left the network thereby leaving node B with the chore of devising a new connection address list for node X, node B would perform the Fully Occupied Parent's Connection Instruction Routine. Regardless of the bandwidth and performance ratings of node X, node B would be choosing between nodes D and E in the third level. In step 191 node B would determine that neither D nor E is partially occupied, and therefore node B would go to step 193. Assuming that nodes E and D have equal bandwidth and performance ratings and that node D was connected to the network longer than node E, node D would be selected because it would have the higher utility rating since it was connected to the network longer than node E. Node B would then go to step 194 and then return to the step from which it entered the Multi-Node Selection Subroutine. When node B returns to step 183 or 185, it completes that step and moves on to step 184. In that step, node B provides new user node X with new connection address list D-B-A-S and node X connects to the distribution network as shown in FIG. 12E.

Referring now to an "Alternative Distribution Network Construction" example (which example is intended to be illustrative and not restrictive), it is noted that under this example the length of the distribution chains (i.e., the number of levels of user nodes linked through each other to the server) is aimed to be kept as small as possible.

Also under this example, user nodes having the highest bandwidth capabilities are aimed to be kept closer to the server (e.g., in order to allow the greatest expansion of the distribution system). However, it is possible that zero bandwidth rated nodes may nevertheless appear relatively far uptree (thereby stunting the growth of that chain). The following method may be used in constructing the distribution network both by servers and by prospective parents which are actually completely occupied, either of which may be thought of as an instructing node (that is, software enabling the routines discussed below could be installed on servers and user nodes alike).

More particularly, in the distribution system of this example, each child node reports directly to (or is tested by) its parent node with respect to information relating to the child node's bandwidth rating, performance rating, potential re-transmission rating and utility rating. In turn, each parent node reports all the information it has obtained regarding its child nodes on to its own parent node (a parent node also reports to each of its child nodes the address list from that parent back to the server, which list forms what may be referred to as the ancestor portion of the topology database—in addition, a parent node reports to each of its child nodes the addresses of their siblings). The reports occur during what may be referred to as a utility rating event. Utility rating events may occur, for example, on a predetermined schedule (e.g., utility rating events may occur as frequently as every few seconds). As a result of all the reporting, each node stores in its topology database the topology of the tree (including all its branches) extending below that node, and the server stores in its topology database the topology of all the trees extending below it. This may be referred to as the descendant portion (or descendant database) 133 of the topology database (see FIG. 13). The descendant database of a particular node may include a descendant list, a list of the addresses of all the nodes cascadingly connected below that particular node. Included in the topology database information may be the utility ratings of the nodes below the node in which that particular topology database resides.

After each reporting event in this example, each parent node (including the server), acting as an instructing node, devises two lists of prospective (or recommended) parent nodes. In this example, the first list, or Primary Recommended Parent List ("PRPL"), stored in the Primary Recommended Parent List buffer 123 (see FIG. 13), lists all the nodes in the descendant portion of that node's topology database which have bandwidth available to support another child node (in one example (which example is intended to be illustrative and not restrictive), in a binary tree system, all nodes in the descendant portion of the topology database having (i) a bandwidth rating of at least one and (ii) less than two child nodes would be listed). They would be listed with those node's which are closest to the node in which that particular topology database resides at the top of the list, and those nodes which are in the same level would be ranked such that the node with the highest utility rating would be listed first, the node with the second highest utility rating would be listed second and so on. By way of example (which example is intended to be illustrative and not restrictive), the PRPL of a second level node would list a third level node with available bandwidth ahead of a fourth level node with available bandwidth even if the fourth level node's utility rating were higher than that of the third level node.

The second list in this example, or Secondary Recommended Parent List ("SRPL"), stored in the Secondary Recommended Parent List buffer 124 (see FIG. 13), lists all the nodes in the descendant portion of that node's topology database which have the ability to re-transmit content data to child nodes but are fully occupied, and at least one of its child nodes is incapable of re-transmitting content data to another child node (in one example (which example is intended to be illustrative and not restrictive), in a binary tree system, all nodes in the descendant portion of the topology database having (i) a bandwidth rating of at least one and (ii) at least one child node having a bandwidth rating less than one (i.e., being incapable of re-transmitting content data to two child nodes) would be listed). Like the nodes in the PRPL, the nodes in the SRPL would be listed with those node's which are closest to the node in which that particular topology database resides at the top of the list, and those nodes which are in the same level would be ranked such that the node with the highest utility rating would be listed first, the node with the second highest utility rating would be listed second and so on.

Of note, in this example the SRPL lists those parent nodes having the growth of their branches (i.e., their further progeny) blocked or partially blocked by a low-bandwidth child node. This may lead to an unbalanced growth of the distribution system, and a limitation on the total capacity of the system.

Of further note, to the extent that a node (including a server) has room for another child node or is the parent of a low bandwidth node, it may be listed on its own PRPL or SRPL.

Figure 20A:
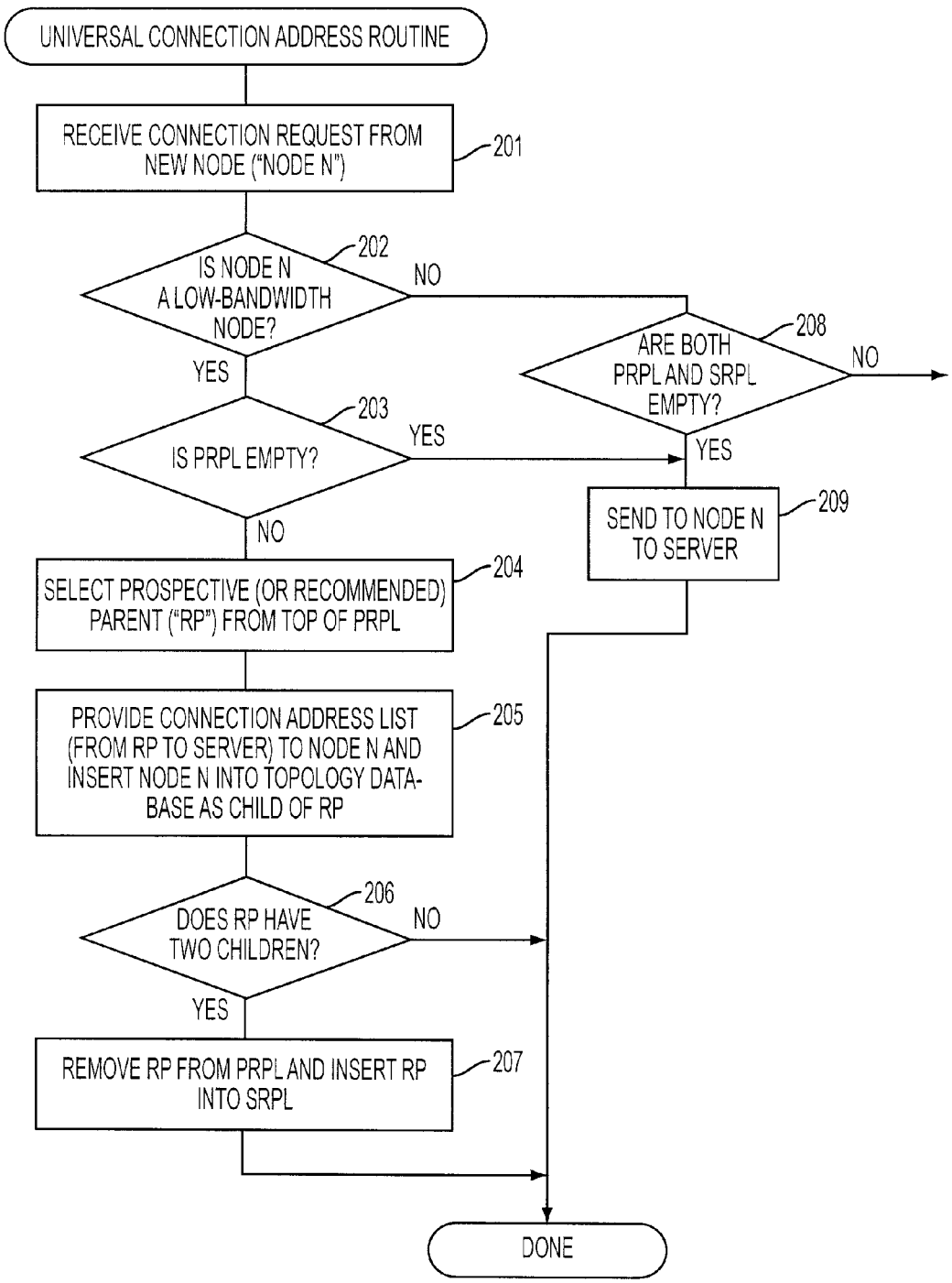
FIGS. 20A and 20B are together a flow diagram of an embodiment of the present invention illustrating a Universal Connection Address Routine.
Figure 20B:
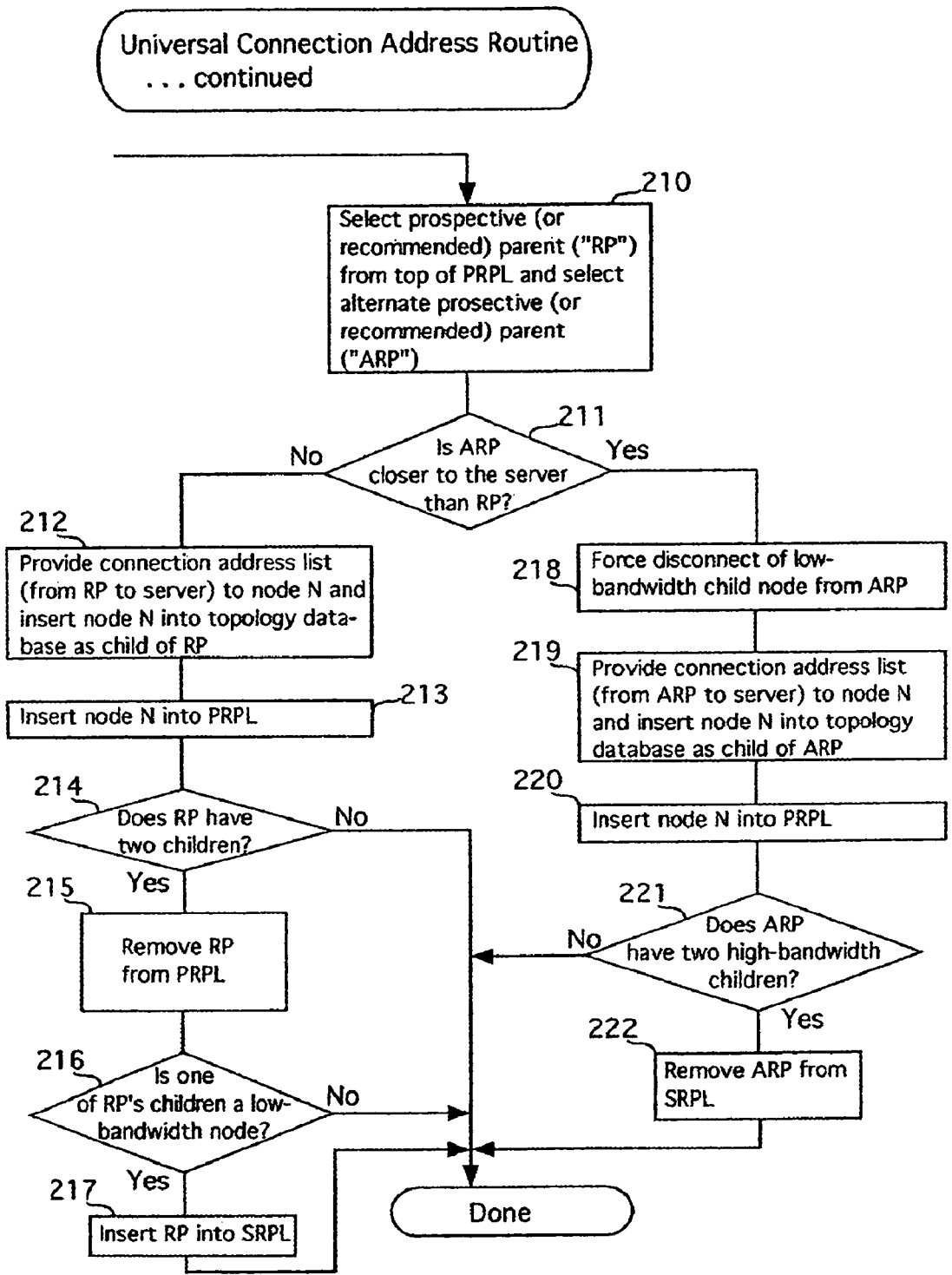

Referring now to FIGS. 20A and 20B, an example flow diagram illustrating what may be referred to as the Universal Connection Address Routine is shown. As indicated above, a server or a fully occupied prospective parent node receiving a connection request may be referred to as an "instructing node." When a new node (here node N) approaches an instructing node, the instructing node performs step 201, it receives a connection request. It then goes to step 202 in which it interrogates or tests node N to determine whether it is a low-bandwidth node ("low-bandwidth" may mean, for example, either or both: (1) a node that is incapable of broadcasting two copies of its incoming stream on to its children; and (2) a node that is incapable of rebroadcasting its stream because it is firewalled). In the binary tree system of one example, a low-bandwidth node is a node with a bandwidth rating less than one. If node N is a low bandwidth node, the instructing node proceeds to step 203 in which the instructing node determines whether there are any available prospective parent nodes which are not fully occupied. Sometimes the distribution network may be fully occupied. If it is, the instructing node's PRPL will be empty. If it is empty, the response to the query in step 203 would be yes. Then the instructing node goes to step 209 in which the new node is sent back to the server to start the connection process from the beginning. If the response to the query in step 203 is no, then the instructing node goes to step 204 in which it selects a prospective (or recommended) parent node for node N. The instructing node then moves on to step 205 in which it consults its topology database and devises a connection address list from the recommended parent node back to the server, and provides such connection address list to node N. (If the instructing node is a user node, then the connection address list leads back to the server through the instructing node.) At this point, node N performs the Prospective Child Node's Connection Routine discussed above in connection with FIG. 14.

As part of step 205, the instructing node inserts node N into its topology database as a child of the recommended parent node. It does this because other new nodes may seek connection instructions prior to the next utility rating event (i.e., before reports providing updated information regarding the topology of the distribution network are received by the instructing node), and such new nodes should not be sent to a prospective parent which the instructing node could know is fully occupied. In this regard, the instructing node then goes to step 206 in which it checks its topology database to determine whether the recommended parent, with node N presumptively docked to it as a child node, is fully occupied (in the example here of a binary tree network, whether it has two child nodes). If the answer is no, then the instructing node has finished this routine. If the answer is yes, then the instructing node goes to step 207 in which it removes the recommended parent from the PRPL and inserts it into the SRPL, and the instructing node has finished the routine.

If the answer to the query in step 202 is no (e.g., node N is not a low-bandwidth node; in the binary tree network example it is a high-bandwidth node capable of re-transmitting content data to two child nodes), the instructing node moves on to step 208. There it determines whether both the PRPL and SRPL are empty (which may occur under certain circumstances, such as, for example, when the number of levels in a distribution system is capped and at least all the nodes on all but the last level are fully occupied with high-bandwidth nodes). If so, the instructing node goes to step 209 in which the new node is sent back to the server to start the connection process from the beginning. If the response to the query in step 208 is no, then the instructing node goes to step 210 in which it selects a prospective (or recommended) parent node for node N from the PRPL and an alternate recommended parent node from the SRPL (if either the PRPL or SRPL is empty, the instructing node will make a "nil" selection from that list—the instructing node knows from step 208 that at least one of the lists will not be empty). The instructing node then goes to step 211 in which it determines whether the alternate recommended parent node is closer to the server (i.e., higher uptree) than the recommended parent node derived from the PRPL. If the alternate recommended parent node is on the same level as, or on a lower level than the recommended parent node derived from the PRPL (or if the selection from the SRPL is nil), then the answer to the query in step 211 is no.

In such event, the instructing node goes to step 212 in which it consults its topology database and devises a connection address list from the recommended parent node back to the server, and provides such connection address list to node N (if the instructing node is a user node, then the connection address list leads back to the server through the instructing node).

As in step 205 discussed above, at this point, node N performs the Prospective Child Node's Connection Routine discussed above in connection with FIG. 14, and in step 212, the instructing node inserts node N into its topology database as a child of the recommended parent node.

The instructing node moves to step 213 in which it adds node N to an appropriate position on the PRPL. It does this because, as a result of step 202, it knows that the node N is capable of re-transmitting content data to its own child nodes.

The instructing node then goes to step 214 in which it checks its topology database to determine whether the recommended parent, with node N presumptively docked to it as a child node, is fully occupied (in the example here of a binary tree network, whether it has two child nodes). If the answer is no, then the instructing node has finished this routine. If the answer is yes, then the instructing node goes to step 215 in which it removes the recommended parent from the PRPL because it is now deemed to not be an available prospective parent node.

Then the instructing node goes to step 216 in which it consults its topology database to determine whether any of the recommended parent node's children is a low-bandwidth node (in this example, knowing that node N is not a low-bandwidth node and knowing that the recommended parent node has two child nodes, the question is whether the child node other than node N is a low-bandwidth node.) If the answer is no (i.e., all the recommended parent node's children are high-bandwidth nodes), then the instructing node has finished the routine.

If the answer is yes, then the growth of the recommended parent node's line of progeny is partially blocked by a low-bandwidth child node. The instructing node moves on to step 217 in which it adds the recommended parent to the SRPL.

If the answer to the query in step 211 is yes (i.e., the alternate recommended parent (selected from the SRPL) is: (i) on a higher level than the recommended parent (selected from the PRPL) or (ii) the selection from the PRPL is nil), then the instructing node moves to step 218. In that step the instructing node consults its topology database to determine: (i) which of the alternate recommended parent node's child nodes is a low-bandwidth node or (ii) if they both are low-bandwidth nodes, which of the child nodes has been connected to the system a shorter period of time. In one example (which example is intended to be illustrative and not restrictive), the instructing node may send a disconnect signal to that child node with instructions to return to the server to start the connection process from the beginning (as a new user node (or connection requesting user node)). In another example (which example is intended to be illustrative and not restrictive), the bumped node may climb its path to its grandparent which gives it a new connection path—rather than returning to the root server (doing so typically means that the incoming node that bumped the non-repeat-capable node ends up being that node's new parent).

The instructing node moves on to step 219 in which it consults its topology database and devises a connection address list from the alternate recommended parent node back to the server, and provides such connection address list to node N (if the instructing node is a user node, then the connection address list leads back to the server through the instructing node).

As in steps 205 and 212 discussed above, at this point, node N performs the Prospective Child Node's Connection Routine discussed above in connection with FIG. 14, and in step 219, the instructing node inserts node N into its topology database as a child of the alternate recommended parent node.

The instructing node moves to step 220 in which it adds node N to an appropriate position on the PRPL. It does this because, as a result of step 202, it knows that the node N is capable of re-transmitting content data to its own child nodes.

The instructing node then goes to step 221 in which it checks its topology database to determine whether all the child nodes of the alternate recommended parent are high-bandwidth nodes. If the answer is no, then the instructing node has finished this routine. If the answer is yes, then the instructing node goes to step 222 in which it removes the alternate recommended parent from the SRPL because it is now deemed to not be an available alternative prospective parent node since the growth of its progeny line is not even partially blocked by one of its own children. At this point the instructing node has finished the routine.

With the routines discussed in connection with the above examples, the distribution network will be built with each new node assigned to the shortest tree (or chain), and those with the fewest number of links between it and the server. However, low-bandwidth nodes, which would tend to block the balanced growth of the distribution network, would be displaced by high-bandwidth nodes and moved to the edges of the network where they would have reduced effect on the growth of the network.

Figure 21:
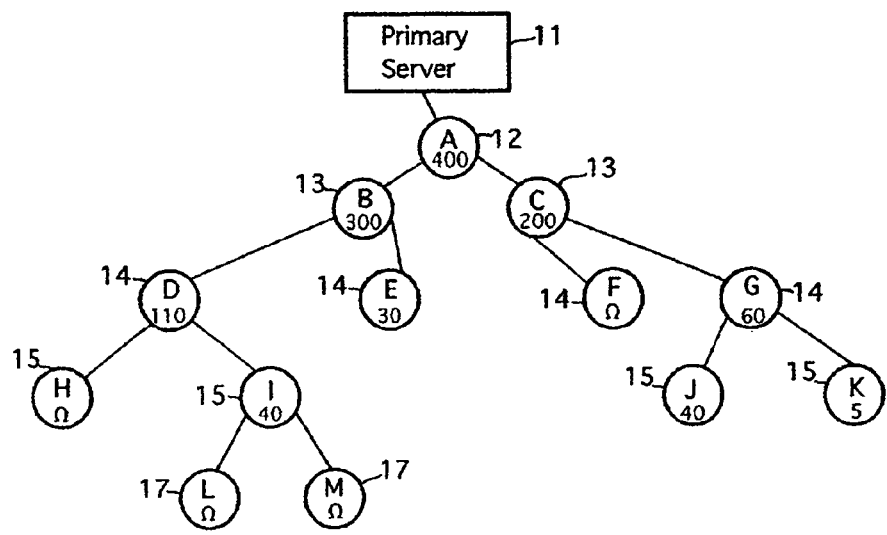
FIG. 21 is a schematic drawing of a topology of a computer information distribution network of an embodiment of the present invention before a new node will be added using the Universal Connection Address Routine.

Referring now to FIG. 21, this FIG. may be used as an example to illustrate how the Universal Connection Address Routine works. It shows primary server 11 with node A as first level node 12, its child nodes B and C as second level nodes 13, their child nodes D, E, F and G as third level nodes 14, node D and G's child nodes H, I, J and K as fourth level nodes 15, and node I's child nodes L and M as fifth level nodes 17. Assume for this example that all available docking links directly to the server 11 are occupied by high-bandwidth nodes, and that all trees are at full capacity other than that rooted to the server 11 through first level node A. The utility rating for each node is set forth in FIG. 21 under its letter designation. Low-bandwidth nodes (in this example, those nodes having a bandwidth rating less than one) are shown with a bandwidth rating of "Ω," which indicates in this example that such nodes will not have any child nodes assigned to them. Nodes A, B, C, D, E, G, I, J and K are high-bandwidth nodes (or repeater nodes (i.e., they are capable of re-transmitting the content data they receive from their respective parent nodes to their respective child nodes, if any)).

A new user node (or other connection requesting user node), here referred to as "node N", may be directed to node A as a result of various reconfiguration events. When node A receives a connection request from node N, node A will, in this example, either consult both of its PRPL and SRPL buffers, if node N is a high-bandwidth node, or consult just its PRPL buffer (if node N is a low-bandwidth node).

Nodes F, H, L, and M will not appear on any list in this example since they are low-bandwidth nodes. Nodes B, C, D, G, I and A itself will not appear on the PRPL in this example since these nodes are fully occupied. However, nodes C, D, and I will appear on the SRPL in this example because they each have at least one low bandwidth child node.

Using the rules discussed above (i.e., ranking prospective parent nodes by level and within levels by utility rating) the PRPL would be as follows in this example:

PRPL
    E (a third level node with available capacity)
        J (the fourth level node with available capacity having the highest utility rating)
        K (a fourth level node with available capacity)

The SRPL in this example would be as follows:

SRPL
    C (the fully occupied second level node with a low-bandwidth child node)
    D (the fully occupied third level node with a low-bandwidth child node)
    I (the fully occupied fourth level node with a low-bandwidth child node)

If node N is a low-bandwidth node, node A will give, in this example, node N the following as its new connection address list:

E-B-A-S.

Since node E would not have two child nodes, it would remain on the PRPL.

If node N is a high-bandwidth node, node A will compare (step 211 of FIG. 20B) the first node on the PRPL (the recommended parent node) with the first node on the SRPL (the alternate recommended parent node). Here, node C, the first node on the SRPL is a higher level node than node E, the first node on the PRPL. So, node A will send a disconnect signal (step 218 of FIG. 20B) to node F, node C's low-bandwidth child node. Then it will provide node N with the following new connection address list and add node N to the PRPL (step 219 of FIG. 20B):

C-A-S.

Since node C would now have two high-bandwidth child nodes (nodes N and G), node C would be removed from the SRPL (step 222 of FIG. 20B).

Further, in this example wherein node N is a high-bandwidth node, when node F returns to the server 11 (or, in another example, goes to Node A) for a new connection, the server (or Node A) will also use the Universal Connection Address Routine (Node F may go to Node A rather than the server because (in one example) when a node is "kicked" it may climb its internal connection path rather than jumping directly to the root server). Since node F is a low-bandwidth node, the server (or Node A) will give node F the following as its new connection address list:

E-B-A-S.

Figure 22:
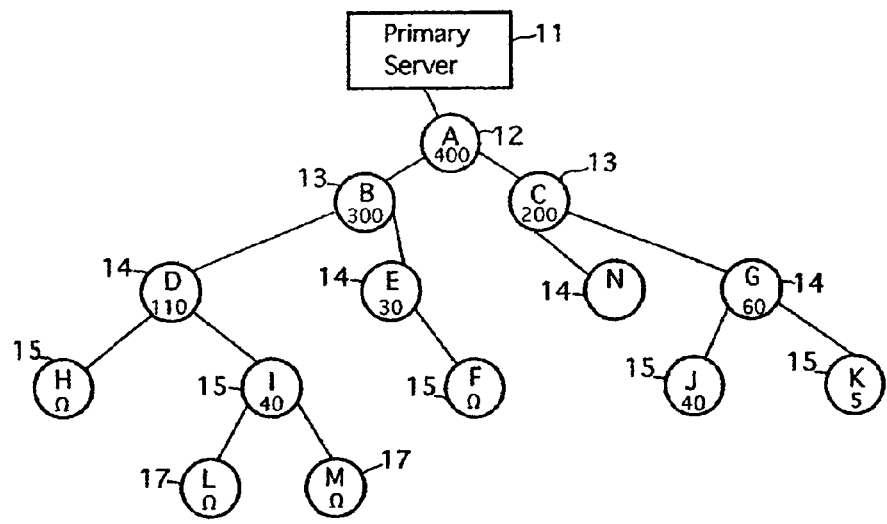
FIG. 22 is a schematic drawing of a topology of the computer information distribution network of an embodiment of the present invention when a new node is added using the Universal Connection Address Routine.

FIG. 22 illustrates the new topology. As can be seen, absent intervening events, low-bandwidth node F will end up moving down from the third level to the fourth level and the bandwidth capacity of the third level will increase from six child nodes to eight (its maximum in this binary tree example). The potential bandwidth capacity of the fourth level would also increase, from ten child nodes to twelve.

Referring now to a "Distribution Network Reconfiguration" example (which example is intended to be illustrative and not restrictive), it is noted that under this example the user nodes are free to exit the distribution network at will. And, of course, user nodes may exit the distribution network due to equipment failures between the user node and the communication network (the Internet in the examples discussed herein). This was first discussed in connection with FIGS. 10A-E.

Figure 23:
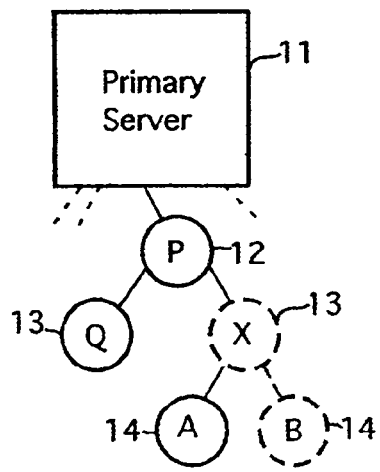
FIG. 23 is a schematic drawing of a topology of a computer information distribution network of an embodiment of the present invention before a reconfiguration event.
Figure 24:
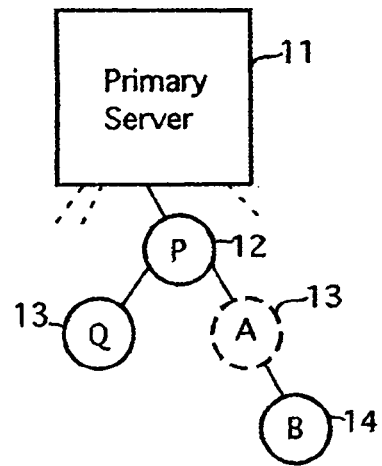
FIG. 24 is a schematic drawing of a topology of a computer information distribution network of an embodiment of the present invention shown in FIG. 23 after a reconfiguration event.

Under this example the present invention may handle the reconfiguration required by a user node departure by having certain user nodes in the same tree as the departing node perform a Propagation Routine. The results of the propagation routine of this example are illustrated in FIGS. 23 and 24. There a tree rooted to the server through first level user node P is illustrated. Node P has two child nodes, second level nodes Q and X. Through node X, P has two grandchild nodes, third level nodes A and B. Based on the relative utility ratings of nodes Q and X, P has sent signals to its children instructing them to set the color of the flag represented by the information in their respective reconfiguration flag buffers to "green" and "red," respectively. The use of colors as designators is merely discretionary. In reality they represent relative ratings of siblings for purposes of determining their roles in a reconfiguration event, and may be referred to as "propagation ratings." In addition, instead of colors, numbers (e.g., 1 and 2) could be used, as well as any of many other nomenclature schemes to describe the grades of propagation ratings. The "red" "green" ratings discussed herein shall be deemed representative of all such schemes. The number of grades of propagation ratings assigned by a parent node may be equal to the number of children each parent node has. For example, for a branch factor "n" system, the maximum number of grades of propagation ratings may be "n." Since the distribution network in the examples discussed herein is a binary tree distribution network, a parent node will be required to assign at most up to two grades of propagation ratings.

In the example shown in FIG. 23, node P, during the most recent utility rating measurement event, discerned that node Q has a higher utility rating than node X, and therefore P has assigned node Q a green rating, represented by the solid-lined circle surrounding the letter Q in FIG. 23. P has assigned node X a red rating, represented by the dashed-lined circle surrounding the letter X in FIG. 23. In a similar manner, node X has assigned green and red ratings to third level nodes A and B, respectively. In this example (which example is intended to be illustrative and not restrictive), at the same time that a parent node assigns a propagation rating to a child node, it may also provide to such child node the address of the child node's sibling, if there is any. A child node may store information about its sibling (or siblings) in the sibling portion (or sibling database) 134 of its topology database (see FIG. 13). The sibling database includes a sibling list, a list of the addresses of a node's siblings (the data relating to the siblings' addresses may also contain information regarding the propagation ratings of the siblings (e.g., in the event that the distribution system has a branch factor greater than two)). In the example shown in FIG. 23, nodes Q and X know that they are each other's siblings and nodes A and B know that they are each other's siblings.

In another example (which example is intended to be illustrative and not restrictive), nodes do not store information about their siblings. In other words, in this example, a node generally does not know who its sibling is. Instead, cross connections between a red node and its green sibling are implemented via a "priority join" message sent to a red child that includes the IP address of the green sibling as the first entry in the connection path list.

In the event that node X were to leave the distribution network, nodes A and B would of course stop receiving content data from node X. Nodes A and B would consult their topology databases for the address of their grandparent, and each would interrogate node P for instructions. Since node X is out of the distribution network, node P would send out a reconfiguration event signal (sometimes referred to as a "propagation signal") to the nodes which had been node X's children (i.e., the nodes which were node P's grandchildren through node X) and node P would send an upgrade propagation rating signal to its remaining child, here node Q.

In response to the upgrade propagation rating signal, node P's remaining child, node Q, would set its reconfiguration flag buffer 136 (see FIG. 13) to the next highest available propagation rating grade. Since in the example illustrated in FIG. 23, node Q's reconfiguration flag buffer already is set for the highest propagation rating grade (here green), node Q could either do nothing or reset its propagation rating in response to the upgrade propagation rating signal. The result would be the same, node Q's propagation rating would remain green. If node Q's propagation rating were red, then it would set its propagation rating to green in response to the upgrade propagation rating signal. Node Q would do nothing else in response to the upgrade propagation rating signal (note that as a matter of design choice, the software engineer could have the parent of the departed node (here node P is the parent of departed node X) send no upgrade propagation rating signal to its remaining child node (here node Q) if its remaining child node already is at the highest propagation rating).

In this example, the recipients of the propagation signal (i.e., the children of the missing node) would respond thereto as follows. First they would check their own respective propagation ratings. If the propagation signal's recipient has the highest propagation rating grade (here green), it would reset its propagation rating to the lowest rating grade (here red); re-transmit the propagation signal to its own child nodes (if there are any); disconnect the child node which did not have the highest propagation rating prior to its receipt of the propagation signal if the propagation signal's recipient with the green rating has more than one child node; allow its sibling to dock with it as a child node for the purpose of transmitting content data to that child node; and dock (or remained docked), for purposes of receiving content data, with the node sending the propagation signal to it (in systems having a branch factor of more than two, the propagation signal recipient whose propagation rating had been the highest would disconnect its child nodes which did not have the highest propagation rating, prior to the receipt of the propagation signal just sent, and it would allow its (i.e., the formerly green node's) siblings to dock with it as child nodes).

If the propagation signal's recipient has other than the highest propagation rating (i.e., just prior to the receipt of the propagation signal), it would upgrade its propagation rating to the next highest rating grade; dock with its sibling which had the highest rating grade; and begin receiving content data from it. If the propagation signal's recipient has other than the highest propagation rating, it does not re-transmit the propagation signal to its own child nodes.

In the example illustrated in FIG. 23, nodes A and B receive the propagation signal from node P. Since node A has the highest propagation rating grade, here green, it: (i) sets its reconfiguration flag buffer 136 (see FIG. 13) so that it has the lowest propagation rating grade, here red; and (ii) docks with node P (becoming a second level node 13) to begin receiving content data from node P. Node B changes its propagation rating from red to the next higher propagation rating (and since this example is a binary tree (or branch factor two) system, the next higher rating is the highest, green) and docks with node A to receive content data. The resulting topology is shown in FIG. 24. Note that node B remains a third level node 14.

Figure 25:
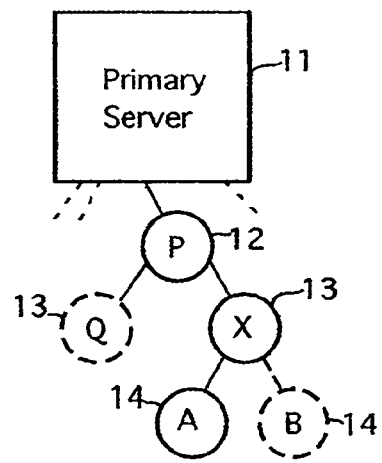
FIG. 25 is a schematic drawing of a topology of a computer information distribution network of an embodiment of the present invention, slightly different from the topology shown in FIG. 23, before a reconfiguration event.
Figure 26:
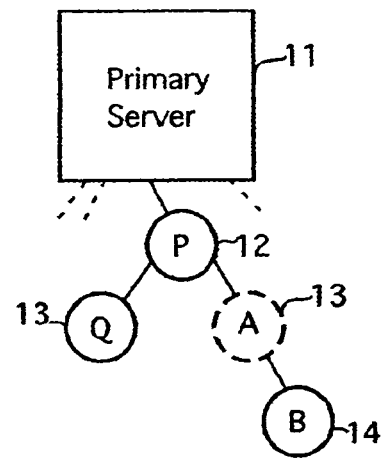
FIG. 26 is a schematic drawing of a topology of a computer information distribution network of an embodiment of the present invention shown in FIG. 25 after a reconfiguration event.

FIGS. 25 and 26 illustrate what happens in this example when the departing node is green. In FIG. 25, node X is the departing node and it is green. When node P sends the upgrade propagation rating signal to node Q, it changes its propagation rating from red to green. In other respects the reconfiguration event proceeds essentially as described in the paragraph immediately above, and results in the topology shown in FIG. 26 (which is the same as the topology in FIG. 24).

Figure 27:
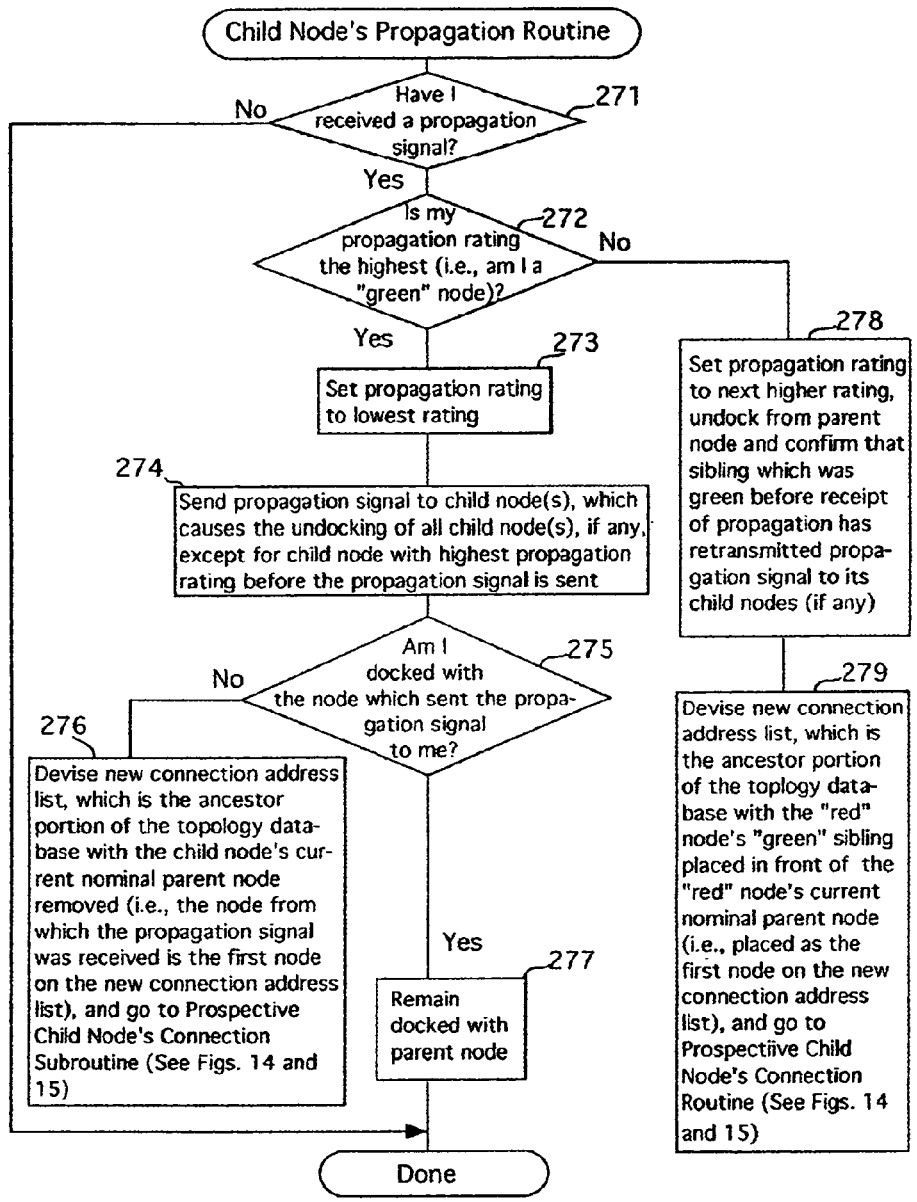
FIG. 27 is a flow diagram of an embodiment of the present invention showing a Child Node's Propagation Routine.

FIG. 27 is a flow diagram associated with an example showing the Child Node's Propagation Routine, the routine which is followed by a child node upon receiving a propagation signal. Of note, this example is provided for illustration only, and is not restrictive, and other examples are of course possible (e.g., the color of a node may assigned by its parent such that nodes assign and know the color of their children but not of themselves).

In any case, still referring to FIG. 27, the child node first performs step 271 wherein it determines whether it has received such a signal. If it has not, then it does nothing. If it has received a propagation signal, it proceeds to step 272 wherein it checks its propagation rating grade in reconfiguration flag buffer 136 (see FIG. 13). If its propagation rating is at the highest grade (i.e., it is a "green" node in this example), then it proceeds to step 273 where it sets its reconfiguration flag buffer to the lowest propagation rating grade. It then proceeds to step 274 in which it re-transmits the propagation signal to its own child nodes, and which results in the undocking of all its child nodes except for the one with the highest propagation rating. The child node (i.e., the child node referred to in the second sentence of this paragraph) then performs step 275 in which it determines whether it is already docked with the node which sent the propagation signal. If it is not (i.e., it received the propagation signal from its grandparent), then it proceeds to step 276. In that step it: (i) devises a new connection address list, which is the ancestor portion of its topology database with the current nominal parent node removed, resulting in the grandparent node becoming the first node on the connection address list; and (ii) then performs the Prospective Child Node's Connection Routine (i.e., it goes to step 141 discussed above in connection with FIGS. 14 and 15). The Prospective Child Node's Connection Routine is performed because some likelihood exists that even the grandparent node may have departed from the distribution system between the moment it sent out the propagation signal and the moment that its highest rated grandchild from its missing child attempted to dock with it.

If the answer to the query in step 275 is in the affirmative (i.e., the child node is receiving a propagation signal which has been re-transmitted by its parent), then the child node does nothing more (or as illustrated in FIG. 27, it performs step 277 which is to remain docked to its parent node).

If the answer to the query in step 272 is in the negative (i.e., it does not have the highest propagation rating (it is a "red" node in this example)), then it proceeds to step 278 in which it: (i) sets its reconfiguration flag buffer so that its propagation rating is the next higher grade (in this binary tree system the rating is upgraded from red to green); (ii) undocks from the parent with which it was docked before receiving the propagation signal (if it was docked with a parent before receiving such signal); and (iii) either (a) waits a predetermined period of time during which the node's sibling which was green prior to their receipt of the propagation signal should have re-transmitted the propagation signal to its own child nodes (thereby causing any red child nodes to undock from it) or (b) confirms that the node's sibling which was green prior to their receipt of the propagation signal actual did re-transmit the propagation signal to its child nodes (if it has any). Then the child node performs step 279 in which it: (i) devises a new connection address list, which is the ancestor portion of its topology database with its sibling node having the highest propagation rating placed in front of the previous parent as the first node on the connection address list; and (ii) then performs the Prospective Child Node's Connection Routine (i.e., it goes to step 141 discussed above in connection with FIGS. 14 and 15). The Prospective Child Node's Connection Routine is performed because some likelihood exists that the sibling may have departed from the distribution system between the moment that the propagation signal had been sent to the child node and the moment that the child node attempted to dock with its sibling.

In another example (which example is intended to be illustrative and not restrictive), part (iii) of step 278 may be handled using the "priority join" mechanism. More particularly, in this example, a priority join from a node X cannot be refused by a target node T—it must accept (dock) the incoming node. If the target node T already had two children G & R, the target node T instructs its red child R to connect (via "priority join") to the green node G. The node T then disconnects from its red child R immediately prior to accepting the incoming node X. The bumped node R then sends a priority join to its own green sibling A as the target. These actions cause the reconfiguration events to cascade until the edge of the tree is reached (of note, the algorithm described in this paragraph may have essentially the same effect as illustrated in FIGS. 28 and 29—under certain circumstances the algorithm described in this paragraph may be somewhat more reliable).

Figure 28:
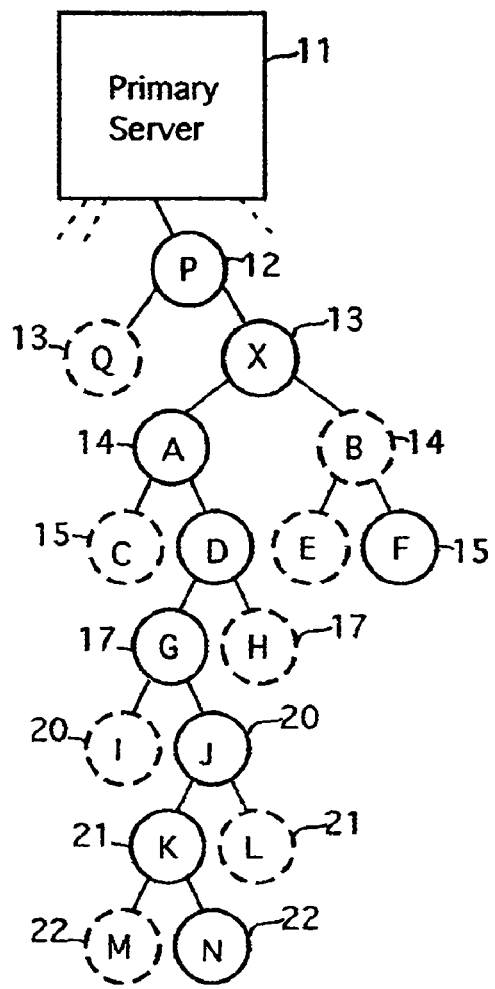
FIG. 28 is a schematic drawing of another topology of a computer information distribution network of an embodiment of the present invention before a reconfiguration event.
Figure 29:
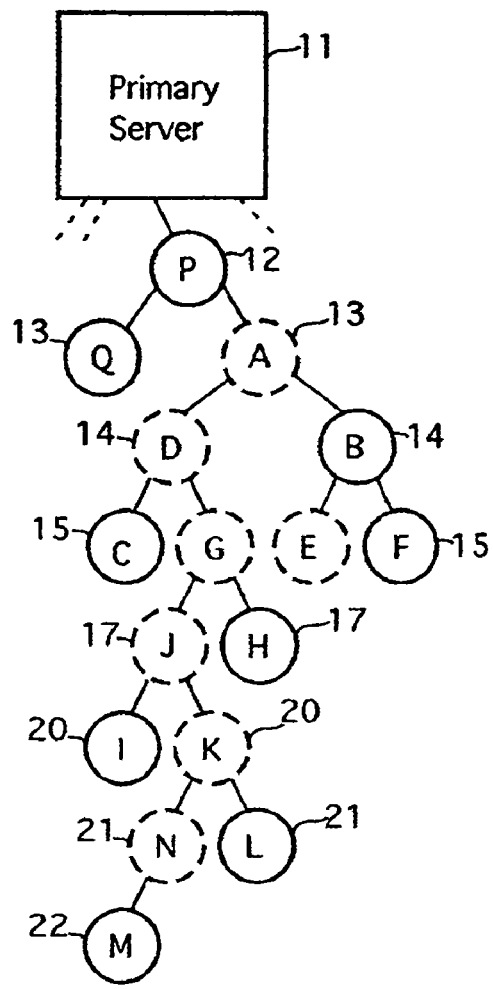
FIG. 29 is a schematic drawing of a topology of a computer information distribution network of an embodiment of the present invention shown in FIG. 28 after a reconfiguration event.

FIG. 28 illustrates an example distribution system comprising node P as a first level node 12; nodes Q and X as second level nodes 13; nodes A and B as third level nodes 14; nodes C, D, E an F as fourth level nodes 15; nodes G and H as fifth level nodes 17; nodes I and J as sixth level nodes 20; nodes K and L as seventh level nodes 21 and nodes M and N as eighth level nodes 22. Nodes Q, B, C E, H, I, L and M have red propagation ratings, as symbolized by the dashed circles, and the remaining nodes have green propagation ratings as symbolized by the solid circles. As a result of node X's departing from the system, node P sends out an upgrade propagation rating signal to node Q and a propagation signal to the children of node P's departed child node X (i.e., nodes A and B).

In another example (which example is intended to be illustrative and not restrictive), during a graceful depart of node x, node x may send out messages to its parent and children immediately prior to its departure—rather than the parent of node x initiating these messages as described above.

In any case, continuing the example of FIG. 28, node Q changes its propagation rating to green. Further, in this example nodes A and B begin the Child Node's Propagation Routine. With respect to node A, it answers the query of step 271 in the affirmative. Since its rating is green, it also answers the query of step 272 in the affirmative. In step 273 node A changes the setting of its reconfiguration flag buffer to show a red propagation rating. In step 274 it re-transmits the propagation signal to its child nodes C and D. It answers the query of step 275 in the negative because it is not docked for purposes of receiving content data with node P. Node A then goes to step 276 wherein it consults the ancestor portion of its topology database and creates a new connection address list starting with its grandparent. The new connection address list is P-S. Then node A performs the Prospective Child Node's Connection Routine, starting with step 141. (See FIG. 14.) Assuming that no other intervening events have occurred, node A will successfully dock with node P.

Node B answers the query of step 271 in the affirmative and, because its propagation rating was red when it received the propagation signal, it answers the query of step 272 in the negative. From there it goes to step 278 in which it changes its propagation rating to green. Then in step 279 node B consults the ancestor portion of its topology database and creates a new connection address list with its sibling, node A, placed in front of node X as the first address on the new connection address list. The new connection address list is A-X-P-S. Then node B performs the Prospective Child Node's Connection Routine, starting with step 141. Assuming that no other intervening events have occurred, node B will successfully dock with node A (if node A has disappeared, node B would attempt to dock with node X, but since it is not there, it would move on to node P.)

Node A, which had the higher propagation rating of the two child nodes of departed node X, moves up one level to become a second level node 13. Since it is a "new" entry to the second level, its initial utility rating and its propagation rating will be lower than that of node Q. As time goes by, at subsequent utility rating measurement events node A's utility rating (and hence its propagation rating) may become higher than that of node Q.

Node B, which had the lower propagation rating of the two child nodes of departed node X, does not re-transmit the propagation signal to its child nodes (nodes E and F), and they will follow B wherever it goes in the distribution system. In the example discussed here, node B becomes the child of node A while remaining third level node 14. At least initially, it will be node A's child with the higher utility rating and propagation rating.

As a result of node A's performing step 274, its child nodes C and D (which were fourth level nodes 15 in FIG. 28 when node X was still in the system) receive a propagation signal. Since node C has a red propagation rating, it, like node B, will remain in its level, change its propagation rating to green and dock with its sibling, with the result being that node D becomes its parent.

Since node D had a green propagation rating when it received the propagation signal, it answers the queries of steps 271 and 272 in the affirmative and changes its propagation rating to red in step 274. It answers the query of step 275 in the affirmative, and remains docked with node A. As a result, node D moves up a level and becomes an third level node 14 (with, at least until the next utility rating event, a lower utility rating and propagation rating than its new sibling, node B).

This process proceeds down the tree, with each child of a node which moves up a level doing one of the following under this example: (i) if it is a node having a green propagation rating, it remains docked with its parent, thereby itself moving up a level, changes its propagation rating to red and re-transmits the propagation signal to its child nodes; or (ii) if it is a node having a red propagation rating, it docks with the node which was its sibling, thereby staying in the same level, and changes its propagation rating to green.

The resulting topology after the reconfiguration event caused by node X's departure is illustrated in FIG. 29.

Of note, it is believed that reconfiguration using the Child Node's Propagation Routine of this example when a node departs the system does not necessarily result, in the long run, in significantly more inter-node reconnection events than any other reconfiguration method (and may result in fewer reconnection events). Moreover, it is believed that reconfiguration using the Child Node's Propagation Routine of this example helps assure that the more reliable nodes are promoted up the distribution network even if many reconfiguration events occur close in time to each other in a particular tree.

Referring now to a specific example of pseudo-code (which example is intended to be illustrative and not restrictive), it is noted that a propagation routine may be set forth as follows (wherein node X is the node departing from the distribution system):

```
Departs(X)
Begin
    If (X.Parent.GreenChild == X) /* the departing node is green*/
    {
        X.Parent.GreenChild := X.Parent.RedChild
        X.Parent.RedChild := X.GreenChild
    }
    Else /* the departing node is already red */
    {
        X.Parent.RedChild :=X.GreenChild
    }
    Propagate(X.GreenChild, X.RedChild)
End
```

Referring now to another specific example of pseudo-code (which example is intended to be illustrative and not restrictive), it is noted that a propagation routine may be set forth as follows (wherein node promotion during the network reconfiguration event is precipitated by node X's departure):

```
Propagate (X, RedSibling)
Begin
    OriginalGreenChild := X.GreenChild
    OriginalRedChild := X.RedChild
    X.RedChild := X.GreenChild
    X.GreenChild := RedSibling
    If (OriginalGreenChild <> null)
    {
        Propagate(OriginalGreenChild, OriginalRedChild)
    }
End
```

Referring now to a "Malfunctioning Nodes" example (which example describes a voting system between grandchildren and grandparents about a potentially malfunctioning parent and is intended to be illustrative and not restrictive), it is noted that what happens when a node leaves the distribution network was discussed in the above example (e.g., when a node leaves the network, its parent will, at the next utility rating event, report that it has room for a new node, except when the parent has been contacted about the missing node by its grandchild node or nodes, in which event, a reconfiguration event will proceed as described above). Sometimes, however, a node intends to remain in the network, but there is a failure of communication.

In this regard, each node's topology database may include information regarding that node's ancestors and descendants. In the event that a child node stops receiving signals from its parent node, the child may, in one example, send a "complaint" message to its grandparent. The grandparent may check whether the parent is still there. If it is not, then the grandparent may send a propagation signal to the child nodes of the missing parent.

Further, if the grandparent detects that the parent node is actually still there, then the grandparent node may send a disconnect signal to the parent node (e.g., sending it back to the server to begin the connection process again). This may occur, for example, when one of the two following conditions is exists: (i) the child node is the only child node of the parent, or (ii) the child and its sibling(s) are complaining to the grandparent.

In this example, the grandparent would also send a propagation signal to the child nodes of the disconnected parent, and a reconfiguration event would occur.

However, if the child node has siblings and they are not sending complaint signals to the grandparent, then the grandparent may assume that the problem is with the complaining child node. Thus, grandparent may send a disconnect signal to the complaining child node (e.g., sending it back to the server to begin the connection process again). If the complaining child node had its own child nodes, they would contact the departed child node's parent to complain, starting a reconfiguration event (in another example (which example is intended to be illustrative and not restrictive), the grandparent would send out signals to the malfunctioning parent (instructing it to depart) and to the children (instructing the green child to climb its path to its grandparent and instructing the red child to cross connect to the green child).

Figure 30:
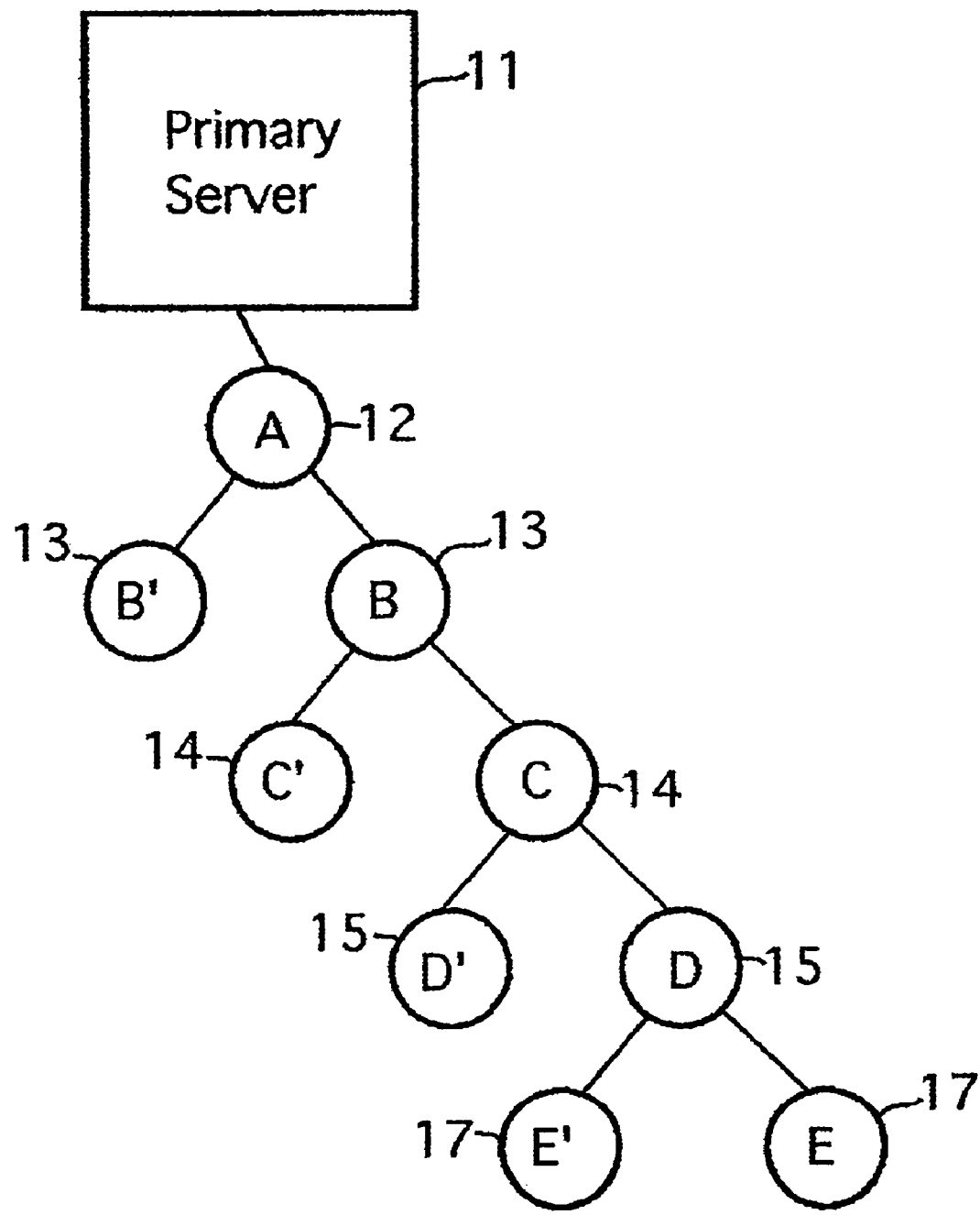
FIG. 30 is a schematic drawing of another topology of a computer information distribution network of an embodiment of the present invention before a "complaint" regarding communications.

The foregoing example (which example is intended to be illustrative and not restrictive) can be described in connection with FIG. 30 (which depicts a tree in a binary system having a primary server 11, in which node A, a first level node 12, has two child nodes B and B' (which are second level nodes 13); node B has two child nodes C and C' (which are third level nodes 14); node C has two child nodes D and D' (which are fourth level nodes 15); and node D has two child nodes E and E' (which are fifth level nodes 17)) and FIG. 31 (which is a flow diagram showing an example Grandparent's Complaint Response Routine).

Who does node C complain to in this example when node C no longer gets satisfactory service from node B? Node C complains to its grandparent, node A. If node C does not hear back from node A within a predefined amount of time (e.g., if node A has left the network), node C will then exit the network and immediately reconnect as a new node by going to the primary server S for assignment.

What does node A do in response to a complaint from node C in this example? When node A receives a complaint from grandchild node C about node C's parent node B (i.e., node A's child node B), node A will choose to either remove its child node B or its grandchild node C. A will make this determination based on whether node C alone, or both node C and its sibling node C' are experiencing problems with node B, together with the knowledge of whether node A is continuing to receive satisfactory service reports from node B. If node A is continuing to get satisfactory service reports from node B and there is no indication that node C' (the sibling of node C) is experiencing problems with node B, then node A will assign the "fault" to node C and issue a disconnect order for its removal. At this point the green child of node C (i.e., node D or D') will move up a level connecting to parent B, and the red child of node C (the other of node D or D') will connect as a child of its former sibling. The reconfiguration event will then propagate as discussed above.

If, on the other hand, node A is not getting satisfactory service reports in this example from node B and/or a complaint from node C's sibling arrives within a window of node C's complaint, then node A will assign the "fault" to node B and issue a disconnect order for its removal. At this point the green child of node B (i.e., node C or C') will move up a level connecting to grandparent node A, and the red child of node B (the other of node C or C'), will connect as a child of its former sibling. The reconfiguration event will then propagate as discussed above.

An exception to the above is the case where node C is the only child of node B. Under these circumstances node B may be disconnected in this example by node A based solely on the recommendation of node C. In another example, the system will not disconnect a node with one child based solely on the complaint of that child (in this case there may be insufficient data to accurately assign blame—disconnecting the node being complained against and promoting the complainer may have the potential to promote a node that is experiencing problems).

Figure 31:
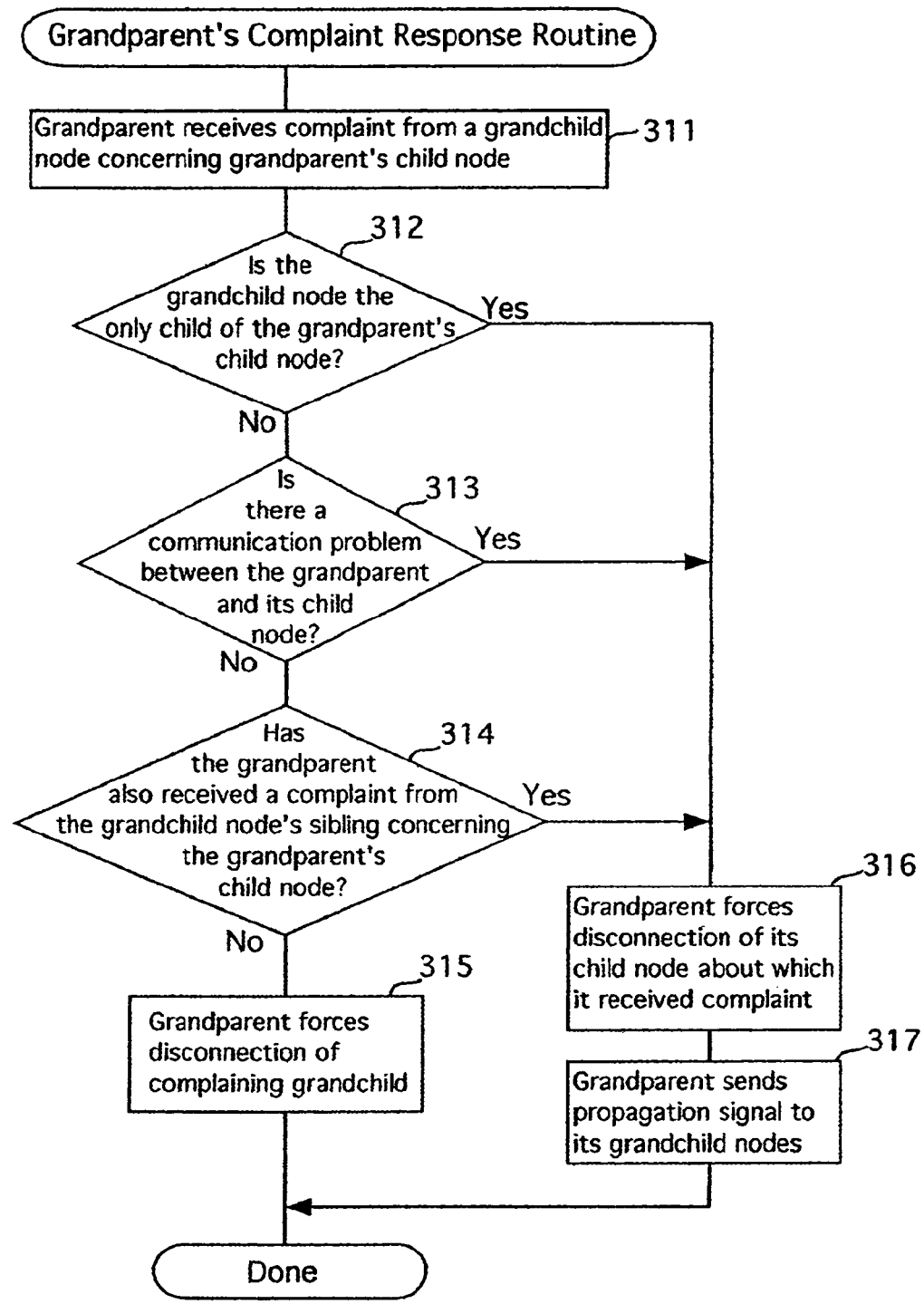
FIG. 31 is a flow diagram of an embodiment of the present invention showing a Grandparent's Complaint Response Routine.

Referring now to FIG. 31 (showing a flowchart associated with this example), node A receives a complaint from node C about node B in step 311. Node A then goes to step 312 in which it checks its topology database to determine whether node C is the only child of node B. If the answer is no (as shown in FIG. 30), then node A goes to step 313 in which node A determines whether there is a communication problem between it and node B. If the answer is no, then node A proceeds to step 314 in which it determines whether it has received a similar complaint about node B from node C' within a predetermined period of time of node A's having received the complaint from node C. If the answer to that query is no, then node A goes to step 315 in which it sends a disconnect signal to node C. At that point node A has completed the Grandparent's Complaint Response Routine (in one example a propagation signal does not necessarily have to sent by node A to node C's child nodes—if any exist, they will complain to node B which, upon discerning that node C is no longer in the distribution network, will send a propagation signal to such complaining nodes).

If the response to any of the queries in steps 312, 313 and 314 is yes in this example, then node A proceeds to step 316 in which it disconnects node B. Node A then proceeds to step 317 in which it sends a propagation signal to its grandchild nodes (here nodes C and C') and a reconfiguration event will occur as described above.

The method of this example described above takes a "2 out of 3" approach on the question of node removal. In this regard, it is believed that many interior nodes in a binary tree distribution network constructed pursuant the present invention will have direct connections to three other nodes: their parent, their green child, and their red child. The connections between a node and its three "neighbor" nodes can be thought of as three separate communications channels. In this example a node is removed from the network when there are indications of failure or inadequate performance on two of these three channels. When there are indications that two of the channels are working normally, the complaining node is presumed to be "unhealthy" and is removed.

In the case where an interior node has only a single child, the "complaint" of that child to its grandparent is sufficient, in this example, to remove the parent node—even when the node to be removed is communicating perfectly well with it's own parent. In other words, given the communication chain A-B-C where node A is the parent of node B and node B is the parent of node C, and given that node C has no siblings, then a complaint of node C to node A will cause node A to remove node B in this example regardless of the fact that node A and node B are not having communication problems (this course of action may help ensure that a potentially unreliable node does not move up the hierarchy of nodes, even at the cost of occasionally sending a "healthy" node back to the edge of the distribution chain based on uncorroborated complaints of its child). Of course, as mentioned above, there are examples where the system will not disconnect a node with one child based solely on the complaint of that child.

In another example of voting (which example is intended to be illustrative and not restrictive), instead of (or in conjunction with) nodes voting on the behavior of other nodes, nodes may continually grade their own performance and if they detect that there is insufficient bandwidth on two or more of their links (links to their parent and their children) the node will perform a graceful depart from the network (initiating a reconfiguration as described elsewhere) and then the node will either climb its path to an ancestor node (or go directly to the server) to request a connection path to the edge of the tree. This system allows nodes to "step aside" when they detect connection/bandwidth related issues.

Referring now to a "Stepped Delay of Playing Content Data" example (which example is intended to be illustrative and not restrictive) it is noted that in order to have all the user nodes experience the playing of the content data at approximately the same time, regardless of the level in which the node resides, the content data buffer 125 shown in FIG. 13 of a user node may be larger the higher uptree it is in a distribution chain (i.e., the closer it is to the root server). The larger the buffer, the greater the amount of time between a particular event (or from the node's receiving the content data), and the node's actually playing the content data in its content data buffer. To the extent that the content data buffer of a node is sized to vary the time that the playing of the content data is started, the content data buffer is a delay. Alternatively, the delay may be a timer or a delay buffer 126 as shown in FIG. 13, or a combination of elements. The delay's purpose may be to help assure that all users experience the play of the content data approximately simultaneously.

For a distribution network having n levels of user nodes cascadingly connected to a server node, where n is a number greater than one (and therefore the distribution network comprises the server node and first through nth level user nodes), the period of time (i.e., the delay time) between:

(i) the moment content data is received by a node or, from a predetermined moment such as, for example, a reporting event or utility rating event (the occurrence of which may be based on time periods as measured by a clock outside of the distribution system and would occur approximately simultaneously for all nodes); and (ii) the playing of the content data by the node;

is greater for a node the higher uptree the node is on the distribution chain. That is, the delays in first level nodes create greater delay times than do the delays in second level nodes, the delays in second level nodes create greater delay times than the delays in third level nodes and so on. Described mathematically, in an n level system, where x is a number from and including 2 to and including n, the delay time created by a delay in an (x−1) level node is greater than the delay time created by a delay in an x level node.

By way of example (which example is intended to be illustrative and not restrictive), first level nodes could have a built in effective delay time in playing content data of one-hundred-twenty seconds, second level nodes could have a built in effective delay time of one-hundred-five seconds, third level nodes could have a built in effective delay time of ninety seconds, fourth level nodes could have a built in effective delay time of seventy-five seconds, fifth level nodes could have a built in effective delay time of sixty seconds, sixth level nodes could have a built in effective delay time of forty-five seconds, seventh level nodes could have a built in effective delay time of thirty seconds, and eighth level nodes could have a built in effective delay time of fifteen seconds.

The delays may take advantage of the fact that transmission of the packets forming the content data from one node to another may take less time than the actual playing of such packets. This may allow for essentially simultaneous playing of the content data throughout all the levels of the distribution network. The delays may also allow nodes to handle reconnection and reconfiguration events without any significant loss of content data.

In another example (which example is intended to be illustrative and not restrictive), the system may not endeavor to have buffers closer to the server contain more data than buffers of nodes that are further away. Instead, every node may have a buffer that can hold, for example, approximately two minutes worth of A/V content. The system may endeavor to fill every node's buffer as rapidly as possible, regardless of the node's distance from the server, in order to give each node the maximum amount of time possible to deal with network reconfiguration and uptree node failure events.

Of note, nodes may receive a "current play time index" when they connect to the server. This value may be used to keep all nodes at approximately the same point in the stream—to have all nodes playing approximately the same moment of video at the same time—by telling them, essentially, begin playing A/V content at this time index. The play time index may be, for example, approximately two minutes behind "real time"—allowing for nodes to buffer locally up to two minutes of content (the present invention may permit drift between nodes within the buffer (e.g., two minute buffer) or the present invention may reduce or eliminate this drift to keep all nodes playing closer to "lock step").

Referring now to a specific "Reconfiguration" example (which example is intended to be illustrative and not restrictive), FIGS. 32A-32J will be discussed. In this example, basic network reconfiguration may be accomplished using two types of messages: Register (i.e., "Normal" Register and "Priority Join") and Depart Propagate. For the purposes of this discussion, the network will be assumed to be organized as a binary system in which each node has one parent and, at most, two children (the one exception being that the root server has no parent).

Under this example, every user node in the network will have either a "stronger" node indicia or "weaker" node indicia associated therewith (wherein a "stronger" node indicia refers to a node which is more appropriate to move uptree (e.g., based upon a higher utility rating and/or a higher potential re-transmission rating) and wherein a "weaker" node indicia refers to a node which is more appropriate to stay where it is or move downtree (e.g., based upon a lower utility rating and/or a lower potential re-transmission rating). The indicia may be any desired indicia (e.g., number, letter or color) and in this example the indicia is a color, either green or red.

In any case, under this example, if a node has one child, that child will be marked as green and if a node has two children, one will be green and the other will be red.

Referring now to the details of this reconfiguration example, the steps carried out when a node departs the network will be discussed. More particularly, the discussion will be directed to the departure of Node B of FIG. 32

Figure 32A:
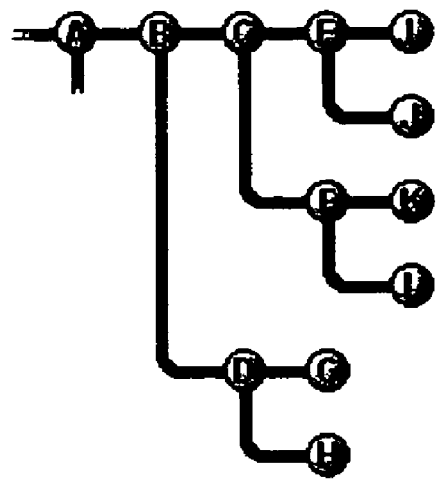
FIGS. 32A-32J relate to "Reconfiguration" examples according to the present invention.
Figure 32B:
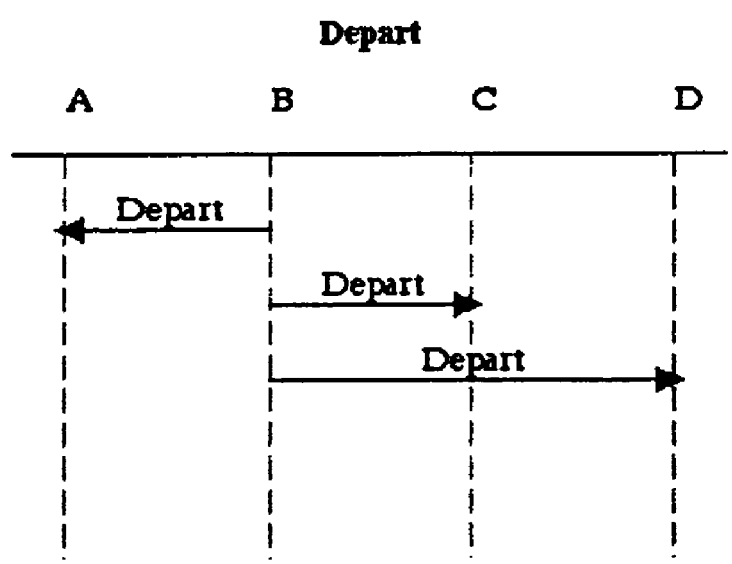
Figure 32C:
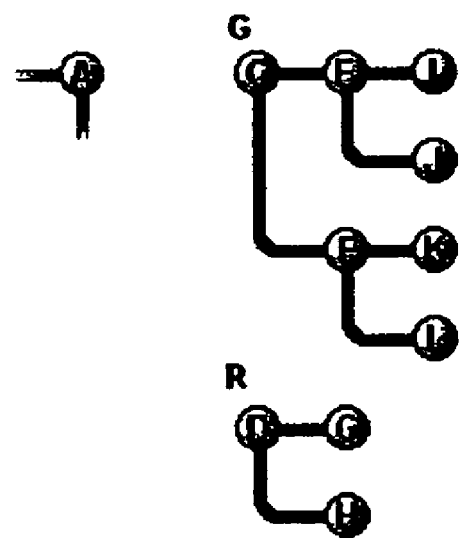

In this regard, it is noted that Node B may depart the network by issuing a Depart message to Node A, a Depart message to Node C and a Depart message to Node D (see FIG. 32B). Further, as shown in FIG. 32C, the departure of Node B breaks the tree into three separate components. More particularly, this FIG. 32C shows that these three separate network components include the sub-tree comprising Node A, the sub-tree comprising Nodes C, E, I, J, F, K and L and the sub-tree comprising Nodes D, G and H.

These three components must now be rejoined in such a way as to repair the "hole" left by Node B's departure. The first step in this example is for the former green child of the departed node to connect to its former grandparent. Thus, in this example, Node C (which is the former green child of Node B—as indicated by the "G" indicia in FIG. 32C) connects to Node A. This connection results in the tree shown in FIG. 32D (the connection of Node C to Node A may be carried out via a Register message sent from Node C to Node A and an Accept message sent from Node A to Node C—see FIG. 32J).

Note that the effect of this action is that Node C occupies the position formerly held by its parent (Node B). Note also that Node C (and all of the nodes in its sub-tree) have been "promoted" up one level of the tree.

Figure 32D:
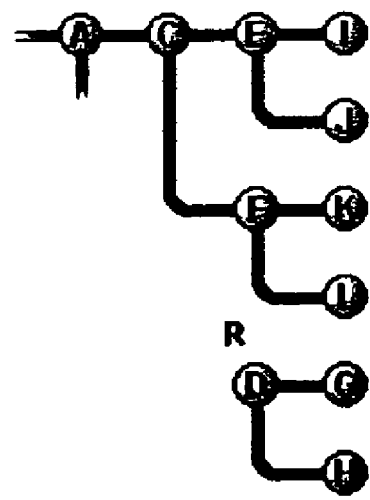

Despite this action, the "hole" left by the departure of Node B has not yet been fully repaired. More particularly, as seen in FIG. 32D, the tree now consists of two separate components: the main tree (including Nodes A, C, E, I, J, F, K and L) and the tree "branch" rooted at Node D (including Nodes D, G and H). Thus, while Node C is now back "in the tree" (since it has a parent), Node D has no parent and is still considered "out of the tree".

Therefore, in order to continue the repair of the "hole" left by the departure of Node B, the sub-tree rooted at Node D must be merged with the sub-tree rooted at Node C.

Figure 32E:
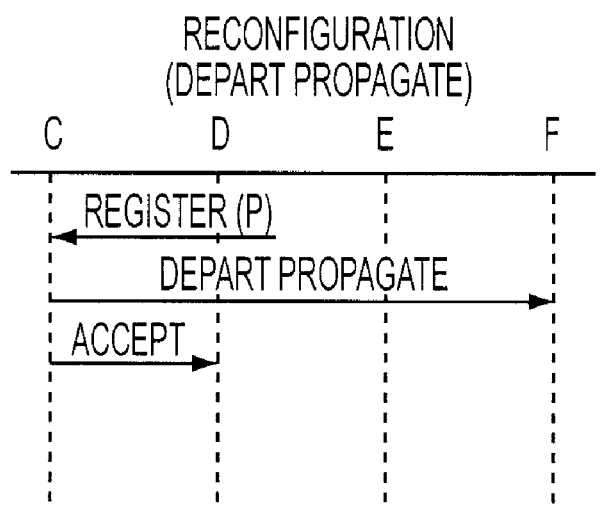

Thus, in this example, Node D (which is the former red child of Node B—as indicated by the "R" indicia in FIGS. 32C and 32D) will Priority Join or "cross connect" to Node C (i.e., Node D's former green sibling). As seen in FIG. 32E, this Priority Join operation is carried out as follows:

Node D sends a Register message to Node C with "priority" equal true (i.e., a "Priority Join).

Since Node C already has two children, it must break its connection with one of its current children in order to accept Node D. In such a situation, the connection with the red child will be broken (the red child may be sent off of the network or sent further downtree).

Thus, Node C breaks the connection with Node F by sending Node F a Depart Propagate message prior (e.g., immediately prior) to the sending of the Accept message to Node D (by Node C).

Figure 32F:
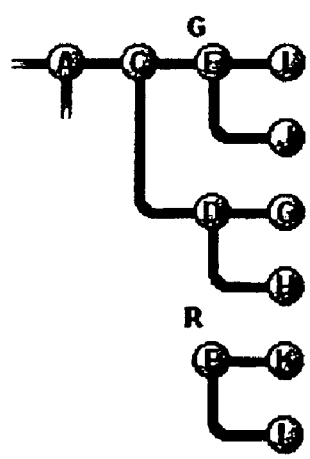

After the Priority Join operation described above, the network will have the form shown in FIG. 32F. More particularly, Node D and its sub-tree have been merged back into the tree, but at the expense of kicking Node F, and its sub-tree, out of the tree.

Figure 32G:
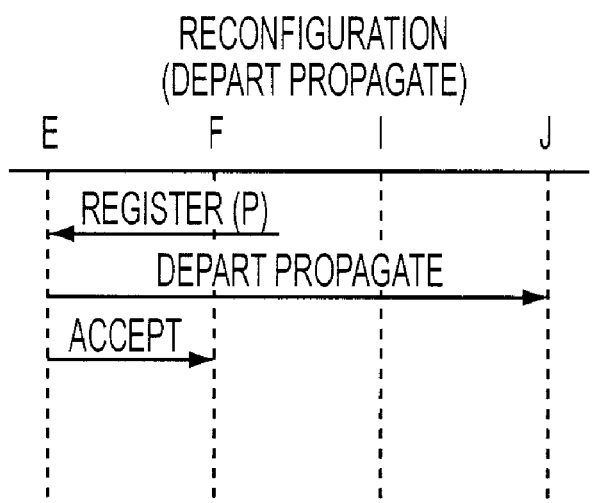

Thus, at this point the "priority join"/"depart propagate" process repeats itself with Node F cross connecting (via Priority Join) to its former green sibling Node E (see FIG. 32G). Since Node E already has two children, I and J, Node E will break its connection with its red child, Node J, prior (e.g., immediately prior) to the sending of the Accept message to Node F.

Figure 32H:
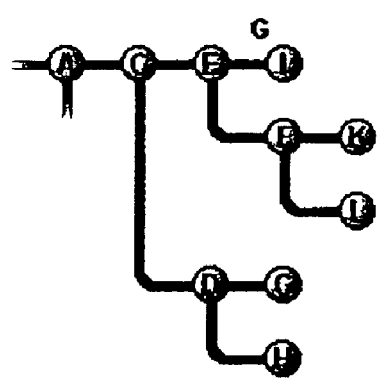
Figure 32I:
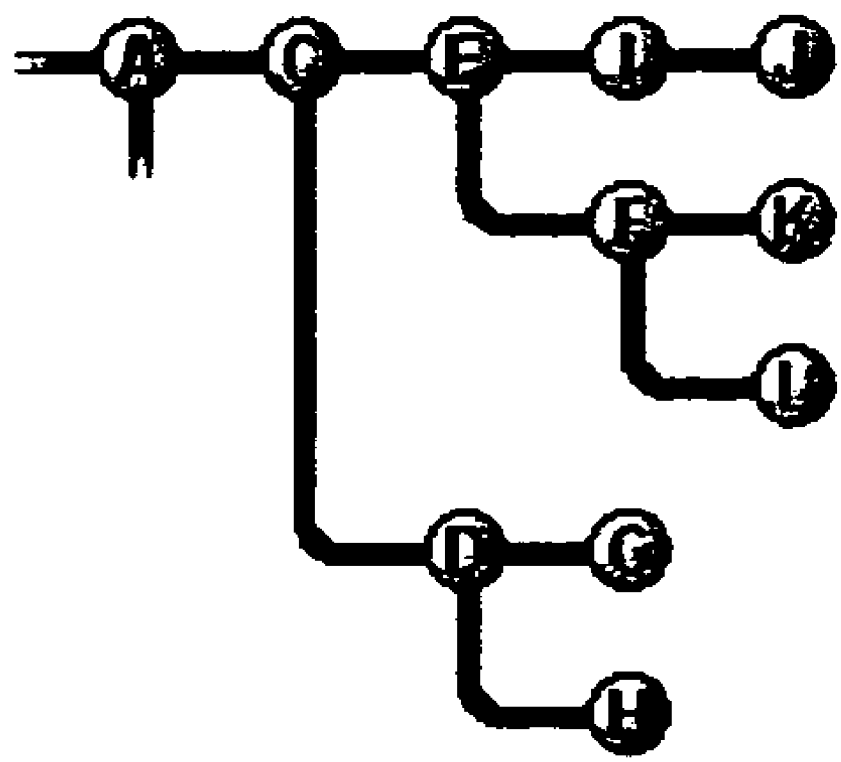

After the second Priority Join operation described above, the network will have the form shown in FIG. 32H. More particularly, Node F, and its sub-tree, have rejoined the network, but at the expense of kicking Node J out of the tree.

Figure 32J:
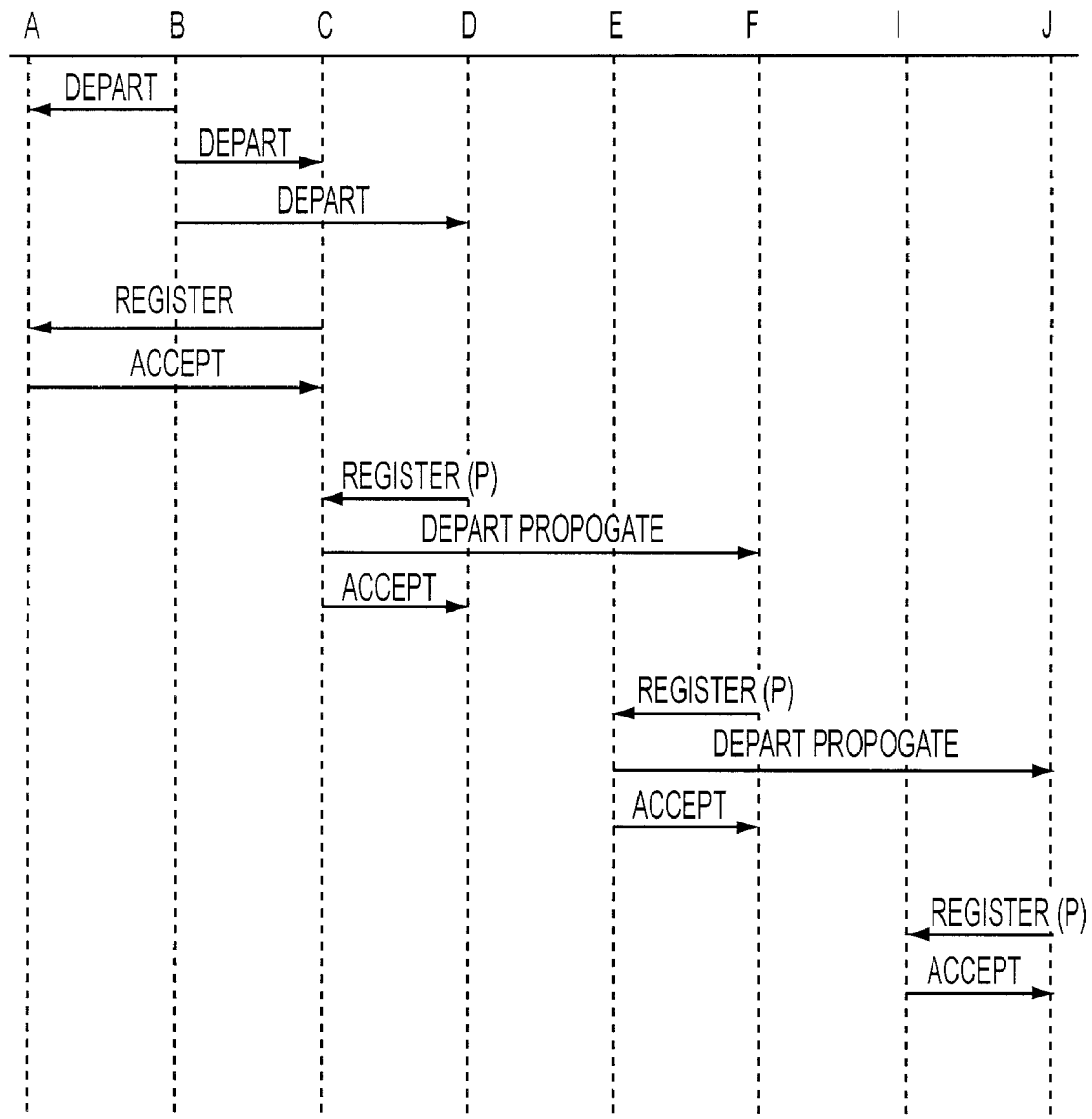

In order to repair this condition, Node J will cross connect (via Priority Join) to its former green sibling I. Since I is not full (i.e., does not have two children), there is no need for I to issue a Depart Propagate message. Thus, the network forms the configuration shown in FIG. 32I. Further, the complete sequence of messages needed for Node B to depart and the tree to successfully reconfigure in this example is shown in FIG. 32J. More particularly:

Node B sends Depart messages to Node A, Node C and Node D

Node C sends a Register message to Node A and Node A responds with an Accept message Node D sends a Priority Join message to Node C Node C sends a Depart propagate message to Node F Node C sends an Accept message to Node D Node F sends a Priority Join message to Node E Node E sends a Depart Propagate message to Node J Node E sends an Accept message to Node F Node J sends a Priority Join message to Node I Node I sends an Accept message to Node J To summarize this example, tree reconfiguration generally depends on two types of messages: Register ("Normal" and "Priority Join") and Depart Propagate. A "Normal" Register message may be used to implement connection of a grandchild node to a grandparent node. A Priority Join may be used to implement a "cross connect" where a red node connects as a child of its former green sibling. A Depart Propagate may be used to "make room" for the cross connecting node, allowing it to connect in the location previously occupied by its red nephew. The act of disconnecting the red nephew from its former parent moves the "hole" caused by the original node departure down one level of the tree, and may initiate another priority join/depart propagate sequence at that level. This process may continue until the edge of the network is reached.

Figure 33A:
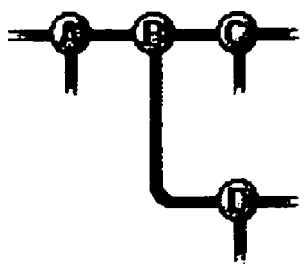
FIGS. 33A and 33B relate to a "Node Depart" example according to the present invention.
Figure 33B:
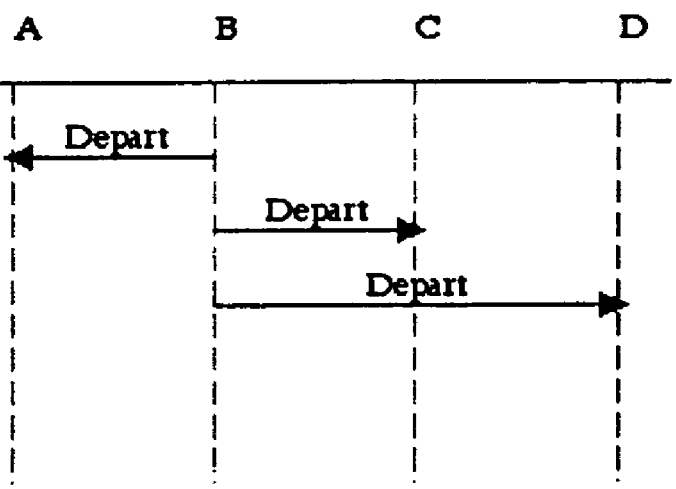

Referring now to a specific "Node Depart" example (which example is intended to be illustrative and not restrictive), FIGS. 33A and 33B will be discussed. In this example, when Node B is exiting the network (a portion of which network is shown in FIG. 33A), Node B will send Depart messages to its parent (i.e., Node A) and children (i.e., Nodes C and D) to inform them of its departure. Thus, if the tree is organized in the manner illustrated in FIG. 33A, Nodes A, C and D will receive Depart messages from Node B (see FIG. 33B).

Moreover, in this example Node A will take little action (basically clean up its internal state) and Nodes C and D will participate in a reconfiguration event (as discussed above). More particularly, Node C (being the Green node) will attempt to climb its path, and thus connect to Node A, which will accept Node C. Further, Node D will attempt to "cross connect" to Node C by registering with priority set to true.

Referring now to a "Vote (complaint code)" example (which example is intended to be illustrative and not restrictive), FIGS. 34A-34F and 35A-35C will be discussed. In this example, the network employs a voting system that allows the network to automatically: (a) disconnect node(s) that are found to be misbehaving or underperforming; and/or send such node(s) that are found to be misbehaving or underperforming to the edge of the tree (i.e., as far downtree as possible). This action may be taken in order to prevent a misbehaving or underperforming node from interrupting the delivery of data to other nodes in the tree. Of note, such misbehaving or underperforming may refer to the intentional or unintentional interruption or slowing of delivery of data to other nodes.

More particularly, in this example a Vote (or Complaint) is sent from a node to its grandparent node concerning the complaining node's parent.

This example applies to a binary system, and as such, voting may employ a two-out-of-three strikes approach in which at least two of the three nodes directly connected to Node X must vote against Node X before Node X is found to be misbehaving or underperforming (of course, two-out-of-three strikes is provided as an example only, and any number of strikes and/or any number of remove/keep votes may be used). If Node X is found to be "at fault", the penalty is that it will be disconnected from the network and/or sent to the edge of the network (i.e., as far downtree as possible). This situation will be referred to as a "Case I" voting event.

In addition, under this example a node that generates a complaint that is not supported by another complaint within a given period of time (or a node that generates too many unsubstantiated complaints over a given time period), will, itself, be disconnected from the network and/or sent to the edge of the network (e.g., to discourage nodes from "whining" (or issuing complaints) for no reason). This situation will be referred to as a "Case II" voting event.

More particularly, when a node is found to be "at fault" under this example due to a voting event, such node is sent a Reject message, with hard set to true (the Reject message may be sent, for example, from the node's parent or grandparent). This causes the node found to be "at fault" to be disconnected from the network (further, this node may then be sent to the edge of the network when the node "climbs its path" (i.e., looks to progressively uptree instructing nodes for new connection instructions). If the Reject message is the result of a successful voting event (Case I), then the parent of the node found to be "at fault" will send out "fake" Depart messages to the children of such node. If this Reject message is the result of an unsuccessful vote (Case II), then the grandparent of the complaining node will send out "fake" Depart messages to the parent and children of the node found to be "at fault".

The result of sending out these messages is to simulate the graceful departure of the node found to be "at fault" (i.e., off of the network and/or as far downtree as possible). Note that the "fake" Depart messages are identical to actual Depart messages (the "fake" messages are referred to as "fake" because they are not generated by the node that is actually departing, but instead by a third-party node on behalf of the departing node).

Figure 34A:
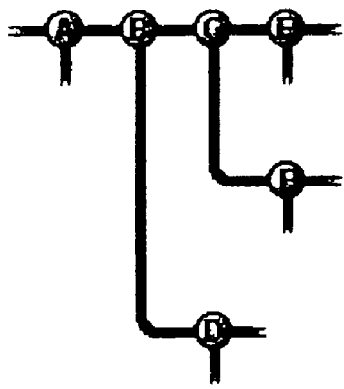
FIGS. 34A-34F and 35A-35C relate to a "Voting (complaint code)" examples according to the present invention.

Referring now to FIG. 34A, consider the example where Node B in the tree depicted therein is misbehaving or underperforming. Since Node B is misbehaving or underperforming, a Case I voting event should occur where both Node C and Node D complain up to Node A about Node B.

Figure 34B:
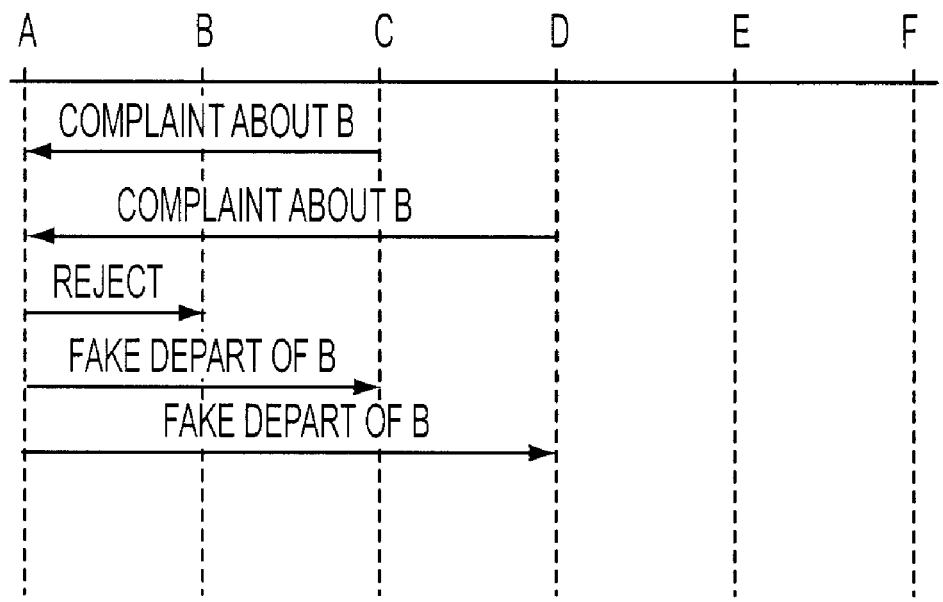

These Complaint messages about Node B are sent to Node A from Node C and D, as seen in FIG. 34B.

As a result, Node A will disconnect Node B from the network by sending it a "hard" Reject message (see FIG. 34B).

Moreover, as seen in FIG. 34B, Node A will then send out "fake" Depart messages to Node B's children, Node C and Node D, causing a reconfiguration sequence to take place (e.g., in the same manner as would have occurred if Node B had departed normally).

Figure 34C:
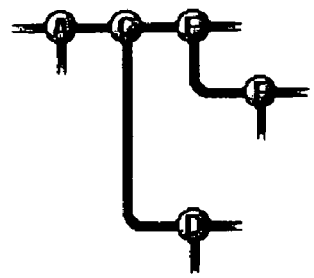
Figure 34D:
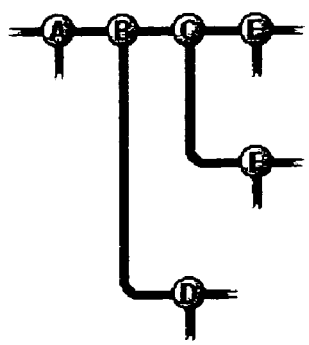

Thus, at the end of the messaging shown in FIG. 34B and the reconfiguration events resulting from the departure of Node B, similar to those illustrated in FIG. 32J, the resulting tree would have the form shown in FIG. 34C.

Now, again consider the same tree (reproduced again in FIG. 34D for convenience) but in the situation where Node C issues an unsubstantiated complaint against Node B.

The Complaint message is from Node C to Node A about Node B. Since this is a Case II voting event where only Node C (or only Node D) complains up to Node A about Node B, Node A will send a "hard" Reject message to Node C (or Node D) and a reconfiguration sequence will take place to repair the "hole" in the tree left by the departure of Node C (or Node D).

Figure 34E:
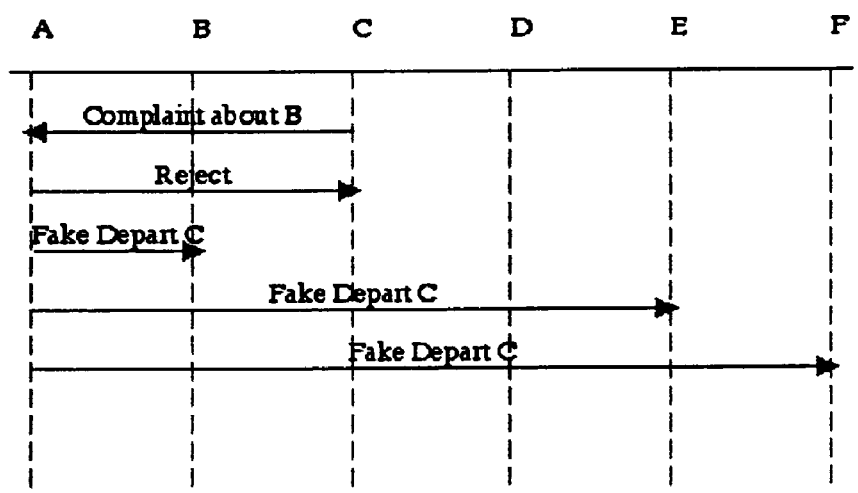
Figure 34F:
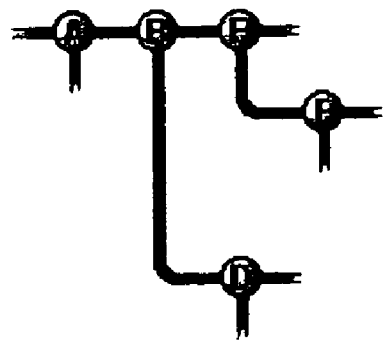

More particularly (assuming that Node C is being disconnected), after Node A disconnects Node C from the network by sending the aforementioned "hard" Reject message, Node A will send a "fake" Depart message about Node C to Nodes B, E and F (see FIG. 34E). Further, after reconfiguration (as discussed above) the resulting tree would have the form shown in FIG. 34F.

Figure 35A:
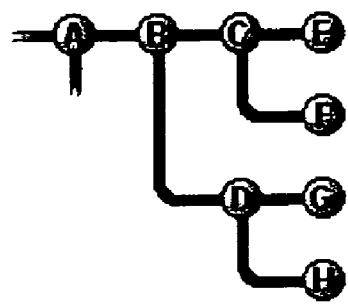
Figure 35B:
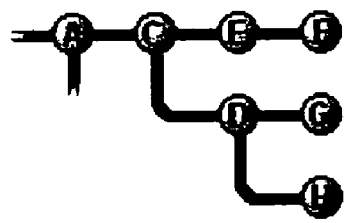
Figure 35C:
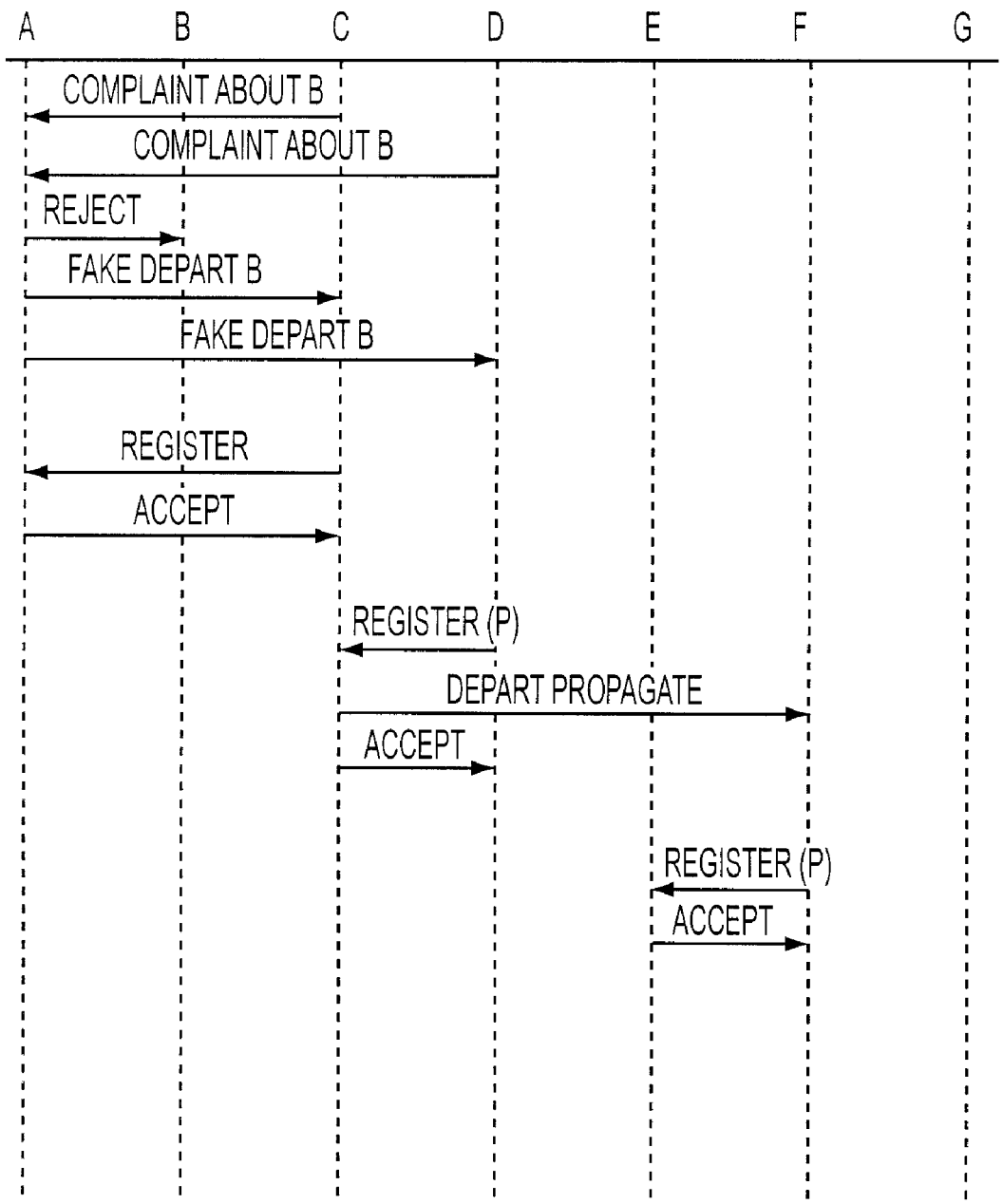

Referring now to FIGS. 35A-35C, in order to place voting into context, a Case I voting event will now be discussed along with an example full reconfiguration sequence that would result.

More particularly, FIG. 35A shows the form of the tree immediately prior to Node B being voted against by at least two of the three nodes A, C, and D.

Further, after Node B is disconnected from the network and the resulting reconfigurations are performed (as described above), the tree will have the form shown in FIG. 35B.

Finally, the messages exchanged between nodes to bring these actions about are illustrated in FIG. 35C. In this regard, it is noted that:

Nodes C and D issue Complaint messages to Node A
    Node A sends a "hard" Reject message to Node B
    Node A sends "fake" Depart messages about Node B to Nodes C and D
    Node C sends a Register message to Node A
    Node A sends an Accept message to Node C
    Node D sends a Priority Join message to Node C
    Node C sends a Depart Propagate message to Node F
    Node C sends an Accept message to Node D
    Node F sends a Priority Join message to Node E
    Node E sends an Accept message to Node F In another embodiment a "Please Stand By" mechanism may be employed by which a parent node instructs its child node(s) to wait before complaining (e.g., about lack of data or about a slowdown in data flow) to a grandparent node (i.e., a grandparent of the child and a parent of the child's parent). In one example (which example is intended to be illustrative and not restrictive), the instruction may be to wait for a predetermined time period. In another example (which example is intended to be illustrative and not restrictive), the instruction may be to wait indefinitely. In another example (which example is intended to be illustrative and not restrictive), the "Please Stand By" mechanism may be employed by any desired node (not just a parent node) to instruct any other desired node (not just a child node) not to complain (e.g., the "Please Stand By" mechanism may be implemented by the server).

In another example (which example is intended to be illustrative and not restrictive), a Please Stand By (or "PSB") packet may be "data-full" (as opposed to "data-less"). More particularly, such data-full PSB packets may be constructed to have a "fake" data load which makes these PSB packets approximately the same size as Data Packets. PSB packets may be sent, for example, from a parent to its child when the parent has no unsent data to send to that child. Since, in this example, the size of data-full PSB packets are similar to Data Packets, it is possible for the parent node to maintain the connections between itself and its children at a data rate that is similar to the rate that would exist between the two if the parent possessed unsent data.

Of note, the use of data-full PSB packets may allow the system to maintain the downtree structure of the network by keeping the nodes below a problem "happy". Thus, the system may be able to isolate problems, such as a socket error between a node and its children, by allowing those children to continue to feed their offspring at an acceptable data rate, even though those children are not receiving any data from their parent. Without a mechanism such as data-full PSB packets to isolate a problem, problems in the system could propagate to all nodes downtree from the site of the problem (which could lead to network instability).

Figure 36A:
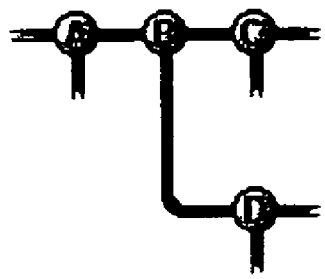
FIGS. 36A and 36B relate to a "Shutdown" example according to the present invention.
Figure 36B:
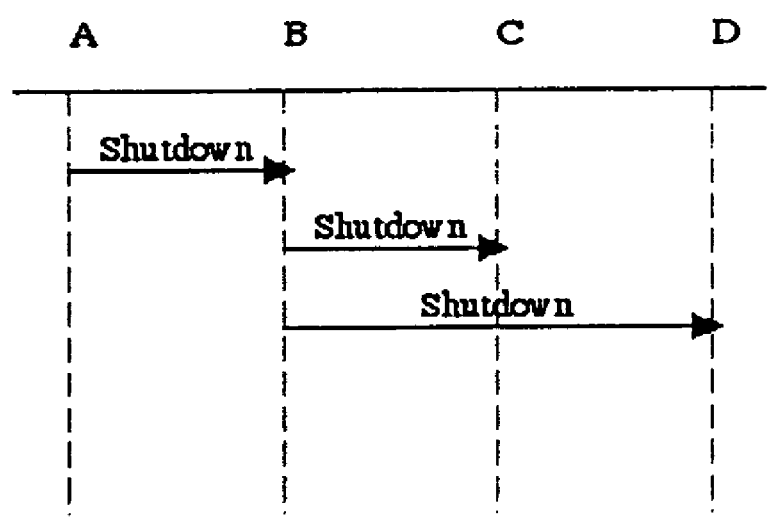

Referring now to a "Shutdown" example (which example is intended to be illustrative and not restrictive), FIGS. 36A and 36B will be discussed. More particularly, FIG. 36A shows a portion of a network tree and FIG. 36B shows Shutdown messages being sent from Node A to Node B, from Node B to Node C and from Node B to Node D. In this example, the Shutdown messages are transmitted to all nodes (e.g., by passing the received message down to all children).

Of note, after Node B receives and sends down the Shutdown messages to Node C and Node D (see FIG. 36B), Node B should then disconnect from the network and attempt to reconnect after a time specified in the Shutdown message (note that some small amount of "wiggle room" may be added/subtracted from this time to prevent all nodes from returning to the network simultaneously).

In another example (which example is intended to be illustrative and not restrictive), the Shutdown message may not specify a time for reconnection (i.e., the shutdown node may not be instructed to reconnect).

In another example, (which example is intended to be illustrative and not restrictive), shutdown messages can only originate at the server.

In another example (which example is intended to be illustrative and not restrictive), shutdown messages are sent via Secure Packets. Of note, the Secure Packet system may employ, for example, a mechanism such as public key encryption (of either the entire message or a portion of the message, such as its checksum) to verify the message originated at the server.

In another example (which example is intended to be illustrative and not restrictive), children should transmit the shutdown messages unaltered.

In another example (which example is intended to be illustrative and not restrictive), only certain nodes receive the shutdown message.

In another example (which example is intended to be illustrative and not restrictive), only certain nodes re-send the shutdown message.

Figure 37A:
FIGS. 37A and 37B relate to a "Ping/Pong" example according to the present invention.
Figure 37B:
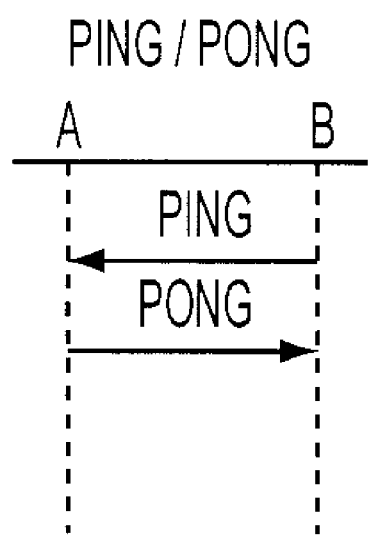

Referring now to a "Ping/Pong" example (which example is intended to be illustrative and not restrictive), FIGS. 37A and 37B will be discussed. In this example, Node B sends Node A a Ping message (see FIGS. 37A and 37B). If Node A is healthy (e.g., correctly receives and interprets the Ping message in a timely manner) then Node A will respond to Node B with a Pong message (e.g., over the same connection or over a different connection). Of note, the nodes do not have to be permanently connected and may only be connected for the duration of the ping/pong session.

Figure 38A:
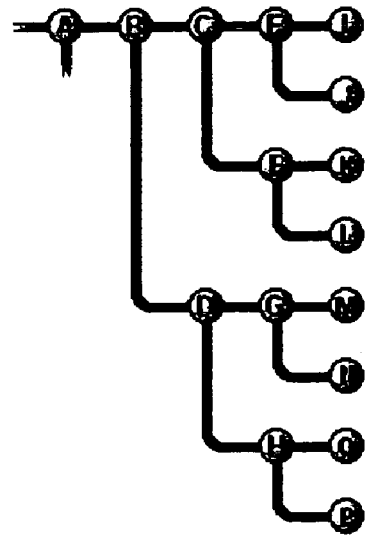
FIGS. 38A-38L relate to a "Simultaneous Departure of Adjacent Nodes (Green-Red)" example according to the present invention.

Referring now to a specific reconfiguration example hereinafter called "Simultaneous Departure of Adjacent Nodes (Green-Red)", FIGS. 38A-38L will be discussed. In this example (which example is intended to be illustrative and not restrictive), the original configuration is as shown in FIG. 38A.

Figure 38B:
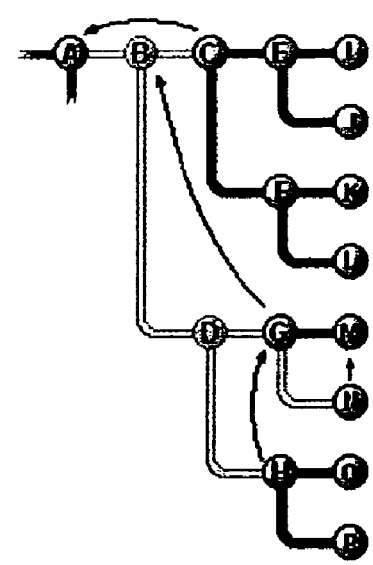

Further, as seen in FIG. 38B, after the departure of Node B and Node D, Node C attempts to connect to Node A and Node G fails to connect to departed Node B (as a result of the departure of Nodes B and D).

Figure 38C:
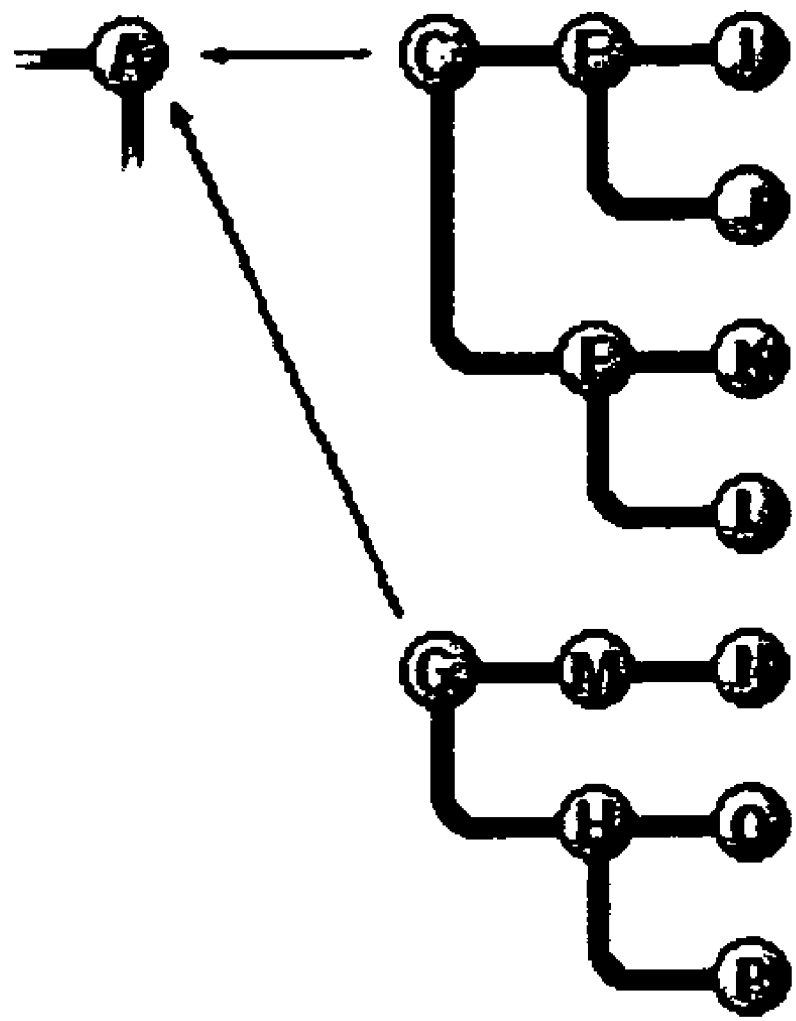
Figure 38D:
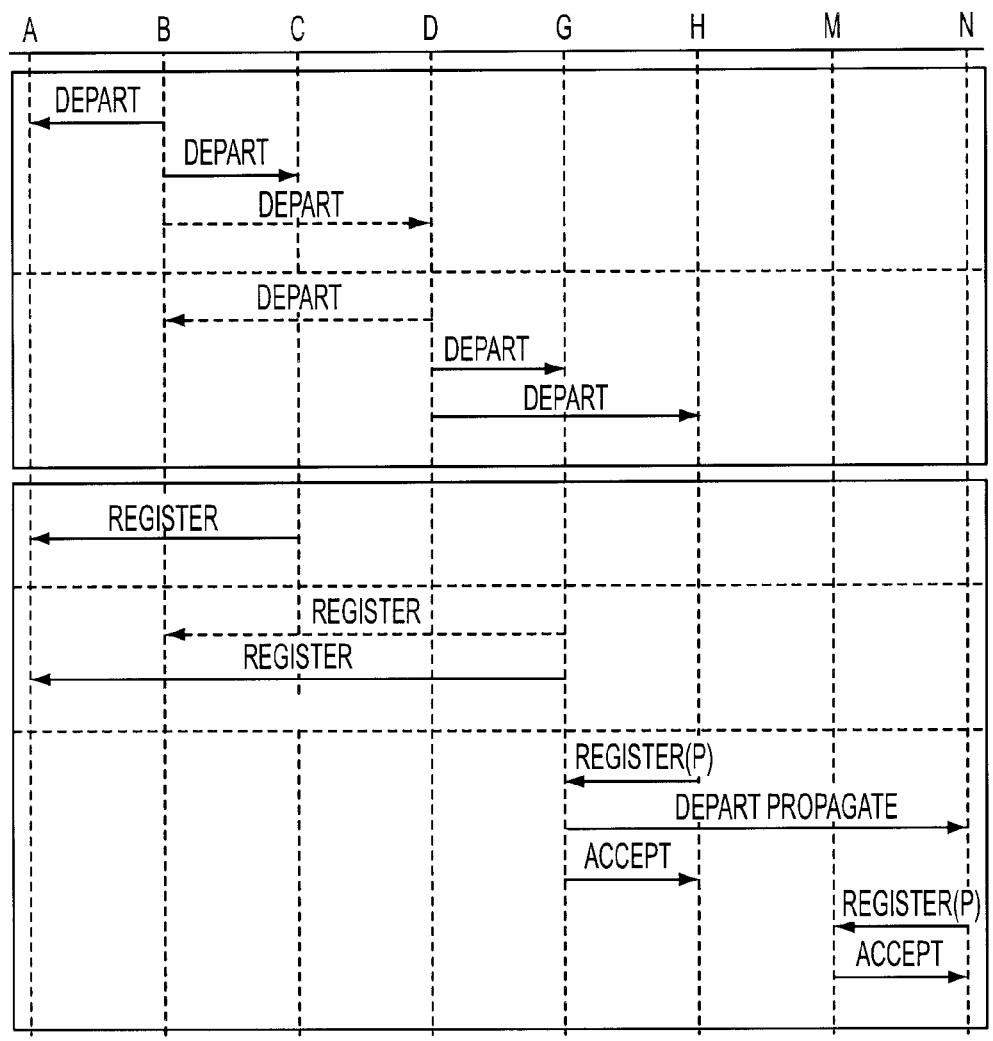
Figure 38E:
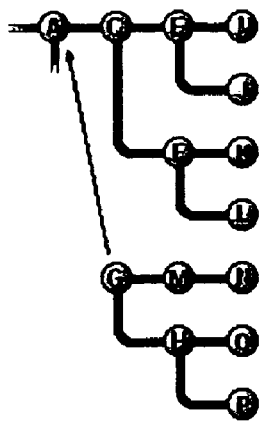

Further still, as seen in FIG. 38C, Nodes C and G then attempt to connect to Node A at about the same time. Thus, the messages passed are as seen in FIG. 38D (wherein a message depicted as a dashed line is sent to a departed node).

Figure 38F:
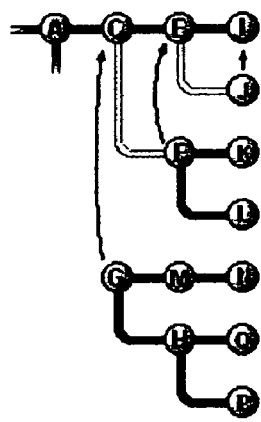
Figure 38G:
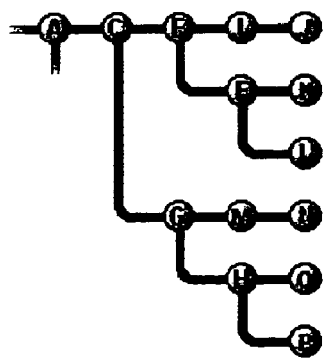
Figure 38H:
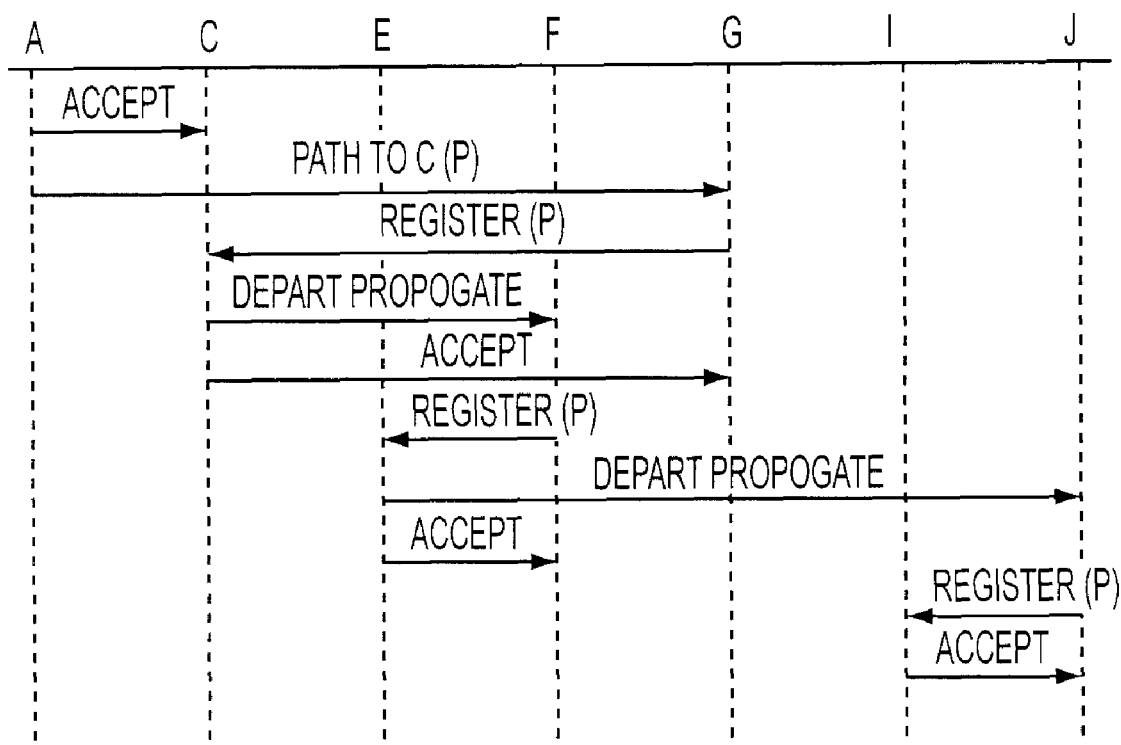
Figure 38I:
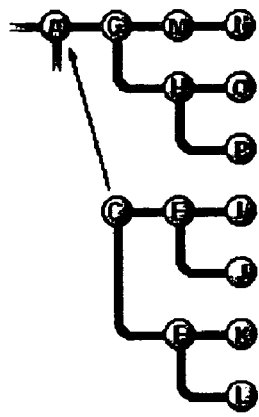

Referring now specifically to FIGS. 38E-38H (in which the case where Node C connects to Node A first is described), it is seen (in FIG. 38E) that Node C connects to Node A before Node G and that Node A sends Node G to Node C (in FIG. 38F). Further, the resulting configuration is seen in FIG. 38G (FIG. 38H shows the messages passed—of note, the message "Path to C" may refer to a message including information relating to a network path from the receiving node and/or the instructing node to Node C).

Figure 38J:
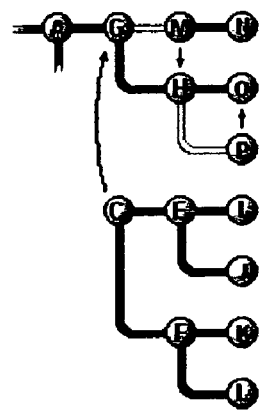
Figure 38K:
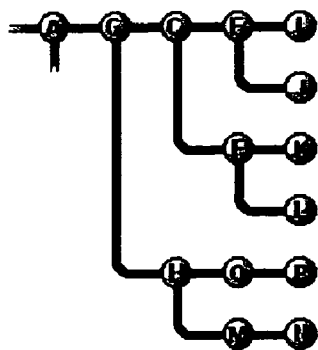
Figure 38L:
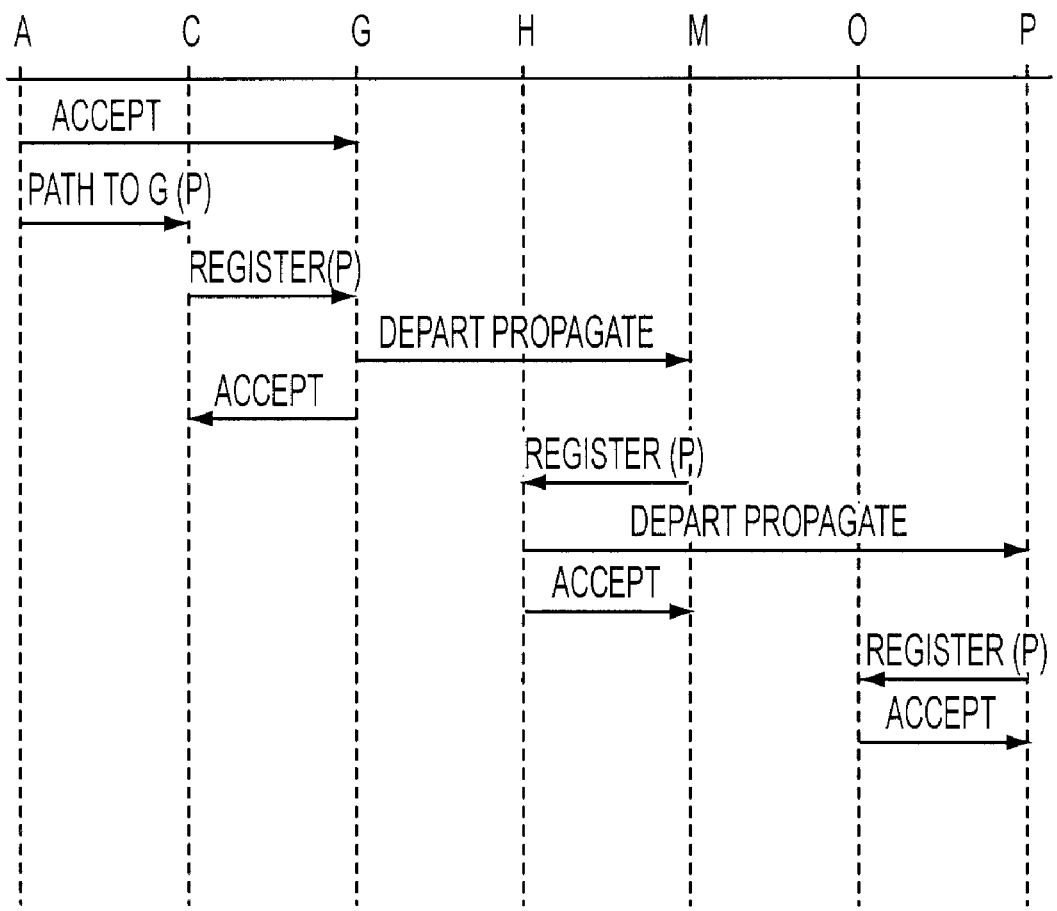

Referring now specifically to FIGS. 38I-38L (in which the case where Node G connects to Node A first is described), it is seen (in FIG. 38I) that Node G connects to Node A before Node C and that Node A sends Node C to Node G (in FIG. 38J). Further, the resulting configuration is seen in FIG. 38K (FIG. 38L shows the messages passed—of note, the message "Path to G" may refer to a message including information relating to a network path from the receiving node and/or the instructing node to Node G).

Figure 39A:
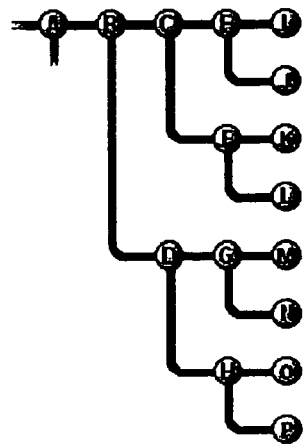
FIGS. 39A-39L relate to a "Simultaneous Departure of Adjacent Nodes (Green-Green)" example according to the present invention.

Referring now to a specific reconfiguration example hereinafter called "Simultaneous Departure of Adjacent Nodes (Green-Green)", FIGS. 39A-39L will be discussed. In this example (which example is intended to be illustrative and not restrictive), the original configuration is as shown in FIG. 39A.

Figure 39B:
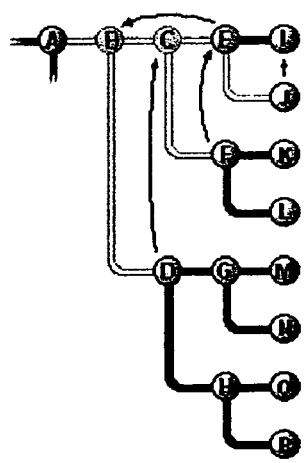

Further, as seen in FIG. 39B, both Node B and Node C depart essentially simultaneously.

Figure 39C:
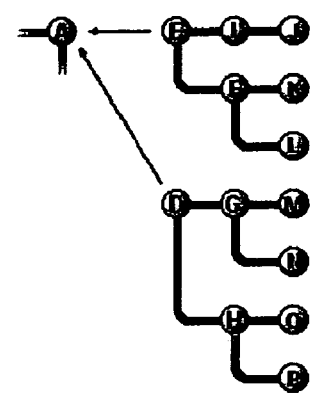
Figure 39D:
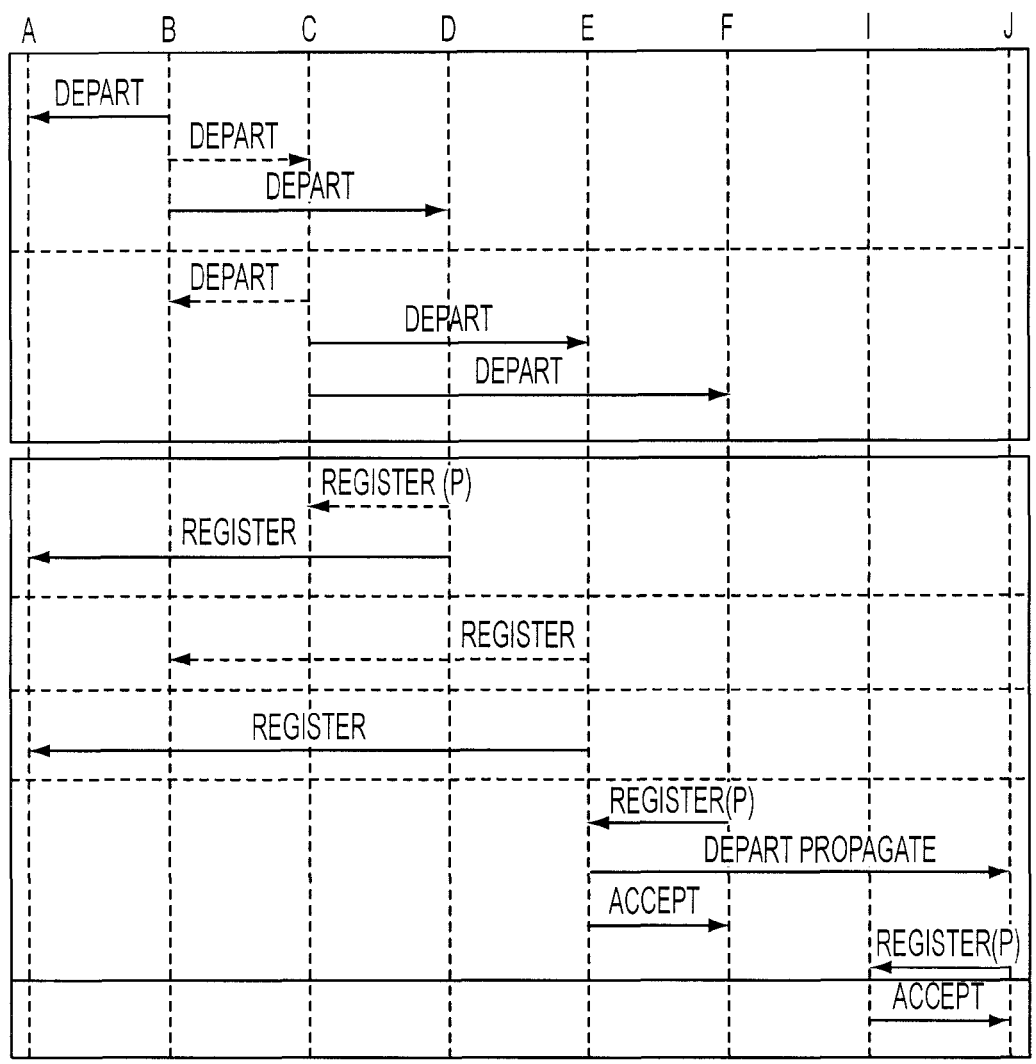
Figure 39E:
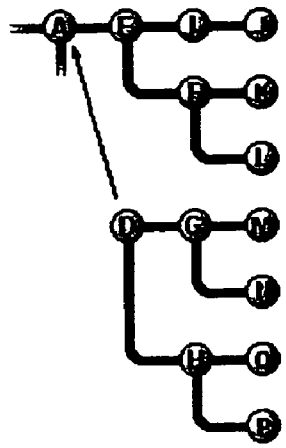

Further still, as seen in FIG. 39C, Node E and Node D fail to connect to the departed nodes and attempt to connect to Node A at about the same time. Thus, the messages passed are as seen in FIG. 39D (wherein a message depicted as a dashed line is sent to a departed node)

Figure 39F:
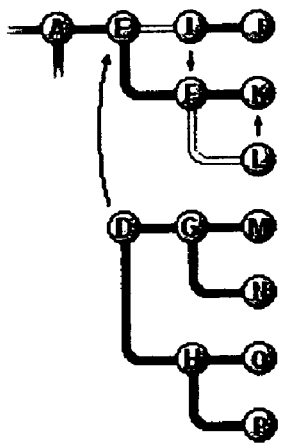
Figure 39G:
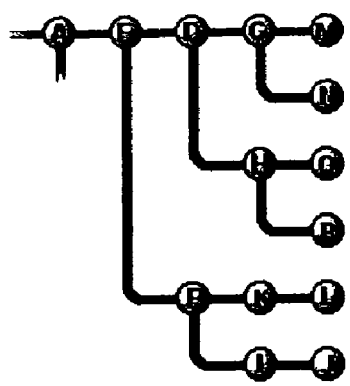
Figure 39H:
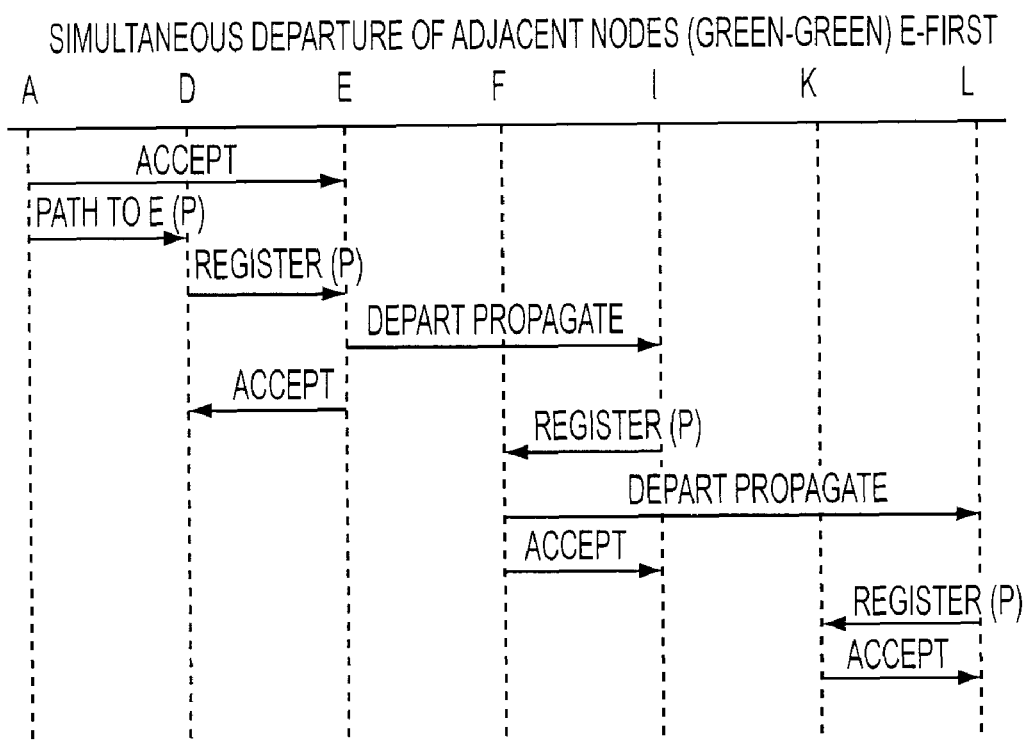
Figure 39I:
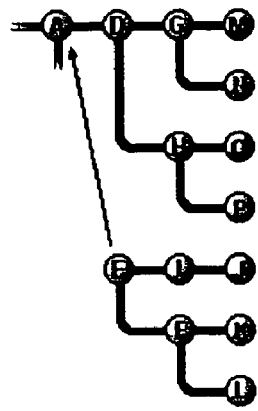

Referring now specifically to FIGS. 39E-39H (in which the case where Node E connects to Node A first is described), it is seen (in FIG. 39E) that Node E connects to Node A before Node D and that Node A sends Node D to Node E (in FIG. 39F). Further, the resulting configuration is seen in FIG. 39G (FIG. 39H shows the messages passed—of note, the message "Path to E" may refer to a message including information relating to a network path from the receiving node and/or the instructing node to Node E).

Figure 39J:
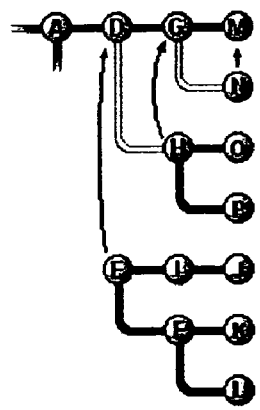
Figure 39K:
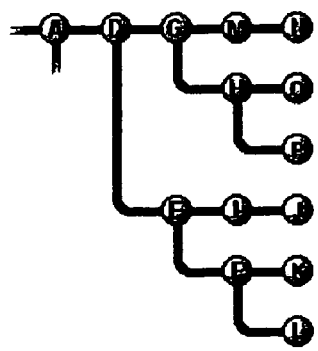
Figure 39L:
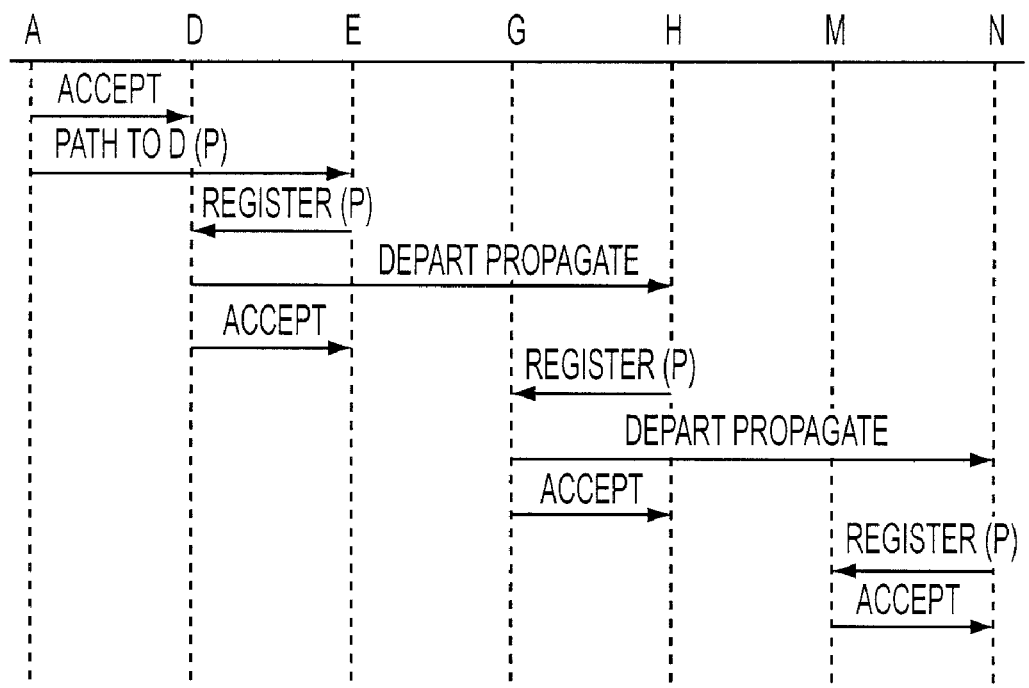

Referring now specifically to FIGS. 39I-39L (in which the case where Node D connects to Node A first is described), it is seen (in FIG. 39I) that Node D connects to Node A before Node E and that Node A sends Node E to Node D (in FIG. 39J). Further, the resulting configuration is seen in FIG. 39K (FIG. 39L shows the messages passed—of note, the message "Path to D" may refer to a message including information relating to a network path from the receiving node and/or the instructing node to Node D).

Figure 40A:
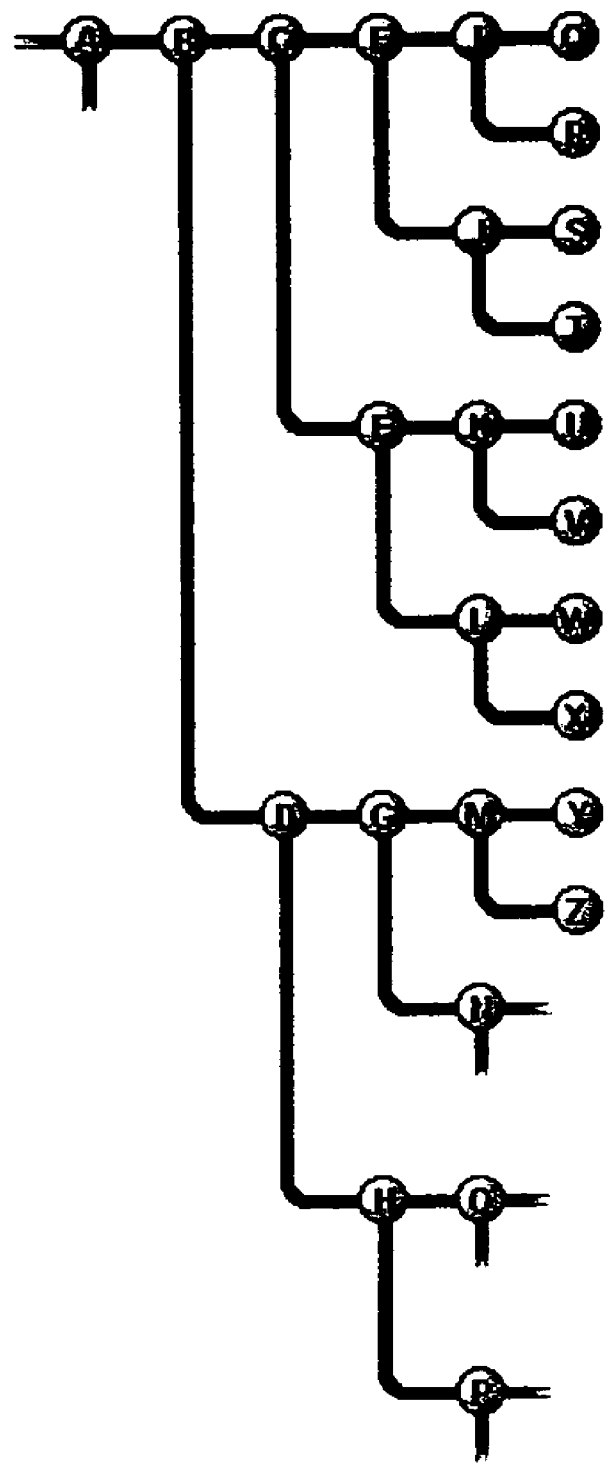
FIGS. 40A-40L relate to a "Simultaneous Departure of Nodes (Slip One Level)" example according to the present invention.

Referring now to a specific reconfiguration example hereinafter called "Simultaneous Departure of Nodes (Skip One Level)", FIGS. 40A-40L will be discussed. In this example (which example is intended to be illustrative and not restrictive), the original configuration is as shown in FIG. 40A.

Figure 40B:
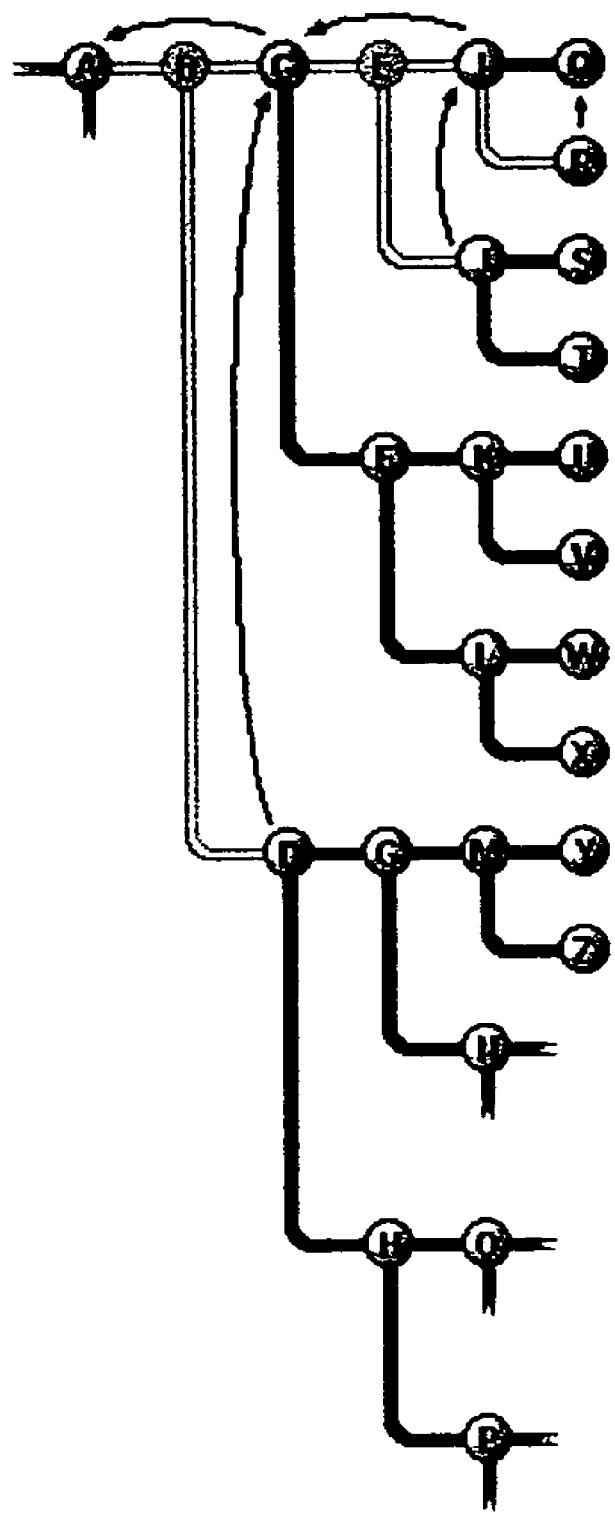

Further, as seen in FIG. 40B, both Node B and Node E depart essentially simultaneously.

Figure 40C:
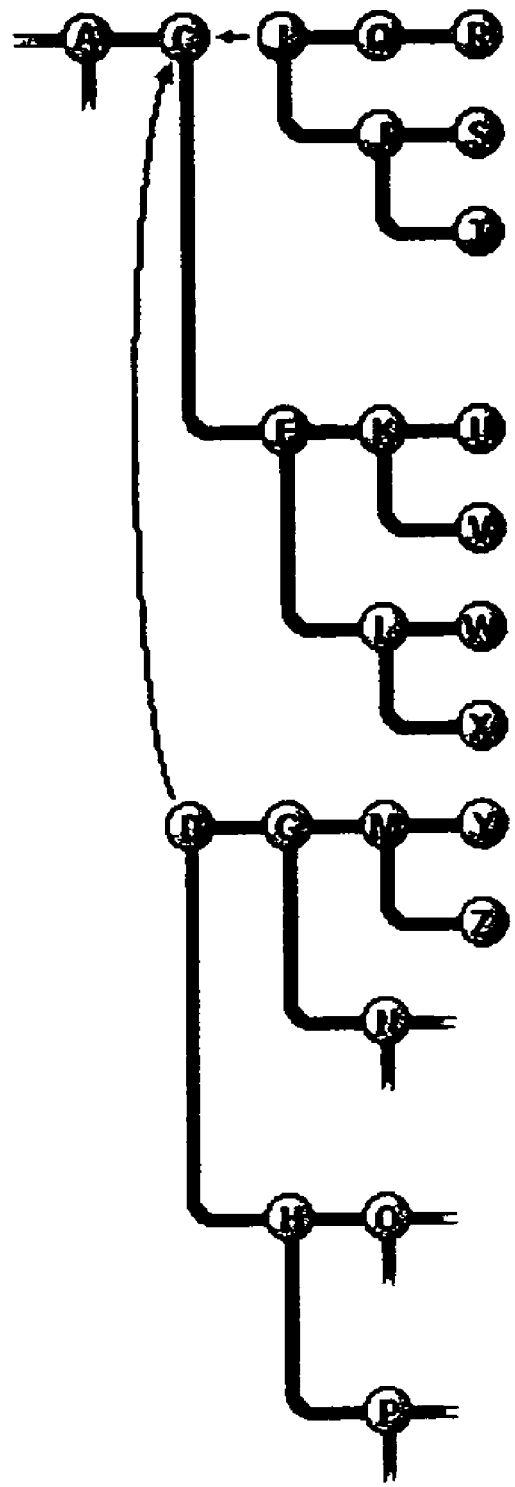
Figure 40D:
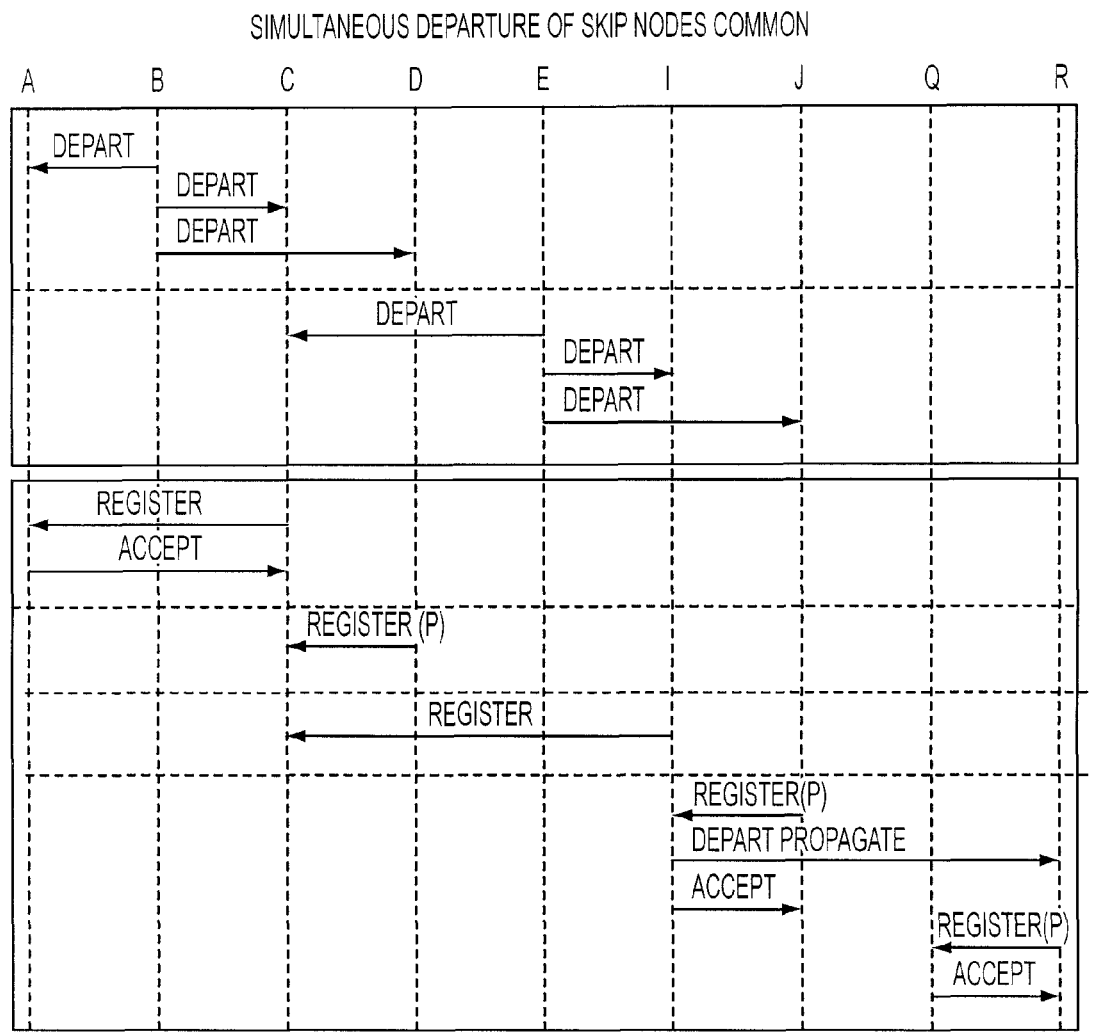
Figure 40E:
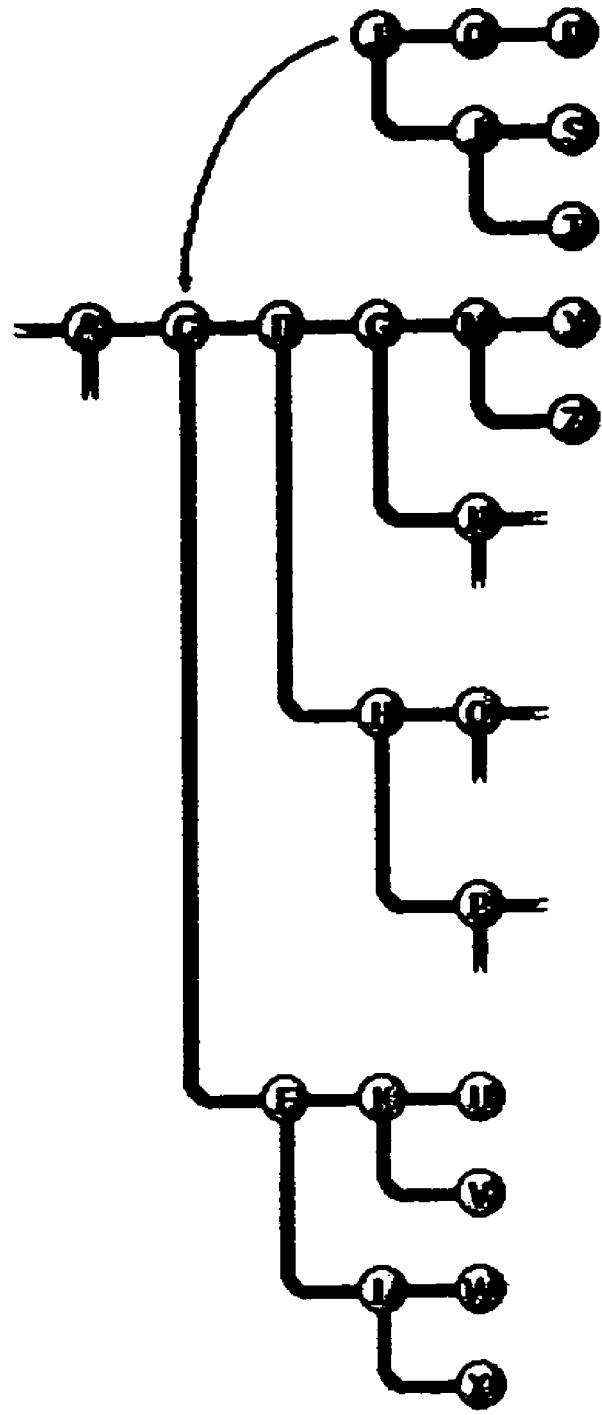

Further still, as seen in FIG. 40C, Node C successfully connects to Node A, and Nodes D and I attempt to connect to Node C at about the same time. Thus, the messages passed are as seen in FIG. 40D.

Figure 40F:
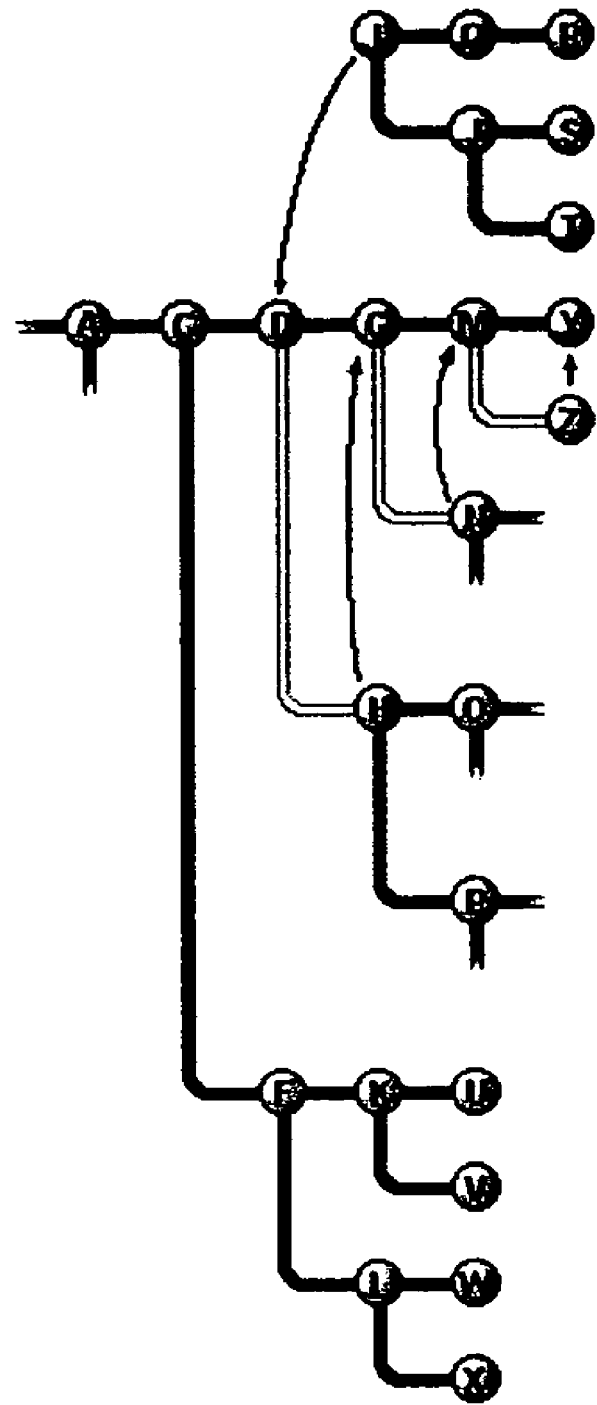
Figure 40G:
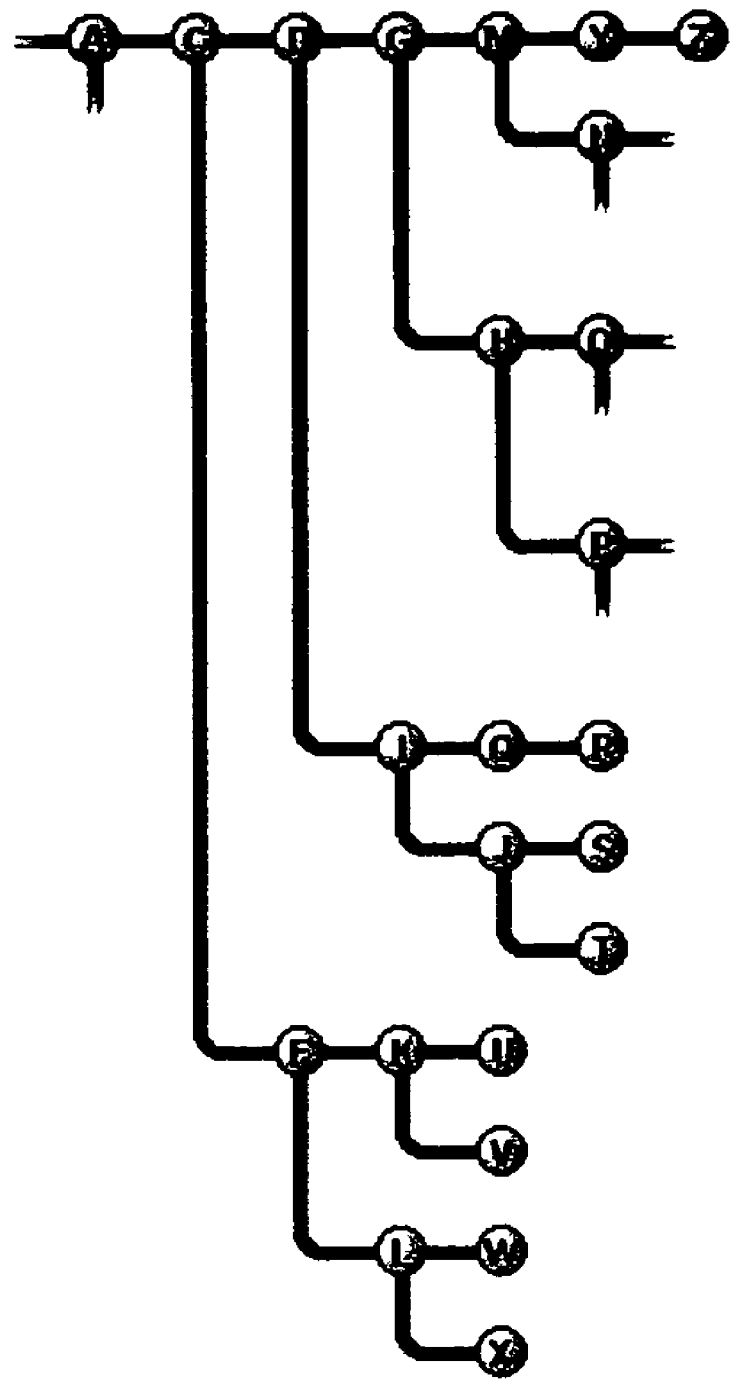
Figure 40H:
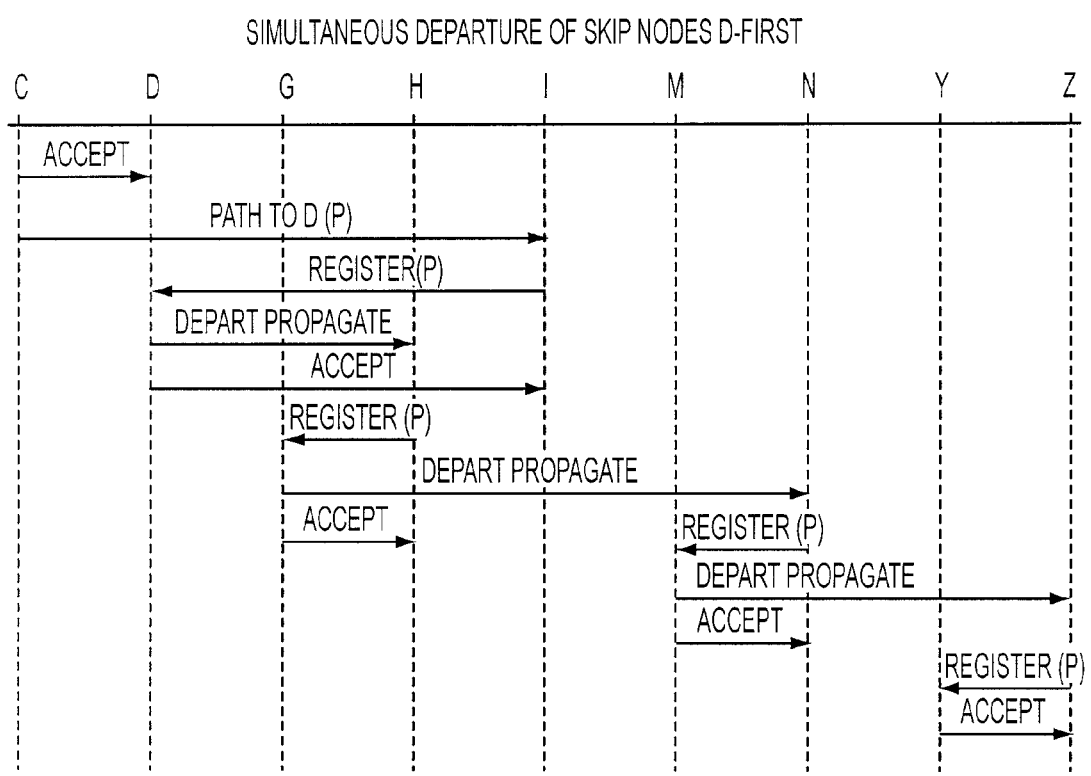
Figure 40I:
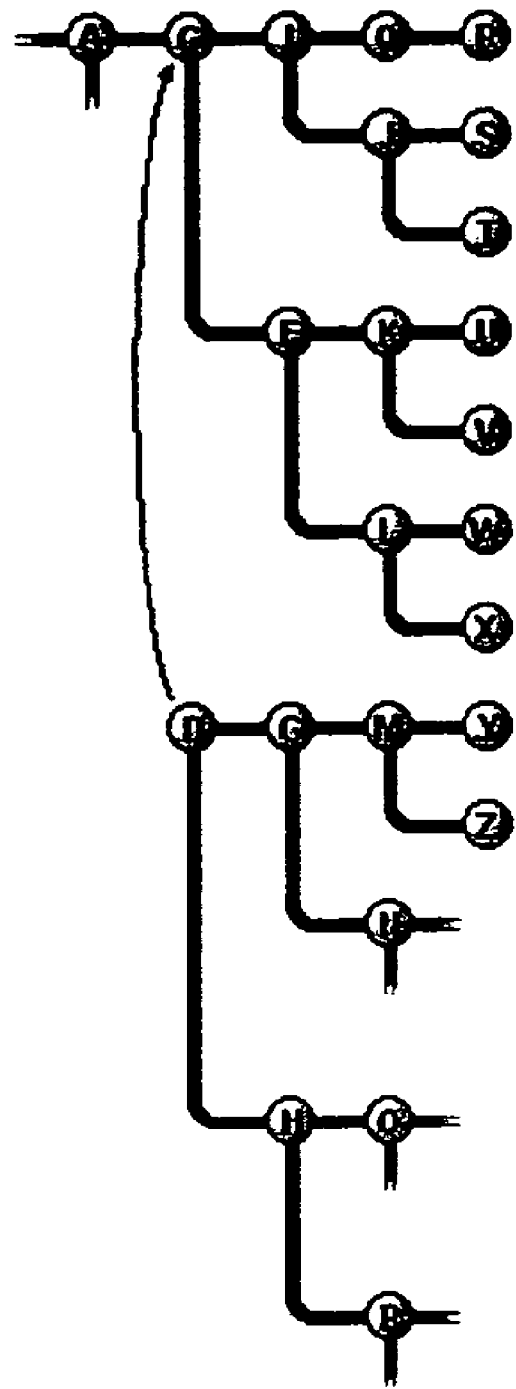

Referring now specifically to FIGS. 40E-40H (in which the case where Node D connects to Node C first is described), it is seen (in FIG. 40E) that Node D connects to Node C before Node I and that Node C sends Node I to Node D (in FIG. 40F). Further, the resulting configuration is seen in FIG. 40G (FIG. 40H shows the messages passed—of note, the message "Path to D" may refer to a message including information relating to a network path from the receiving node and/or the instructing node to Node D).

Figure 40J:
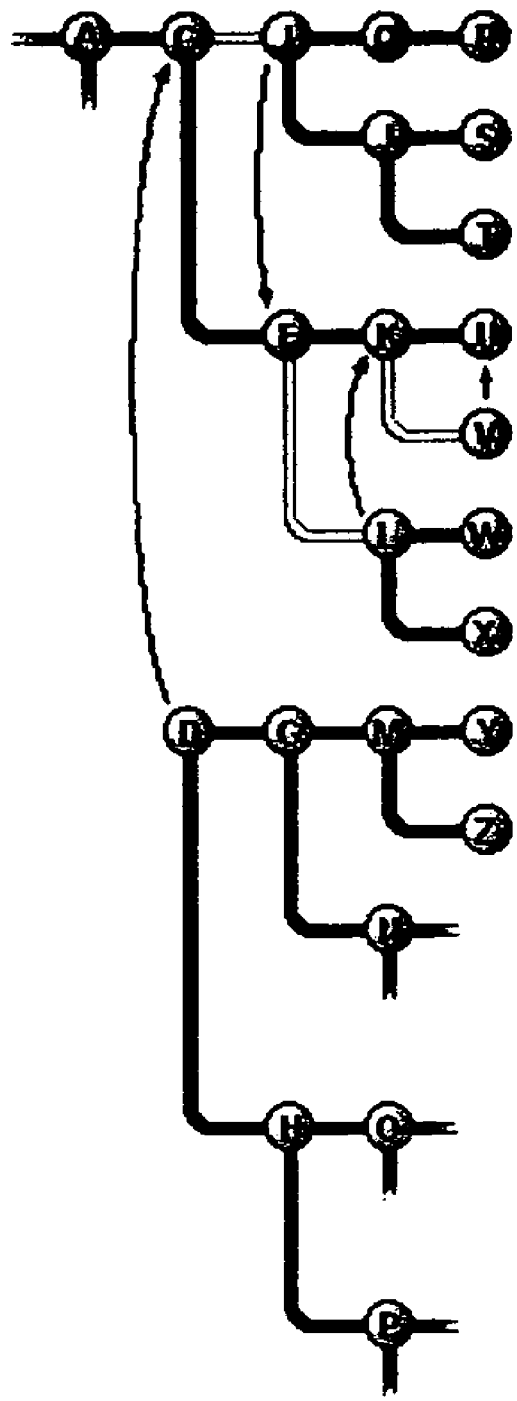
Figure 40K:
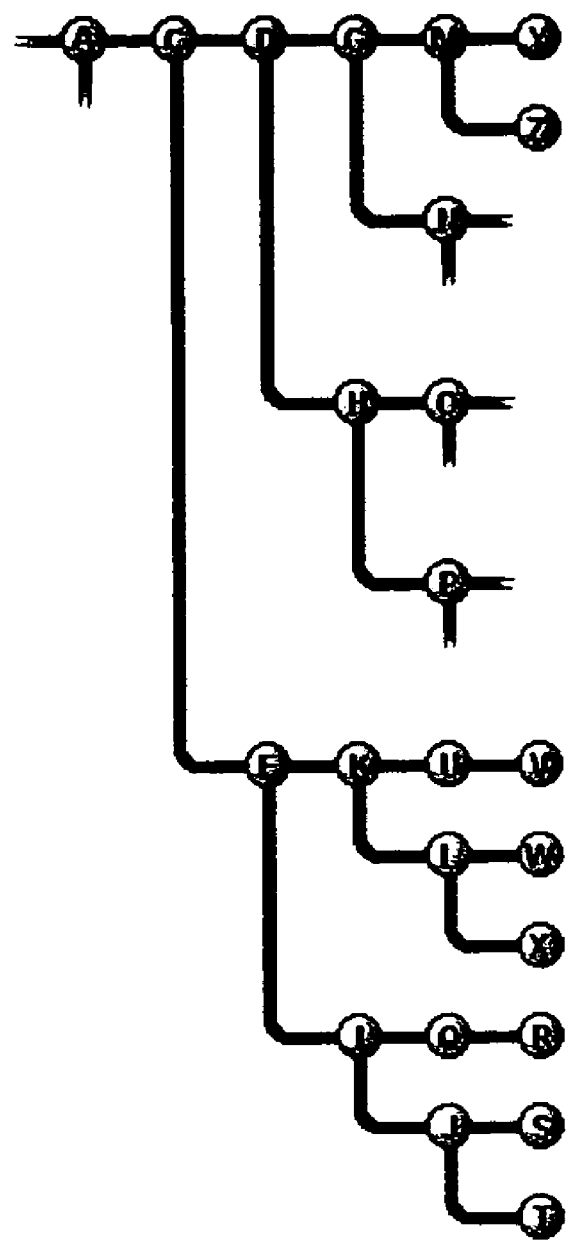
Figure 40L:
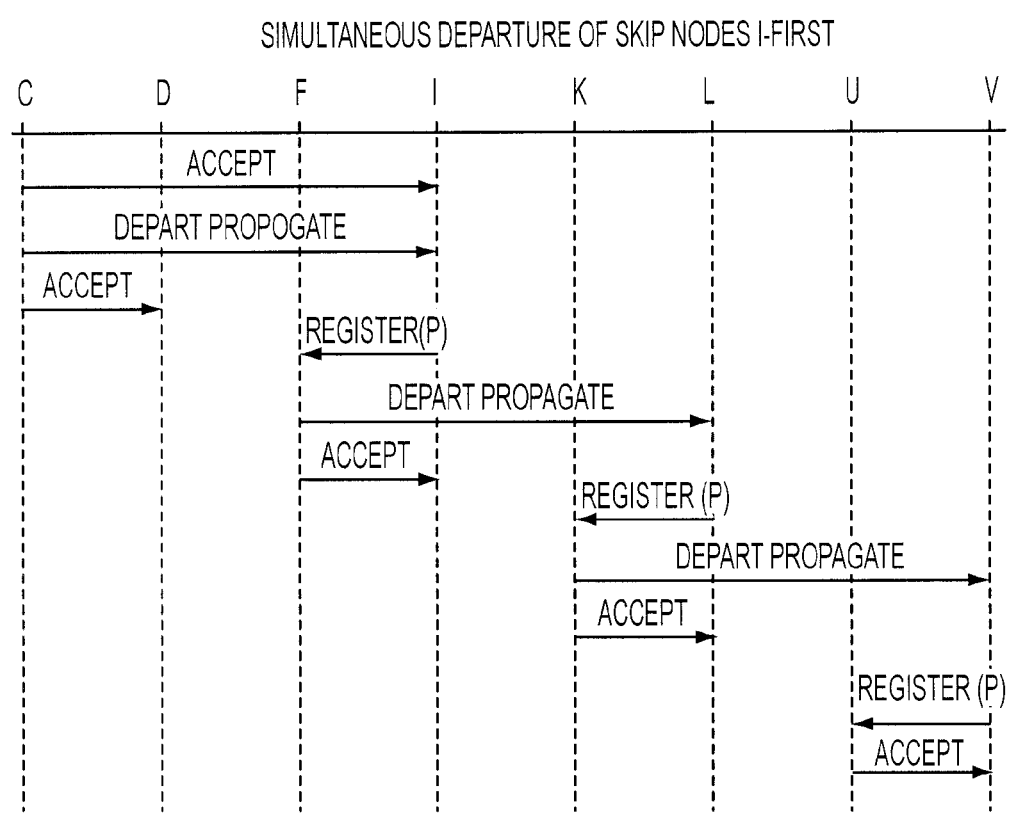

Referring now specifically to FIGS. 40I-40L (in which the case where Node I Connects to Node C first is described), it is seen (in FIG. 40I) that Node I connects to Node C before Node D and that Node C disconnects from Node I and accepts Node D (in FIG. 40J). Further, the resulting configuration is seen in FIG. 40K (FIG. 40L shows the messages passed).

In another embodiment (the "Bandwidth Self-Assessor" embodiment) that may be used instead of voting, or in conjunction with it, nodes can be enabled to monitor their bandwidth to their parent and children.

If the bandwidth from the parent drops below a certain level for a certain amount of time (e.g., if the bandwidth averaged over X seconds drops below a certain level for Y or more seconds) and all other existing connections are stable the node will assume its parent is malfunctioning and will climb its path to its grandparent, where it will perform a priority join, if not instructed to do otherwise. During this reconfiguration, the node maintains its existing child links.

If the bandwidth between the node and two or more other nodes drops below a certain level for a certain amount of time (e.g., if the bandwidth of each of these connections averaged over X seconds drops below a certain level for Y or more seconds), the node will assume that it is at fault and gracefully depart (send depart messages to its parent and children) and then climb its path (or return to the root server) as a node without children, in order to be placed at the network edge.

If the bandwidth between a node and only one of its children drops below a certain level for a certain amount of time (e.g., if the bandwidth averaged over X seconds drops below a certain level for Y or more seconds), the node will assume that its child is at fault and will send it a message instructing it to depart gracefully (send depart message to its children) and then climb its path (or return to the root server) as a node without children, in order to be placed at the network edge.

In the above description of the "Bandwidth Self Assessor", socket errors (i.e., a complete loss of the connection between two nodes) may be considered equivalent to a drop in bandwidth below the threshold level.

In situations where a node has only one child, in addition to a parent, the node may "spoof" a second child connection (for the purposes of bandwidth self assessment) by sending data back to its parent (or some other designated node) in order to simulate a connection to a second child.

As mentioned above, in order to isolate portions of the tree that are undergoing communications issues from portions of the tree that are healthy, PSB (Please Stand By) packets may be employed.

In one example, these packets may be sent by a node to its children when the node has no new data to give to its offspring. PSB packets may be data-full or data-less. Data-full PSB packets may be sent at regular intervals, for example, in order to keep bandwidth utilization above the threshold that would trigger the "Bandwidth Self Assessor" procedure. Transmission of these PSB packets from parent to children can maintain the structure of the network downtree while problems (e.g., socket errors, poorly performing nodes, poorly performing network links, etc.) uptree are being identified and corrected.

In another embodiment, an "I Was There Already" mechanism may be employed. In this embodiment, if Node X tries to connect with Node C (but is unable to so connect), Node X may tell its instructing node (e.g., Node P, a parent node of Node C) that it (i.e., Node X) had already tried to connect with Node C if the instructing node tries to route Node X back to Node C (the instructing node may then send Node X to another node for an attempted connection). In one example (which example is intended to be illustrative and not restrictive), one attempt by Node X to connect with Node C may be sufficient to implement the "I Was There Already" behavior. In another example (which example is intended to be illustrative and not restrictive), multiple unsuccessful attempts by Node X to connect with Node C may be required to implement the "I Was There Already" behavior. Of note, this "I Was There Already" behavior may be used to progressively move a node requesting a connection further uptree or downtree.

In another embodiment, a "Hyper-Child" mechanism may be employed. In one example of this embodiment (which example is intended to be illustrative and not restrictive), a parent Node P may connect to its child Node C as a child of Node C (e.g., in order to test that connection with Node C—such testing may include, for example, upstream and/or downstream bandwidth capability).

In another example (which example is intended to be illustrative and not restrictive), a connection with any desired node (not just a child) may be tested by any other desired node (not just a parent).

Figure 41:
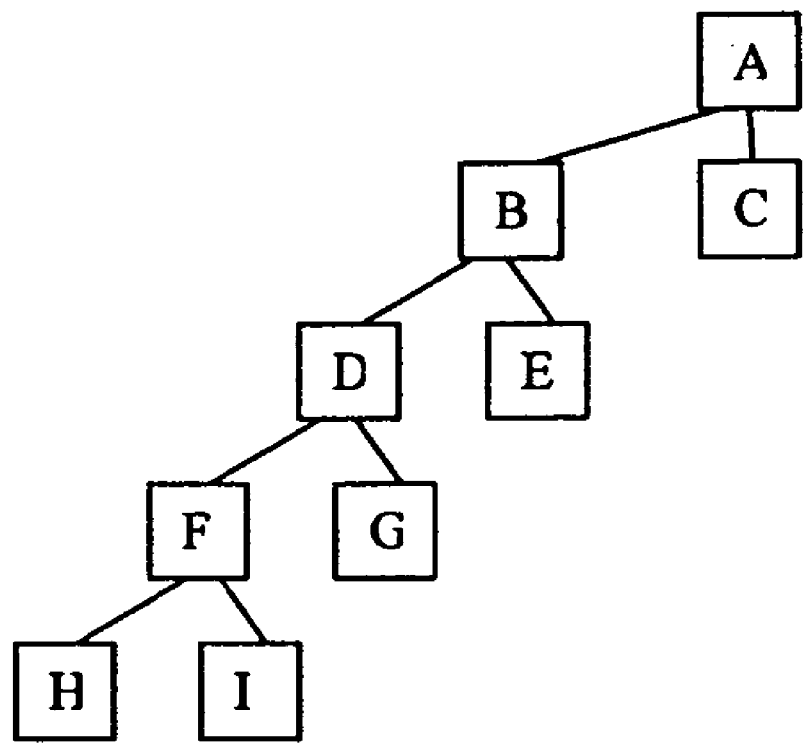
FIG. 41 relates to a "Reconfiguration—Soft Node" example according to the present invention.

Referring now to a specific reconfiguration example called "Reconfiguration—Soft Node", FIG. 41 will be discussed. In this example (which example is intended to be illustrative and not restrictive), a portion of a network with Nodes A-I is shown. Under this Reconfiguration—Soft Node example, assume that Node D leaves the network and Node B knows of the event (i.e., the departure and the upcoming reconfiguration). For a certain length of time (e.g., a predetermined time "window") Node B will accept only one of its grandchildren (Node F or Node G) as a new child node. If Node F or Node G connects with Node B, the sibling/descendent nodes will move in to fill the "hole" as discussed above. On the other hand, if Nodes F and G are "no-shows" within the allotted length of time (i.e., do not connect with Node B), then for a certain length of time (e.g., a predetermined time "window") Node B will expand the group of acceptable nodes to include its great-grandchildren (Node H or Node I) in addition to its grandchildren (Node F or Node G) as a new child node. Again, if Node H or Node I connects with Node B, the sibling/descendent nodes will move in to fill the "hole" as discussed above. If not, this process may continue downtree level-by-level until the leaves are reached (or until a certain amount of time has passed). Of note, the time windows allotted for each level may be the same or may be different.

Of further note, this behavior may prevent a new node from "jumping the line" and becoming a child of Node B before any grandchildren, great-grandchildren, etc. of Node B have a chance to fill the vacant connection left by Node D.

In another embodiment, the following process may be employed when a node enters the network. More particularly, when the server adds a node X to the system (gives it a connection path to node Y) the server will add node X to its network topology model as a child of node Y. In other words, the server will assume that the connection will take place normally with no errors. The reason why doing so may be critical to the functioning of the system in this embodiment is that if the server failed to account for the fact that node X is now (probably) a child of node Y, using the "keep the tree balanced" approach embodied in the Universal Connection Address Routine, all new nodes connecting to the system would be assigned as children of node Y up until the point where a propagate up arrives indicating that node X was successfully added to the tree. If the tree is large and node Y is many levels removed from the server it could be some time (e.g., a minute or more, in very large trees several minutes) before confirmation arrives that node X truly connected to node Y as its child.

Now, in addition to simply placing node X into the server's NTM (Network Topology Model) and being done with the matter, in this embodiment the system must account for the fact that it may take a number of propagate NTM/up cycles for the true status of node X to be reported back to the server. Thus, for some number of propagate cycles (or some amount of time) the server may compare the newly propagated (updated) NTM it is receiving from its children to the list of "recently added nodes". If a recently added node is not in the propagated NTM it will be re-added to the NTM as a child of node Y. At some point node X will no longer be considered "recently added" and the server will cease adding node X back into its NTM. In other words, the server will assume that, for whatever reason, node X never successfully connected to the network.

In another embodiment, the following process may be employed when a node gracefully exits the system. More particularly, when a node (node X) leaves the network by performing a graceful exit (e.g., the user selects "exit" or clicks the "x" or issues some other command to close the application) the node will send signals to its parent and child nodes (if any) immediately prior to actually shutting down. Upon receipt of such a "depart" message, the parent of the departing node (node P) will modify its internal NTM (Network Topology Model) to a configuration that corresponds to the predicted shape of the network after the departing node exits. In this embodiment, node P will assume that its NTM is accurate and that the entire cascade of reconfiguration events initiated by the departure of node X will happen normally. As such, node P will now expect the former green child of node X (node XG—if such a child exists) to connect—essentially taking node X's place in the network.

At this point, node P's NTM represents a prediction of the (anticipated) state of the network rather than the actual reported configuration. In order to indicate that node P does not (yet) have a physical connection to node XG, node P will mark node XG as "soft" in its NTM—meaning node XG is expected to take up this position in the network but has not yet physically done so. Node P will report this "predicted" NTM (along with node XG's status as a soft node) up during its propagate NTM/Up cycles, until node P physically accepts a child connection in node XG's "reserved" spot and receives an actual report of the shape of the downtree NTM from that child, via propagate NTM/ups.

Of note, the above actions may be taken in order to have the propagated NTM's reflect, as accurately as possible, the topology of the network.

Of further note, because of the distributed nature of a network according to the present invention, a complete and accurate picture of the current shape of the network at any instance in time can never be guaranteed. In fact, though the root server has the "widest" view of the network, without the heuristics described herein, that view would be the "most dated" of any node in the network. Thus, heuristics such as those just described may be vital to producing NTM's that are as close to complete and accurate as possible (e.g., so that the Universal Connection Address Routine can position incoming nodes so as to keep the distribution tree as nearly balanced as possible).

In another embodiment the present invention may be used when a plurality of computer systems are connected (e.g., to the Internet) by one or more of an ISDN line, a DSL (e.g., ADSL) line, a cable modem, a T1 line and/or an even higher capacity link.

In another embodiment a distribution network for the distribution of data from a parent user node to at least one child user node connected to the parent user node is provided, which distribution network comprises: a mechanism for measuring a data flow rate into the parent user node; a mechanism for measuring a data flow rate from the parent user node to the child user node; and a mechanism for removing the parent user node from the distribution network; wherein the mechanism for removing the parent user node from the distribution network removes the parent user node from the distribution network if the data flow rate into the parent user node is greater than the data flow rate from the parent user node to the child user node.

In another embodiment a distribution network for the distribution of data from a parent user node to at least one child user node connected to the parent user node and from the child user node to at least one grandchild user node connected to the child user node is provided, which distribution network comprises: a mechanism for determining when the child user node leaves the network; a mechanism for adding a new user node to the network; and a mechanism for refusing connection, for a predetermined period of time after it is determined that the child user node leaves the network, of the new user node to the parent user node; wherein, during the predetermined period of time, the parent user node will only connect with the grandchild user node.

The following embodiments will now describe a number of additional example algorithms which may be utilized in whole or in part to implement the present invention:

In one embodiment a process for docking a connection requesting user node with a distribution network is provided, said process including the following steps:
 (a) having an instructing node receive a connection request from said connection requesting user node;
 (b) forming an instructing node topology database indicating, at a point in time:
  (i) which, if any, user nodes are docked with said instructing node as child nodes; which, if any, user nodes are docked with each of said child nodes as grandchild nodes of said instructing node; which, if any, user nodes are docked with each of said grandchild nodes as great-grandchild nodes of said server node; and so on; and
  (ii) said docked user nodes respective bandwidth capacities;
 (c) selecting from a group of nodes including the instructing node and said docked user nodes a recommended parent node for said connection requesting user node, wherein said recommended parent node has apparent available capacity to transmit content data to said connection requesting user node and is at least as close (i.e., in terms of network topology) to said instructing node as any other docked user node having apparent available capacity to transmit content data to said connection requesting user node (of note, placement may also or alternatively depend, as described elsewhere in the present application, in whole or in part on whether the connection requesting node is repeat-capable or not (i.e., whether it can support children)); and
 (d) providing a connection address list to said connection requesting user node, said connection address list listing each node in said instructing node's topology database from said recommended parent node back to said instructing node.

In one example, the process may further comprise the following steps:
 (e) having said connection requesting user node go to (or attempt to go to) the node at the top of said connection address list;
 (f) having said connection requesting user node determine whether the node at the top of said connection address list is part of the distribution network;
 (g) if the node at top of said connection address list is not part of the distribution network, deleting such node from said connection address list and repeating steps (e) and (f) with respect to the next node at the top of said connection address list;
 (h) if the node at the top of said connection address list is part of said distribution network, having said connection requesting user node dock with said node at the top of said connection address list.

In another example, step (d) may further comprise the following step:
 (i) if said instructing node is not a server node, including in said connection address list a list of nodes cascadingly connected with each other from the instructing node back to said server node.

In another example, the process may further comprise the following steps:
 (e) having said connection requesting user node go to (or attempt to go to) the node at the top of said connection address list;
 (f) having said connection requesting user node determine whether the node at the top of said connection address list is part of the distribution network;
 (g) if the node at the top of said connection address list is not part of the distribution network, deleting such node from said connection address list and repeating steps (e) and (f) with respect to the next node at the top of said connection address list;
 (h) if the node at the top of said connection address list is part of said distribution network, determining whether said node at the top of said connection address list has available capacity to transmit content data to said connection requesting user node; and
 (i) if the node at the top of said connection address list is part of said distribution network and has available capacity to transmit content data to said connection requesting user node, having said connection requesting user node dock with the node at the top of said connection address list.

In another example, the process may further comprise the following steps:
 (j) if the node at the top of connection address list is part of said distribution network and said node at the top of said connection address list does not have available capacity to transmit content data to said connection requesting user node, repeating steps (a)-(d), with said node at the top of connection address list being said instructing node and a new connection address list being the product of steps (a)-(d).

In another example, the process may further comprise the steps of counting the times that step (j) is performed and, when step (j) is performed a predetermined number of times, having said connection requesting user node repeat steps (a)-(d) with said primary server being the instructing node.

In another embodiment a process for docking a connection requesting user node with a distribution network is provided, said process including the following steps:
 (a) having an instructing node receive a connection request from said connection requesting user node;
 (b) forming an instructing node topology database indicating, at a point in time:
  (i) which, if any, user nodes are docked with said instructing node as child nodes; which, if any, user nodes are docked with each of said child nodes as grandchild nodes of said instructing node; which, if any, user nodes are docked with each of said grandchild nodes as great-grandchild nodes of said server node; and so on; and
  (ii) said docked user nodes' respective bandwidth capacities;
 (c) assigning utility ratings to each of the docked user nodes, said utility ratings being a function of at least the bandwidth capacity of the docked user node and the elapsed time that the docked user node has been docked with the distribution network;

(d) selecting from a group of nodes including the instructing node and said docked user nodes a recommended parent node for said connection requesting user node, wherein said recommended parent node has apparent available capacity to transmit content data to said connection requesting user node and is at least as close (i.e., in terms of network topology) to said instructing node as any other docked user node having apparent available capacity to transmit content data to said connection requesting user node, and when the closest (i.e., in terms of network topology) docked user node with apparent available capacity to transmit content data to said connection requesting user node is equidistant (i.e., in terms of network topology) to said instructing node with at least one other docked user node with apparent available capacity to transmit content data to said connection requesting user node, said recommended parent node is the docked user node having the highest utility rating among such equidistant (i.e., in terms of network topology) docked user nodes with apparent available capacity; and (e) providing a connection address list to said connection requesting user node, said connection address list listing each node in said instructing node's topology database from said recommended parent node back to said instructing node and, if said instructing node is not a primary server node, back to said primary server node.

In another embodiment a process for docking a connection requesting user node with a distribution network is provided, said process including the following steps:

(a) having an instructing node receive a connection request from said connection requesting user node;

(b) forming an instructing node topology database indicating, at a point in time:

(i) which, if any, user nodes are docked with said instructing node as child nodes; which, if any, user nodes are docked with each of said child nodes as grandchild nodes of said instructing node; which, if any, user nodes are docked with each of said grandchild nodes as great-grandchild nodes of said instructing node; and so on; and (ii) said docked user nodes' respective bandwidth capacities, including a designation of whether said respective docked user node's bandwidth capacity is below a predetermined threshold (e.g., said respective docked user node is a low-bandwidth node) or at least said predetermined threshold (e.g., said respective docked user node is a high-bandwidth node);

(c) forming a primary recommended parent node list ("PRPL") comprised of the instructing node (if it has available capacity to transmit content data to said connection requesting user node) plus those docked user nodes having apparent available capacity to transmit content data to said connection requesting user node, with said instructing node being placed first on the PRPL (if it is on the PRPL) and said docked user nodes having apparent available capacity to transmit content date to said connection requesting user node being ranked with those docked nodes which are closer (i.e., in terms of network topology) to the instructing node being ranked higher than those docked nodes which are further away (i.e., in terms of network topology) and with equidistant (i.e., in terms of network topology) docked user nodes being ranked such that those docked nodes which have the higher utility ratings being ranked higher than docked nodes having lower utility ratings;

(d) forming a secondary recommended parent node list ("SRPL") comprised of the instructing node (if it has no available capacity to transmit content data to said connection requesting user node but does have at least one low-bandwidth node docked directly to it) plus said docked user nodes which (i) are high-bandwidth nodes with no available capacity to transmit content data to said connection requesting user node and (ii) have at least one low-bandwidth node docked directly to it, with said instructing node being placed first on the SRPL (if it is on the SRPL) and said docked user nodes on the SRPL being ranked with those docked nodes which are closer (i.e., in terms of network topology) to the instructing node being ranked higher than those docked nodes which are further away (i.e., in terms of network topology) and with equidistant (i.e., in terms of network topology) docked user nodes being ranked such that those docked nodes which have the higher utility ratings being ranked higher than docked nodes having lower utility ratings;

(e) determining whether the connection requesting user node is a low-bandwidth node;

(f) if the connection requesting user node is a low-bandwidth node:

(i) selecting the highest ranked node on the PRPL as a recommended parent node; and (ii) providing a connection address list to said connection requesting user node, said connection address list listing each node in said instructing node's topology database from said recommended parent node back to said instructing node and, if said instructing node is not a primary server node, back to said primary server node; and (g) if the connection requesting user node is a high-bandwidth node:

(i) selecting the highest ranked node on the PRPL as a recommended parent node;

(ii) selecting the highest ranked node on the SRPL as an alternate recommended parent node;

(iii) determining whether the alternate recommended parent node is closer (i.e., in terms of network topology) to the server node than the recommended parent node;

(iv) if the alternate recommended parent node is not closer (i.e., in terms of network topology) to the server node than the recommended parent node, providing a connection address list to said connection requesting user node, said connection address list listing each node in said instructing node's topology database from said recommended parent node back to said instructing node and, if said instructing node is not the primary server node, back to said primary server node;

(v) if the alternate recommended parent node is closer (i.e., in terms of network topology) to the server node than the recommended parent node, (1) forcing the disconnection of a low-bandwidth node from the alternate recommended parent node and (2) providing a connection address list to said connection requesting user node, said connection address list listing each node in said instructing node's topology database from said alternate recommended parent node back to said instructing node and, if said instructing node is not the primary server node, back to said primary server node.

In one example, step (f)(ii) may include the following steps:

(1) adding said connection requesting user node to the topology database as a child of the recommended parent node; and (2) if said recommended parent node would have no apparent available capacity to transmit content data to an additional node with said connection requesting user node docked with it, deleting the recommended parent node from the PRPL and adding it to the SRPL.

In another example, step (g)(iv) may include the following steps:

(1) adding said connection requesting user node to the topology database as a child of the recommended parent node;

(2) if said recommended parent node would have no apparent available capacity to transmit content data to an additional node with said connection requesting user node docked with it, deleting the recommended parent node from the PRPL; and (3) if said recommended parent node is deleted from the PRPL but has at least one low-bandwidth node docked directly to it, adding the recommended parent node to the SRPL.

In another example, step (g)(v) may include the following steps:

(3) adding said connection requesting user node to the topology database as a child of the alternate recommended parent node; and 4) if said alternate recommended parent node would have no apparent available capacity to transmit content data to an additional node with said connection requesting user node docked with it, deleting the alternate recommended parent node from the SRPL.

In another example, the process may further comprise the following steps:

(h) having said connection requesting user node go to (or attempt to go to) the node at the top of said connection address list;

(i) having said connection requesting user node determine whether the node at the top of said connection address list is part of the distribution network;

(j) if the node at top of connection address list is not part of the distribution network, deleting such node from connection address list and repeating steps (h) and (i) with respect to the next node at the top of connection address list; and (k) if the node at top of connection address list is part of said distribution network, having said connection requesting user node dock with said node at the top of connection address list.

In another example, the process may further comprise the following steps:

(h) having said connection requesting user node go to (or attempt to go to) the node at the top of connection address list;

(i) having said connection requesting user node determine whether the node at the top of said connection address list is part of the distribution network;

(j) if the node at top of connection address list is not part of the distribution network, deleting such node from connection address list and repeating steps (h) and (i) with respect to the next node at the top of connection address list;

(k) if the node at the top of connection address list is part of said distribution network, determining whether said node at the top of connection address list has available capacity to transmit content data to said connection requesting user node; and (l) if the node at the top of said connection address list is part of said distribution network and has available capacity to transmit content data to said connection requesting user node, having said connection requesting user node dock with the node at the top of said connection address list.

In another example, the process may further comprise the following steps:

(m) if the node at the top of said connection address list is part of said distribution network and the node at the top of said connection address list does not have available capacity to transmit content data to said connection requesting user node, repeating steps (a)-(g), with the node at the top of said connection address list being said instructing node and a new connection address list being the product of steps (a)-(g).

In another example, the process may further comprise the steps of counting the times that step (m) is performed and, when step (m) is performed a predetermined number of times, having said connection requesting user node repeat steps (a)-(g) with said primary server being the instructing node.

In another embodiment a process for docking a connection requesting user node with a distribution network is provided, said process including the following steps:

(a) having an instructing node receive a connection request from said connection requesting user node;

(b) determining whether said connection requesting user node's bandwidth capacity is below a predetermined threshold (e.g., said connection requesting user node is a low-bandwidth node) or at least said predetermined threshold (e.g., said connection requesting user node is a high-bandwidth node);

(c) forming an instructing node topology database indicating, at a point in time:
  (i) which, if any, user nodes are docked with said instructing node as child nodes; which, if any, user nodes are docked with each of said child nodes as grandchild nodes of said instructing node; which, if any, user nodes are docked with each of said grandchild nodes as great-grandchild nodes of said server node; and so on; and
  (ii) said docked user nodes' respective bandwidth capacities;

(d) if said connection requesting user node is a high-bandwidth user node, selecting from a group of nodes including the instructing node and said docked user nodes a recommended parent node for said connection requesting user node, wherein said recommended parent node has apparent available capacity to transmit content data to said connection requesting user node and is at least as close (i.e., in terms of network topology) to said instructing node as any other docked user node having apparent available capacity to transmit content data to said connection requesting user node;

(e) if said connection requesting user node is a low-bandwidth user node, selecting from a group of nodes including the instructing node and said docked user nodes a recommended parent node for said connection requesting user node, wherein said recommended parent node has apparent available capacity to transmit content data to said connection requesting user node and is at least as far (i.e., in terms of network topology) from said instructing node as any other docked user node having apparent available capacity to transmit content data to said connection requesting user node; and (f) providing a connection address list to said connection requesting user node, said connection address list listing each node in said instructing node's topology database from said recommended parent node back to said instructing node.

In one example, step (f) may further comprise the following step: (i) if said instructing node is not a server node, including in said connection address list a list of nodes cascadingly connected with each other from the instructing node back to said server node.

In another embodiment a process for connecting a connection requesting user node to a computer information distribution network having a primary server node and user nodes docked therewith in a cascaded relationship is provided, said process further comprising the following steps:

(a) providing said connection requesting user node with a connection address list which sets forth a list of user nodes docked in series with each other back to said primary server;

(b) having said connection requesting user node go to (or attempt to go to) the node at top of said connection address list;

(c) having said connection requesting user node determine whether the node at the top of said connection address list is part of the distribution network;

(d) if the node at the top of said connection address list is not part of the distribution network, deleting such node from said connection address list and repeating steps (b) and (c) with respect to the next node at the top of connection address list; and (e) if the node at the top of said connection address list is part of said distribution network, having said connection requesting user node dock with the node at the top of said connection address list.

In another embodiment a process for connecting a connection requesting user node to a computer information distribution network having a primary server node and user nodes docked therewith in a cascaded relationship is provided, said process further comprising the following steps:

(a) providing said connection requesting user node with a connection address list which sets forth a list of user nodes docked in series with each other back to said primary server;

(b) having said connection requesting user node go to (or attempt to go to) the node at the top of said connection address list;

(c) having said connection requesting user node determine whether the node at the top of said connection address list is part of the distribution network;

(d) if the node at the top of said connection address list is not part of the distribution network, deleting such node from connection address list and repeating steps (b) and (c) with respect to the next node at the top of said connection address list;

(e) if the node at the top of said connection address list is part of said distribution network, determining whether the node at the top of said connection address list has available capacity to transmit content data to said connection requesting user node; and (f) if the node at the top of said connection address list is part of said distribution network and has available capacity to transmit content data to said connection requesting user node, having said connection requesting user node dock with the node at the top of said connection address list.

In another embodiment relating to a computer information distribution network comprising a primary server node and user nodes docked therewith in a cascaded relationship, wherein each user node may have no more than a predetermined maximum number of child nodes docked with it, a process for reconfiguring the network in the event of a user node's departure therefrom is provided, said process including the following steps:

(a) providing information at a point in time to a node in the distribution network as follows:
  (i) the node's propagation rating if it is a user node having a parent node which is a user node, wherein a propagation rating is one of a predetermined number of grades ranging from highest to second highest to third highest and so on, with the number of grades being equal to said predetermined maximum number;
  (ii) an ancestor list setting forth the node's ancestor nodes' addresses (if it has any ancestor nodes) back to the primary server node, with the node's parent node being atop the ancestor list;
  (iii) a sibling list of the node's sibling nodes' addresses (if it has any sibling nodes) and their respective propagation ratings (of note, in another example (which example is intended to be illustrative and not restrictive), nodes may not have data about their sibling (i.e., nodes do not know who their sibling is); instead, the mechanism used to get a red node to connect to its green sibling may be for the parent of those two nodes (or a proxy for that parent) to send the red child: (1) a connection path with that red child's green sibling at the top of the path; and (2) a command to "priority join" to that green child—when the green child node accepts the incoming "priority join" connection request from its former red sibling, the green node will kick its own red child (if such a child exists) instructing that red child to join as a child of its own green sibling (these actions will cause a chain reaction of reconfigurations which will cascade until the edge of the tree is reached)); and
  (iv) a child list of the node's child nodes' addresses (if it has any child nodes) and their respective propagation ratings;

(b) having a first node send a propagation signal to each former child node of a departed node, wherein said first node is an ancestor of said former child node of said departed node;

(c) with respect to each child node receiving the propagation signal which did not have the highest propagation rating prior to its receiving the propagation signal (hereinafter referred to as a "red node"), upon its receiving the propagation signal:
  (i) setting the propagation rating of the red node to the next higher grade above the propagation rating of that red node before it received the propagation signal;
  (ii) having the red node undock from its parent node (if it was docked with its parent node before it received the propagation signal); and
  (iii) having the red node dock with its sibling node which had the highest propagation rating prior to the red node's receiving the propagation signal;

(d) with respect to each child node receiving the propagation signal which had the highest propagation rating prior to its receiving a propagation signal (hereinafter referred to as a "green node"), upon its receiving the propagation signal:
  (i) setting the propagation rating of that green node to the lowest grade;
  (ii) having the green node retransmit the propagation signal to its child nodes (if it has any); and
  (iii) determining whether the green node is docked with the node from which the green node received the propagation signal and if it is, having the green node remain docked with said node from which the green node received the propagation signal, and if it is not, having the green node dock with said node from which the green node received the propagation signal; and (e) repeating steps (c) and (d) with respect to each user node which receives a retransmitted propagation signal.

In another embodiment relating to a computer information distribution network comprising a primary server node and user nodes docked therewith in a cascaded relationship, wherein each user node may have no more than a predetermined maximum number of child nodes docked with it, a process for reconfiguring the network in the event of a user node's departure therefrom is provided, said process including the following steps:

(a) providing information at a point in time to a node in the distribution network as follows:
  (i) the node's propagation rating if it is a user node having a parent node which is a user node, wherein a propagation rating is one of a predetermined number of grades ranging from highest to second highest to third highest and so on, with the number of grades being equal to said predetermined maximum number;

(ii) an ancestor list setting forth the node's ancestor nodes' addresses (if it has any ancestor nodes) back to the primary server node, with the node's parent node being atop the ancestor list;

(iii) a sibling list of the node's sibling nodes' addresses (if it has any sibling nodes) and their respective propagation ratings; and (iv) a child list of the node's child nodes' addresses (if it has any child nodes) and their respective propagation ratings;

(b) having a first node send a propagation signal to each former child node of a departed node, wherein said first node is an ancestor of said former child node of said departed node;

(c) with respect to each child node receiving the propagation signal which did not have the highest propagation rating prior to its receiving the propagation signal (hereinafter referred to as a "red node"), upon its receiving the propagation signal:

(i) setting the propagation rating of the red node to the next higher grade above the propagation rating of that red node before it received the propagation signal;

(ii) having the red node undock from its parent node (if it was docked with its parent node before it received the propagation signal);

(iii) devising a first connection address list comprising the address of the red node's sibling node which had the had the highest propagation rating prior to the red node's receiving the propagation signal followed by the red node's ancestor list;

(iv) having said red node go to (or attempt to go to) the node at the top of said first connection address list;

(v) having said red node determine whether the node at the top of said first connection address list is part of the distribution network;

(vi) if the node at the top of said first connection address list is not part of the distribution network, deleting such node from said first connection address list and repeating steps (c)(iv) and (c)(v) with respect to the next node at the top of said first connection address list;

(vii) if the node at the top of said first connection address list is part of said distribution network, determining whether the node at the top of said first connection address list has available capacity to transmit content data to said red node; and (viii) if the node at the top of said first connection address list is part of said distribution network and has available capacity to transmit content data to said red node, having said red node dock with the node at the top of said first connection address list (with regard to these steps (vii) and (viii), in another example (which example is intended to be illustrative and not restrictive), when a red node connects to a green node as part of a network reconfiguration event, it does not matter whether there is "available capacity" or not for the green node to accept its incoming red sibling—the green node has no choice but to accept the node (these actions are facilitated in this example by the red node issuing a "priority join" to the green node; if the green node does not have "available capacity" it has to kick its own red child to make room for the incoming green node));

(d) with respect to each child node receiving the propagation signal which had the highest propagation rating prior to its receiving a propagation signal (hereinafter referred to as a "green node"), upon its receiving the propagation signal:

(i) setting the propagation rating of that green node to the lowest grade;

(ii) having the green node retransmit the propagation signal to its child nodes (if it has any);

(iii) determining whether the green node is docked with the node from which the green node received the propagation signal and if it is, having the green node remain docked with said node from which the green node received the propagation signal, and if it is not, devising a second connection address list starting with said node from which the green node received the propagation signal and followed by that portion of said green node's ancestor list extending back to the primary server from said node from which the green node received the propagation signal;

(iv) having said green node go to (or attempt to go to) the node at the top of said second connection address list;

(v) having said green node determine whether the node at the top of said second connection address list is part of the distribution network;

(vi) if the node at the top of said second connection address list is not part of the distribution network, deleting such node from said second connection address list and repeating steps (d)(iv) and (d)(v) with respect to the next node at the top of said second connection address list;

(vii) if the node at the top of said second connection address list is part of said distribution network, determining whether said node at the top of said second connection address list has available capacity to transmit content data to said green node; and (viii) if the node at the top of said second connection address list is part of said distribution network and has available capacity to transmit content data to said green node, having said green node dock with the node at the top of said second connection address list; and (e) repeating steps (c) and (d) with respect to each user node which receives a retransmitted propagation signal.

In one example, step (c)(iii) may include the following additional step: (1) waiting a predetermined period of time so as to allow the red node's sibling with the highest propagation rating prior to the red node's receipt of the propagation signal (hereinafter the "green node") to retransmit the propagation signal to the green node's child nodes (if any).

In another embodiment relating to a computer information distribution network comprising an instructing node having a first user node docked with said instructing node to receive content data therefrom and a second user node docked with said first user node to receive content data therefrom, a process for handling a purported communication interruption between said first user node and said second user node is provided, said process including the following steps:

(a) having said instructing node receive a first complaint about said first user node from said second user node;

(b) if the second user node is the only user node docked with said first user node at a point in time, if said instructing node receives another complaint about the first user node from another user node within a predetermined period of time from when said instructing node received said first complaint or if said instructing node experiences a communication problem between it and said first user node during said predetermined period of time: (i) disconnecting said first user node from said instructing node; and (c) if said instructing node has not experienced a communication problem between it and said first user node during said predetermined period of time and if a plurality of user nodes are docked with said first user node at said point in time and said instructing node has not received another complaint about said first user node from a user node other than said second user node within said predetermined period of time:
(i) disconnecting said second user node from said first user node.

In one example, step (b) may include the following step:
(ii) sending a signal to the user nodes docked with said first user node indicating the departure of said first user node from said network.

In another example, each user node may have no more than a predetermined maximum number of child nodes docked with it, and wherein step (b) may include the following steps
(ii) providing information at said point in time to each of said second user node, the other user nodes which had been docked with said first user node (if any) and at least one of any user nodes cascadingly connected in the distribution network under said first user node prior to said first user node's being disconnected from said instructing node (if any) as follows:
  (1) the node's propagation rating, wherein a propagation rating is one of a predetermined number of grades ranging from highest to second highest to third highest and so on, with the number of grades being equal to said predetermined maximum number;
  (2) an ancestor list setting forth the node's ancestor nodes' addresses (if it has any ancestor nodes) back to the instructing node, with the node's parent node being atop the ancestor list;
  (3) a sibling list of the node's sibling nodes' addresses (if it has any sibling nodes) and their respective propagation ratings; and
  (4) a child list of the node's child nodes' addresses (if it has any child nodes) and their respective propagation ratings;
(iii) having said instructing node send a propagation signal to each of said second user node and the other user nodes which had been docked with said first user node (if any);
(iv) with respect to each user node receiving the propagation signal which did not have the highest propagation rating prior to its receiving the propagation signal (hereinafter referred to as a "red node"), upon its receiving the propagation signal:
  (1) setting the propagation rating of the red node to the next higher grade above the propagation rating of that red node before it received the propagation signal;
  (2) having the red node undock from its parent node (if it was docked with its parent node before it received the propagation signal); and
  (3) having the red node dock with its sibling node which had the highest propagation rating prior to the red node's receiving the propagation signal;
(v) with respect to each user node receiving the propagation signal which had the highest propagation rating prior to its receiving a propagation signal (hereinafter referred to as a "green node"), upon its receiving the propagation signal:
  (1) setting the propagation rating of that green node to the lowest grade;
  (2) having the green node retransmit the propagation signal to its child nodes (if it has any); and
  (3) determining whether the green node is docked with the node from which the green node received the propagation signal and if it is, having the green node remain docked with said node from which the green node received the propagation signal, and if it is not, having the green node dock with said node from which the green node received the propagation signal; and
(vi) repeating steps (iv) and (v) with respect to each user node which receives a retransmitted propagation signal.

In another embodiment a distribution network for the distribution of content data from a server node to user nodes, wherein said user nodes are connected to said server and each other in cascaded relationship is provided, wherein:
(a) at least one of said user nodes is a repeater node connected directly to said server node, wherein said repeater node retransmits content data received by it to a user node docked to it for purpose of receiving content data from said repeater node (hereinafter referred to as a "child node"); and
(b) wherein each repeater node has the ability to provide to a user node which is attempting to dock with said repeater node connection address instructions.

In one example, each repeater node may include a descendant database indicating:
(i) which child nodes, if any, at a point in time, are docked with it so as to receive content data from said repeater node, and
(ii) which user nodes, if any, at said point in time, are purportedly docked with each of said child nodes.

In another example, the connection address instructions may refer said user node which is attempting to dock with said repeater node to a node in said descendant database.

In another example, each user node may include an ancestor database indicating to which node said user node is docked so that said user node may receive content data therefrom (hereinafter referred to as a "parent node"), and to which node, if any, at said point in time, said parent node is docked so that it may receive content data therefrom.

In another example, if said parent node of said user node departs from said distribution network, said user node may contact another node on its ancestor database.

In another example, each child node of a repeater node may include a sibling database indicating which user nodes, if any, are also child nodes of said repeater node.

In another embodiment a distribution network for the distribution of content data from a server node to user nodes is provided, wherein n levels of user nodes are cascadingly connected to said server node, wherein n is a number greater than one, wherein each user node includes a delay which causes the playing of content data by such node to be delayed a period of time (hereinafter "delay time") from a point in time, and wherein delays in higher level nodes create greater delay times than do delays in lower level nodes.

In another embodiment a distribution network for the distribution of content data from a server node to user nodes is provided, wherein n levels of user nodes are cascadingly connected to said server node, wherein n is a number greater than one, wherein each user node includes a delay which causes the playing of content data by such node to be delayed a period of time (hereinafter "delay time") from a point in time, wherein x is a number from and including 2 to and including n, and wherein delays in (x−1) level nodes create greater delay times than do delays in x level nodes.

In one example, said point in time is an event experienced approximately simultaneously by substantially all user nodes.

In another example, said point in time is when said node receives content data.

Figure 42A:
FIGS. 42A-42C relate to various distribution network topology examples according to the present invention.
Figure 42B:
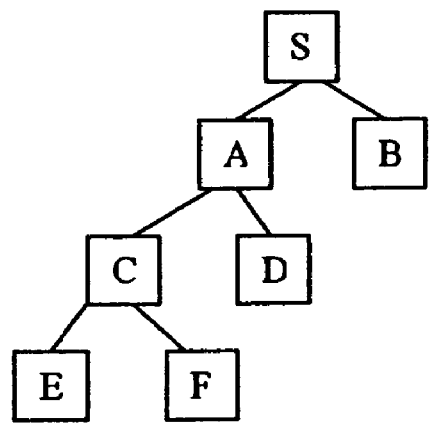
Figure 42C:
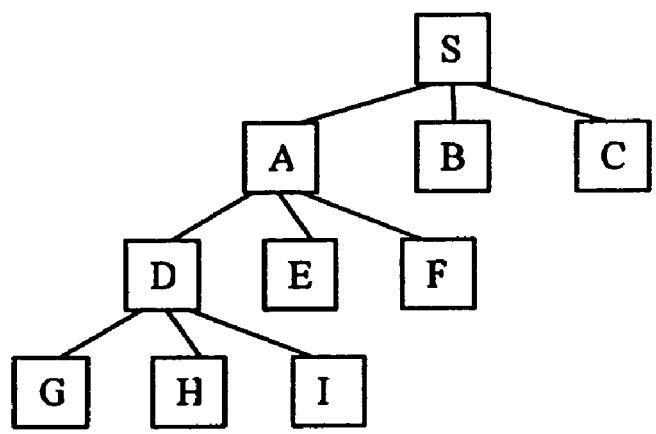

While a number of embodiments and examples of the present invention have been described, it is understood that these embodiments and examples are illustrative only, and not restrictive, and that many modifications may become apparent to those of ordinary skill in the art. For example, any desired branch factor may be used (see, e.g., FIG. 42A showing a branch factor of 1 (i.e., each parent node may have only one child node); FIG. 42B showing a branch factor of 2 (i.e., each parent node may have one or two children nodes); and FIG. 42C showing a branch factor of 3 (i.e., each parent node may have one, two or three children nodes)). Of course, other branch factors (e.g., 4, 5, 6, etc) may be used and, as discussed above, the distribution network may be a hybrid network utilizing subtrees having different branch factors). Further still, a modified Utility Rating may be determined as follows: Utility Rating=Time (of connection)×Bandwidth Rating. Further still, a node ID may be based upon: (a) an IP address (external/internal/DHCP); (b) a URL; and/or (c) a Port. Further still, the root server may propagate "its" time upon assignment of a connection and the user node may get a "delta" (i.e., difference) from its clock to use (in the event of a reset the user node may re-acquire the time from the server (or from another time-providing source)). Further still, the various time intervals discussed herein may be predetermined time intervals (e.g., 0.5 sec., 1 sec, 1 min.) and/or the time intervals may be based upon some varying criteria (e.g., flow of data in the network, number of nodes in the network, number of levels in the network, position of a given node in the network). Further still, partial propagation of data (e.g., ancestor data and/or descendent data) from one or more nodes may be permitted. Further still (as discussed above), one or more of the steps described herein may be omitted (and the various steps which are performed may not necessarily need to be carried out in the order described herein (which description was intended to represent a number of examples, and not be restrictive)). Further still, the root server and each of the user nodes may utilize essentially identical software for carrying out the network configuration, reconfiguration and data transfer operations described herein or the root server may have dedicated server software while the user nodes have different, dedicated user node software. Further still, the entire distribution network (e.g., the root server and all of the user nodes) may have the same branch factor (e.g., a branch factor of 2) or the user nodes may have a first branch factor (e.g., a branch factor of 2) and the root server may have a second branch factor (e.g., the root server may be capable of acting as a parent to more user nodes than 2). Further still, heuristics may be employed to drive network configuration, reconfiguration and/or data flow (e.g., based upon historic network configuration, reconfiguration and/or data flow).

The invention claimed is:

1. A method of operation for a network node capable of operating in a binary tree topology network, the network node having one uptree channel, and a first and second downtree channels, each channel capable of docking with a node, the method comprising the steps of
 sending a standard connection request to a parent node, and receiving an acknowledgement of that request, thereby permitting the network node and the parent node to be docked on the uptree channel;
 receiving a standard connection request from a first child node, and acknowledging that request, thereby permitting the first node to be docked with the network node on a first downtree channel;
 receiving a standard connection request from a second child node, and acknowledging that request, thereby permitting the second node to be docked with the network node on a second downtree channel;
 maintaining a network model comprising an address for a grandparent node, and for any node docked with the network node;
 receiving a priority join request from a third node, and in response to the priority join request:
  if nodes are docked on both of the first and second downtree channels of the network node,
   sending a depart propagate message to a node selected from the set of: a first child node or a second child node,
   thereby causing the selected node and the network node to be no longer docked; and
   sending an acknowledgement of the priority join request to the third node, thereby permitting the network node and the third node to be docked on one of the first and second downtree channels.

2. The method of claim 1 wherein the step of sending a depart propagate message to the selected node further comprises sending the address of the unselected node to the selected node.

3. The method of claim 1 further comprising the step of maintaining a first utility rating for the first downtree channel and a second utility rating for the second downtree channel; and
 wherein the node is selected from the set of: a first child node or a second child node, is selected by comparing the utility ratings of the first child node and the second child node.

4. The method of claim 3 wherein the utility rating for a channel is based upon at least one selected from the set of: the time a node has been docked on that channel; the bandwidth of that channel; or the performance of that channel.

5. A method of operation for a network node capable of operating in a binary tree topology network, the network node having one uptree channel, and a first and second downtree channels, each channel capable of docking with a node, the method comprising the steps of:
 sending a standard connection request to a parent node, and receiving an acknowledgement of that request, thereby permitting the network node and the parent node to be docked on the uptree channel;
 maintaining a network model comprising an address for a grandparent node;
 maintaining a utility identifier provided by the parent node reflecting the relative utility between the network node and a sibling node;
 determining that the parent node is no longer docked on the upstream channel;
 sending a standard connection request to a grandparent node, and receiving an acknowledgement of that request, thereby permitting the network node and the grandparent node to be docked on the uptree channel; and
 if the utility identifier reflects lower relative utility of the network node, pausing prior to the step of sending a standard connection request to the grandparent node.

* * * * *